United States Patent
Makisumi

(10) Patent No.: US 12,031,612 B2
(45) Date of Patent: Jul. 9, 2024

(54) SPEED REDUCER

(71) Applicant: NABTESCO CORPORATION, Tokyo (JP)

(72) Inventor: Kazuyoshi Makisumi, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/590,552

(22) Filed: Feb. 1, 2022

(65) Prior Publication Data

US 2022/0243789 A1  Aug. 4, 2022

(30) Foreign Application Priority Data

Feb. 4, 2021  (JP) ................. 2021-016783

(51) Int. Cl.
*F16H 1/32*  (2006.01)
*F16H 57/032*  (2012.01)
*F16H 57/08*  (2006.01)

(52) U.S. Cl.
CPC ............ *F16H 1/32* (2013.01); *F16H 57/032* (2013.01); *F16H 57/08* (2013.01); *F16H 2001/325* (2013.01); *F16H 2057/085* (2013.01)

(58) Field of Classification Search
CPC .......... F16H 1/32; F16H 57/032; F16H 57/08; F16H 2001/325; F16H 2057/085; F16H 2001/327; F16H 1/28; F16H 57/021; F16H 2001/323; B25J 9/102; B25J 11/008
See application file for complete search history.

(56) References Cited

U.S. PATENT DOCUMENTS

2016/0047418 A1 *  2/2016  Matsui ................ F16C 33/6681
                                                              384/571
2020/0025277 A1 *  1/2020  Tamura ..................... F16H 1/32

FOREIGN PATENT DOCUMENTS

| JP | 2015-197158 A |   | 11/2015 |   |         |
|----|---------------|---|---------|---|---------|
| JP | 2018-017362 A |   |  2/2018 |   |         |
| JP |  2018017362 A | * |  2/2018 |   | F16H 3/44 |

OTHER PUBLICATIONS

English Translation of JP 2018017362 (Year: 2018).*
Extended European Search Report dated Jul. 5, 2022, issued in corresponding European Patent Application No. 22154744.1 (12 pgs.).

* cited by examiner

*Primary Examiner* — Victor L MacArthur
(74) *Attorney, Agent, or Firm* — Pillsbury Winthrop Shaw Pittman, LLP

(57) ABSTRACT

A speed reducer relating to one aspect of the present disclosure includes: an internal gear having a casing and a plurality of outer pins, where the casing surrounds a main axis, and the outer pins are rotatably arranged in pin grooves provided on an inner periphery of the casing; an external gear meshing with the internal gear; an eccentric body for oscillating the external gear; a carrier rotatable relative to the casing; and a main bearing having an inner sliding surface and an outer sliding surface, where the inner sliding surface is rotatable integrally with the casing, and the outer sliding surface is rotatable integrally with the carrier. One of the inner and outer sliding surfaces is made of resin, and the other of the inner and outer sliding surfaces is made of a thermally conductive material that is more wear-resistant than the resin.

5 Claims, 19 Drawing Sheets

SPEED REDUCER

CROSS-REFERENCE TO RELATED APPLICATIONS

This application is based on and claims the benefit of priority from Japanese Patent Application Serial No. 2021-016783 (filed on Feb. 4, 2021), the contents of which are hereby incorporated by reference in their entirety.

TECHNICAL FIELD

The present disclosure relates to a speed reducer.

BACKGROUND

In the conventional art, eccentric oscillation speed reducers are known that are provided between two members and configured to reduce the number of rotations with a predetermined reduction ratio. Such eccentric oscillation speed reducers include an outer cylinder fixedly attached to one of the members and a carrier provided within the outer cylinder and fixedly attached to the other of the members. The carrier is rotatable relative to the outer cylinder in response to oscillatory rotation of oscillating gears attached to eccentric portions of crankshafts.

Recent years have seen a change in the environment in which robots are used. There has been a trend toward further reduction in size and weight of robots, which in turn requires reduction in size and weight of speed reducers. As disclosed in Japanese Patent Application Publication No. 2018-17362 ("the '362 Publication"), the parts of the speed reducers can be reduced in weight by, for example, using resin parts.

The technology disclosed in the '362 Publication, however, only achieve limited success in weight reduction. Furthermore, when the technology disclosed in the '362 Publication is employed and many resin parts are used to achieve weight reduction, the resin parts may result in a lack of strength and accordingly a higher defect rate. In addition, the speed reducers may experience a temperature rise while they are in use. In this case, the resin parts may cause deformation, malfunction or other problems in the speed reducers.

SUMMARY

The present disclosure aims to provide speed reducers that can achieve both weight reduction and rigidity enhancement.

(1) One aspect of the present disclosure provides a speed reducer including an internal gear having a casing (corresponding to an internal gear body) and a plurality of outer pins, where the casing surrounds a main axis, and the outer pins are rotatably arranged in pin grooves provided on an inner periphery of the casing, an external gear meshing with the internal gear, an eccentric body for oscillating the external gear; a carrier rotatable relative to the casing, and a main bearing having an inner sliding surface and an outer sliding surface, where the inner sliding surface is rotatable integrally with the casing, and the outer sliding surface is rotatable integrally with the carrier. One of the inner and outer sliding surfaces is made of resin, and the other of the inner and outer sliding surfaces is made of a thermally conductive material that is more wear-resistant than the resin.

According to the speed reducer relating to one aspect of the present disclosure, the outer pins are provided between the casing and the external gear. This can contribute to improve the rigidity and heat dissipation while the reduction in size and weight is still successful. As a result, the speed reducer can effectively avoid failures.

(2) In the speed reducer described in (1), the main bearing may be configured such that at least the inner sliding surface is formed on an inner peripheral surface of the casing or the outer sliding surface is formed on an outer peripheral surface of the carrier.

(3) In the speed reducer described in (2), the carrier may be made of the resin, and the outer sliding surface may be formed on the outer peripheral surface of the carrier.

(4) In the speed reducer described in (3), the inner sliding surface may be made of the thermally conductive material, and, in a direction extending along the main axis, the inner sliding surface may be positioned to overlap the outer pins.

(5) One aspect of the present disclosure provides a speed reducer including an internal gear having a casing (corresponding to an internal gear body) and a plurality of outer pins, where the casing surrounds a main axis, and the outer pins are rotatably arranged in pin grooves provided on an inner periphery of the casing, an external gear meshing with the internal gear, an eccentric body for oscillating the external gear, a carrier rotatable relative to the casing, and a main bearing having an inner sliding surface and an outer sliding surface, where the inner sliding surface is formed on an inner periphery of a metal ring rotatable integrally with the casing, and the outer sliding surface is formed on an outer peripheral surface of the carrier. The casing and the carrier are made of resin. In a direction extending along the main axis, the metal ring and the outer pins are positioned to overlap each other.

According to the speed reducer relating to one aspect of the present disclosure, the outer pins are provided between the casing and the external gear, and the outer pins and the metal rings extend in the direction extending along the main axis such that they wrap each other. This can contribute to further improve the rigidity while the reduction in size and weight is still successful. As a result, the speed reducer can effectively avoid failures.

(6) One aspect of the present disclosure provides a speed reducer including an internal gear provided on an inner periphery of a casing surrounding a main axis, an external gear meshing with the internal gear, an eccentric body for oscillating the external gear, a carrier rotatable relative to the casing, and a main bearing having an inner sliding surface and an outer sliding surface, where the inner sliding surface is rotatable integrally with the casing, and the outer sliding surface is rotatable integrally with the carrier. One of the inner and outer sliding surfaces is made of resin, and the other of the inner and outer sliding surfaces is made of a thermally conductive material that is more wear-resistant than the resin. At least one of the inner sliding surface or the outer sliding surface is inclined such that a radial dimension thereof relative to the main axis increases or decreases in a direction extending along the main axis.

According to the speed reducer relating to one aspect of the present disclosure, the plain bearings have a large contact area at the bearing surface, which can result in more stable operation.

(7) In the speed reducer described in (6), the inner and outer sliding surfaces may have a projection as a crush allowance.

(8) In the speed reducer described in any of (1) to (7), the inner and outer sliding surfaces may have a groove formed therein that is not in communication with an internal space having the external gear housed therein.

(9) One aspect of the present disclosure provides a speed reducer including an internal gear provided on an inner periphery of a casing surrounding a main axis, an external gear meshing with the internal gear, an eccentric body for oscillating the external gear, a carrier rotatable relative to the casing, and a main bearing having an inner sliding surface and an outer sliding surface, where the inner sliding surface is formed on an inner peripheral surface of the casing, and the outer sliding surface is formed on an outer peripheral surface of the carrier. The casing is made of a metal, and the carrier is made of resin. The inner and outer sliding surfaces are inclined such that a radial dimension thereof relative to the main axis increases in a direction extending along the main axis away from the external gear. The inner and outer sliding surfaces have a projection as a crush allowance. The inner and outer sliding surfaces have a groove formed therein that is not in communication with an internal space having the external gear housed therein.

According to the speed reducer relating to one aspect of the present disclosure, the inner and outer sliding surfaces can catch dust and excessive grease in the groove. This can prevent the dust and the like from affecting the sliding on the inner and outer sliding surfaces. In addition, the dust and the like can be prevented from entering the speed reducer.

(10) One aspect of the present disclosure provides an eccentric oscillation speed reducer for transmitting a driving force between a first member and a second member. The eccentric oscillation speed reducer is configured to change the number of rotations at a predetermined ratio. The eccentric oscillation speed reducer includes an eccentric portion, an external gear having external teeth and an insertion hole into which the eccentric portion is inserted, a casing attachable to one of the first and second members, a carrier attachable to the other of the first and second members, and a main bearing having an inner sliding surface and an outer sliding surface, where the inner sliding surface is rotatable integrally with the casing, and the outer sliding surface is rotatable integrally with the carrier. The casing has internal teeth meshing with the external teeth of the external gear. The carrier is placed within the casing in a radial direction while holding the external gear. The casing and the carrier are rotatable relative to each other in a concentric manner in response to oscillation of the external gear resulting from rotation of the eccentric portion. One of the inner and outer sliding surfaces is made of resin, and the other of the inner and outer sliding surfaces is made of a thermally conductive material that is more wear-resistant than the resin.

According to the speed reducer relating to one aspect of the present disclosure, the outer pins are provided between the casing and the external gear. This can contribute to improve the rigidity and heat dissipation while the reduction in size and weight is still successful. As a result, the speed reducer can effectively avoid failures.

(11) One aspect of the present disclosure provides an eccentric oscillation speed reducer including two or more eccentric bodies and external gears respectively corresponding to the eccentric bodies. The eccentric oscillation speed reducer includes a casing having an internal gear on an inner periphery thereof, where the internal gear meshes with the external gears, a carrier rotatable relative to the casing and rotatable relative to the eccentric bodies, and a main bearing having an inner sliding surface and an outer sliding surface, where the inner sliding surface is formed on an inner peripheral surface of the casing, and the outer sliding surface is formed on an outer peripheral surface of the carrier. One of the inner and outer sliding surfaces is made of resin, and the other of the inner and outer sliding surfaces is made of a thermally conductive material that is more wear-resistant than the resin.

According to the speed reducer relating to one aspect of the present disclosure, the outer pins are provided between the casing and the external gear. This can contribute to improve the rigidity and heat dissipation while the reduction in size and weight is still successful. As a result, the speed reducer can effectively avoid failures.

(12) One aspect of the present disclosure provides a speed reducer including an internal gear having a casing (corresponding to an internal gear body) and a plurality of outer pins, the casing surrounding a main axis, the outer pins being rotatably arranged in pin grooves provided on an inner periphery of the casing, an external gear meshing with the internal gear, an eccentric body for oscillating the external gear, a carrier rotatable relative to the casing, and a main bearing having an inner surface and an outer surface, where the inner surface is rotatable integrally with the casing, the outer surface is rotatable integrally with the carrier, and the outer pins are sandwiched between the inner surface and the outer surface. The inner and outer surfaces are made of one of a resin and a thermally conductive material that is more wear-resistant than the resin, and the outer pins are made of the other.

According to the speed reducer relating to one aspect of the present disclosure, the outer pins are provided between the casing and the external gear. This can contribute to improve the rigidity and heat dissipation while the reduction in size and weight is still successful. As a result, the speed reducer can effectively avoid failures.

(13) In the speed reducer described in (12), the outer pins may have, at an end thereof (one or both of the ends), a diameter-enlarged portion having an enlarged diameter.

(14) One aspect of the present disclosure provides a speed reducer including an internal gear having a casing (corresponding to an internal gear body) and a plurality of outer pins, where the casing surrounds a main axis, and the outer pins are rotatably arranged in pin grooves provided on an inner periphery of the casing, an external gear meshing with the internal gear, an eccentric body for oscillating the external gear, a carrier rotatable relative to the casing, a first main bearing having an inner surface and an outer surface, the inner surface being rotatable integrally with the casing, the outer surface being rotatable integrally with the carrier, the outer pins being sandwiched between the inner surface and the outer surface, and a second main bearing configured as a crossed roller bearing including a plurality of rollers disposed between V grooves having a V-shaped section facing each other. The inner and outer surfaces are made of one of resin and a thermally conductive material that is more wear-resistant than the resin, and the outer pins are made of the other.

(15) One aspect of the present disclosure provides a speed reducer including an internal gear having a casing (corresponding to an internal gear body) and a plurality of outer pins, the casing surrounding a main axis, the outer pins being rotatably arranged in pin grooves provided on an inner periphery of the casing, an external gear meshing with the internal gear, an eccentric body for oscillating the external gear, a carrier rotatable relative to the casing, and a main bearing having an inner surface and an outer surface, where the inner surface is rotatable integrally with the casing, the outer surface is rotatable integrally with the carrier, and the outer pins are sandwiched between the inner surface and the outer surface. The inner and outer surfaces are made of resin.

The outer pins are made of a metal. The outer pins have, at an end thereof, a diameter-enlarged portion having an enlarged diameter.

According to the speed reducer relating to one aspect of the present disclosure, the outer pins are provided between the casing and the external gear. This can contribute to improve the rigidity and heat dissipation while the reduction in size and weight is still successful. As a result, the speed reducer can effectively avoid failures and operate more reliably.

The present disclosure can effectively achieve improved rigidity and heat dissipation while accomplishing smaller size and lighter weight and also prevent failures and realize more reliable operation.

DESCRIPTION OF THE PREFERRED EMBODIMENTS

First Embodiment

Figure 1:
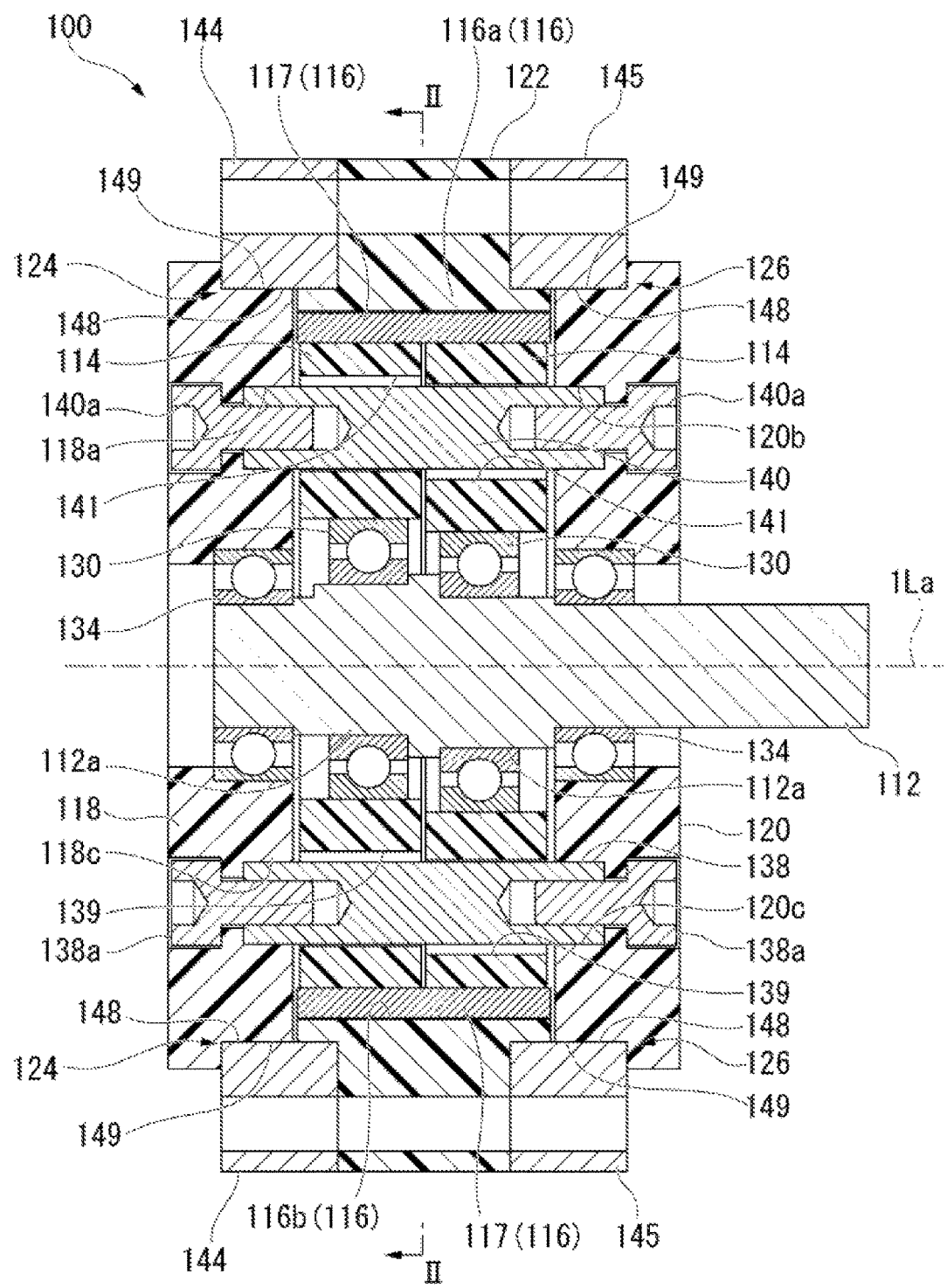
FIG. 1 is a sectional view showing a speed reducer relating to a first embodiment of the present disclosure along a main axis.
Figure 2:
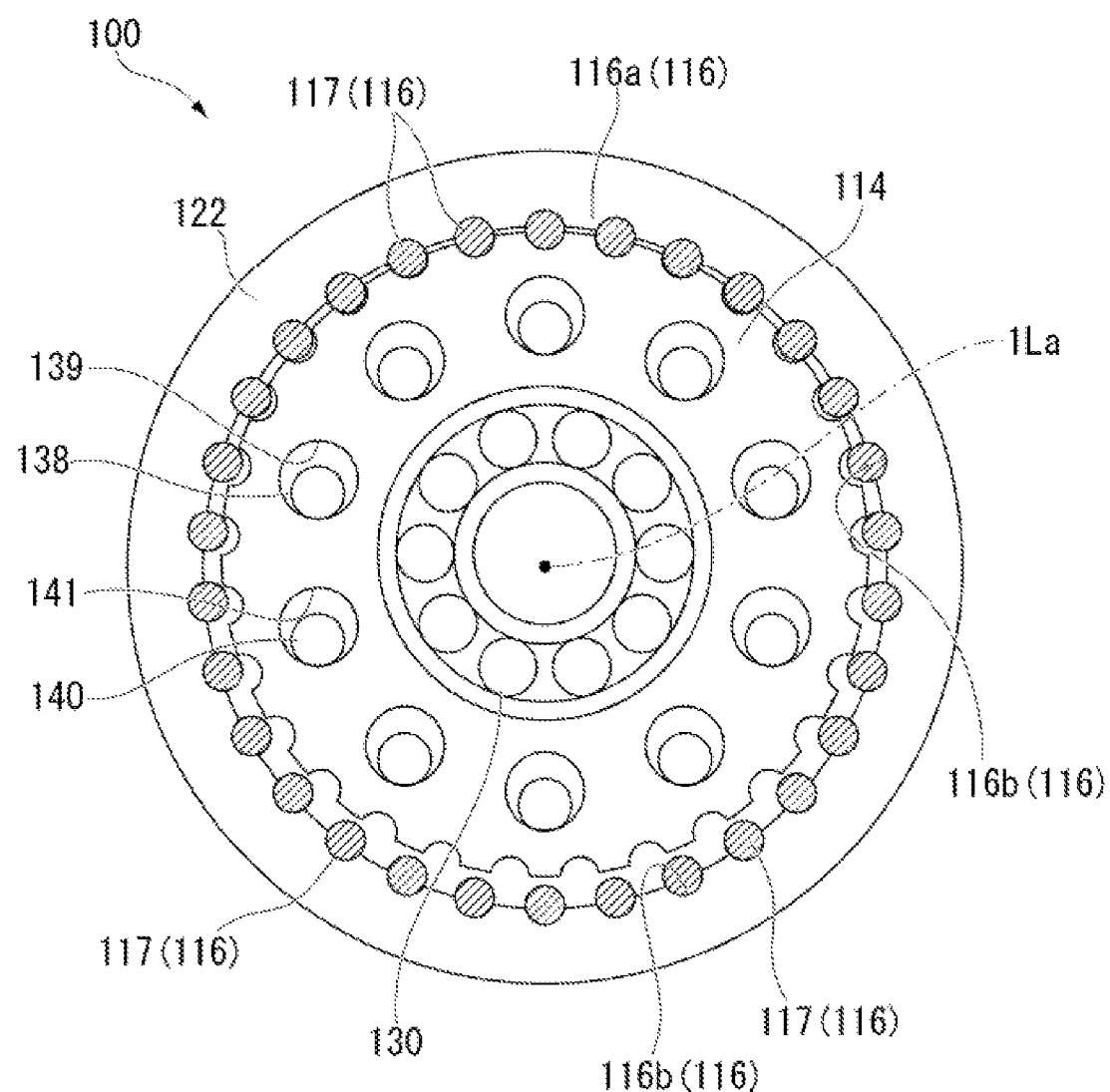
FIG. 2 is a sectional view along a line II-II in FIG. 1.

The following describes a speed reducer relating to a first embodiment of the present disclosure with reference to the accompanying drawings. FIG. 1 is a sectional view showing the speed reducer relating to the first embodiment along a main axis. FIG. 2 is a sectional view along a line II-II in FIG. 1. The dimensions of the components in the drawings are shown enlarged or reduced as appropriate for ease of understanding. In the drawings, some parts that are not important for explaining the first embodiment are not shown. In FIGS. 1 and 2, the reference numeral 100 indicates the speed reducer. FIG. 2 only shows one of the two external gears 114 for ease of understanding.

The speed reducer 100 relating to the first embodiment is an eccentric oscillation speed reducer having an external gear and an internal gear meshing with each other. Oscillating the external gear causes one of the internal and external gears to rotate on its own axis, so that the generated rotational component is output to a driven device through an output member.

As shown in FIGS. 1 and 2, the eccentric oscillation speed reducer 100 has an input shaft 112, an external gear 114, an internal gear 116, a first carrier 118, a second carrier 120, a casing 122, a first main bearing 124, a second main bearing 126, an inner pin 140 and a carrier pin 138. Hereinafter, the expression "axial direction" refers to the direction extending along the central axis (the main axis) 1La of the internal gear 116, and the expressions "circumferential direction" and "radial direction" respectively refer to the circumferential and radial directions of the circle centered on the central axis 1La. In the following description, for convenience, the input side refers to one side in the axial direction (the right side in FIG. 1) and the non-input side or output side refers to the other side (the left side in FIG. 1). Furthermore, in the following description, the first and second carriers 118 and 120 may be simply referred to as the carriers 118 and 120. Likewise, the first and second main bearings 124 and 126 may be simply referred to as the main bearings 124 and 126.

The input shaft 112 is rotatable around the center line when acted upon by rotational power input from a drive source. The speed reducer 100 relating to the present embodiment is a center crank type, where the rotational center line of the input shaft 112 is aligned with the central axis 1La of the internal gear 116. The drive source is, for example, a motor, a gear motor or an engine.

The input shaft 112 is an eccentric body having a plurality of eccentric portions 112a for oscillating the external gear 114. Having such a configuration, the input shaft (eccentric body) 112 is sometimes referred to as a crankshaft. The axial center of the eccentric portions 112a is eccentric to the rotational center line of the input shaft 112. In the present embodiment, the input shaft 112 includes two eccentric portions 112a adjacent to each other. The adjacent eccentric portions 112a are 180° out of phase in terms of eccentricity.

The input shaft 112 is supported on the input side by the second carrier 120 via an input shaft bearing 134 and on the non-input side by the first carrier (shaft flange) 118 via an input shaft bearing 134. The input shaft 112 is supported such that it is rotatable relative to the first carrier 118 and the second carrier (hold flange) 120. The input shaft bearings 134 are not limited to any particular configurations, but are, for example, ball bearings with spherical rollers in the present embodiment.

The internal gear 116 meshes with the external gear 114. According to the present embodiment, the internal gear 116 includes an internal gear body 116a integrated into the casing 122, and outer pins (internal tooth pins) 117 disposed in pin grooves 116b formed in the internal gear body 116a and arranged at intervals in the circumferential direction. The outer pins 117 are cylindrical pin members rotatably supported on the internal gear body 116a. The outer pins 117 form the internal teeth of the internal gear 116. The number of outer pins 117 (the number of internal teeth) of the internal gear 116 is slightly (in this example, by one) greater than the number of external teeth of the external gear 11.

Basically, the outer pins 117 are all shaped in the same manner. The radial dimension of the outer pins 117 remains constant along their entire length along the central axis 1La. All of the outer pins 117 run parallel to the central axis 1La. The outer pins 117 are all positioned in the same manner in the radial direction and in the axial direction along the central axis 1La, while being spaced away from each other in the circumferential direction.

The internal gear body 116a and the casing 122, which are integrated to each other, are made of resin. The internal gear body 116a and the casing 122 can be made of a variety of resin. In this example, the internal gear body 116a and the casing 122 are made of polyacetal (POM). The present embodiment, however, is not limited to such, and the internal gear body 116a and the casing 122 may be made of other resin than POM, for example, polyetheretherketone (PEEK) and PAEK (polyaryletherketones).

The resin used to make the internal gear body 116a, the casing 122 and other constituent parts of the present embodiment may be resin containing reinforcing fibers such as glass or carbon fibers, resin without reinforcing fibers, lamination of a base material such as paper or fabric impregnated with resin. The resin used for the constituent parts of the present embodiment may be resin having thermally conductive fillers mixed therein.

In the speed reducer 100, the outer pins 117 may be made of a material that has a higher thermal conductivity [W/(m·K)] and that is more resistant against wear than the resin material used for the internal gear body 116a. In the following description, metals are introduced as an example thermally conductive material that is more resistant against wear than resin. As used herein, the term "metals" include thermally conductive materials that are more resistant against wear than the above-listed resin.

The outer pins 117 can be made of any material as long as it exhibits higher resistance against wear and higher thermal conductivity than the resin used to make the internal gear body 116a and can be made of metals, highly thermally conductive resin, non-metal materials and the like. The outer pins 117 may be, for example, made of resin having carbon nanotubes (CNTs), boron nitride nanotubes (BNNTs) mixed therein. The outer pins 117 relating to the present embodiment, shown in FIGS. 1 and 2, may be made of iron-based metals such as bearing steel.

The outer pins 117 can be solid or hollow. The outer pins 117 may have a multi-layered structure with a core material being wrapped in a surface material. For example, one of the core and surface materials of the multi-layered structure of the outer pins 117 may be made of iron-based metals, and the other may be made of a copper- or aluminum-based metal Such a structure can eliminate the trade-off between the mechanical and thermal characteristics. As yet another example of the core and surface materials of the multi-layered structure of the outer pins 117, one of them may be made of metals and the other may be made of resin. In a further different example, the outer pins 117 may be made of sintered metals.

The speed reducer 100 has a plurality of external gears 114 provided in a one-to-one correspondence with the eccentric portions 112a. The external gears 114 are rotatably supported on the eccentric portions 112a via eccentric bearings 130. As shown in FIG. 2, the external gears 114 each have ten through holes that are arranged at equal intervals and offset from the central axis of the external gears 114. Three of the ten through holes, which are at equal intervals of 120 degrees around the axis of the external gears 114, serve as carrier pin holes 139. The carrier pin holes 139 receive carrier pins 138. The remaining seven through holes serve as inner pin holes 141. The inner pin holes 141 receive inner pins 140. The carrier pin holes 139 may have the same diameter as the inner pin holes 141.

The external gears 114 are made of resin, like the internal gear body 116a. The external gears 114 can be made of a variety of resin. The external gears 114 are located closer to the input shaft 112 than is the internal gear body 116a. The external gears 114 are made of, for example, PEEK. The present embodiment, however, is not limited to such, and the external gears 114 may be made of, for example, POM or other resins than PEEK.

The carrier pin holes 139 and the inner pin holes 141 are at the same distance from the center in the radial direction and shaped like a circle having the same diameter. Corrugated teeth are formed on the outer periphery of the external gears 114. The external gears 114 oscillate within a plane to which the central axis of the external gears 114 is normal, such that the corrugated teeth move while keeping touching the internal gear 116. A gap is provided between the inner pins 140 and the inner pin holes 141 to absorb the oscillating component of the external gears 114. The inner pins 140 partially touch the inner wall surface of the inner pin holes 141.

The carriers 118 and 120 sandwich the external gears 114 therebetween in the axial direction. The first carrier (shaft flange) 118 is located on the lateral portion of the external gears 114 on the non-input side. The second carrier (hold flange) 120 is located on the lateral portion of the external gears 114 on the input side. The first carrier (shaft flange) 118 is rotatably supported by the casing 122 via a first main bearing 124. The second carrier (hold flange) 120 is rotatably supported by the casing 122 via a second main bearing 126.

The carriers 118 and 120 are shaped like a disc as a whole. The first carrier 118 rotatably supports the input shaft 112 via the input shaft bearings 134. The second carrier 120 rotatably supports the input shaft 112 via the input shaft bearings 134. The carrier pins 138 are coupled to the first carrier (shaft flange) 118 and to the second carrier (hold flange) 120 with bolts 138a. The inner pins 140 are coupled to the first carrier (shaft flange) 118 and to the second carrier (hold flange) 120 via, for example, bolts 140a made of iron-based metals.

The first and second carriers 118 and 120 are coupled to each other via the carrier and inner pins 138 and 140. The carrier and inner pins 138 and 140 are positioned off the axial center of the external gears 114 in the radial direction and penetrate the external gears 114 in the axial direction. In this example, the carrier and inner pins 138 and 140 are provided as separate parts from the carriers 118 and 120. The present embodiment, however, is not limited to such. As another example, the carrier and inner pins 138 and 140 may be partly integrated into the carriers 118 and 120.

One of the first carrier 118 and the casing 122 serves as an output member for outputting rotational power to a driven device, and the other serves as a stationary member fixedly attached to an external member for supporting the speed reducer 100. The output member is rotatably supported on the stationary member via the main bearings 124 and 126. The non-input-side end surface of the first carrier 118 may have a driven member, which is to be rotated by the speed reducer 100, coupled thereto with bolts or the like. Alternatively, the outer peripheral flange of the casing 122 may have a driven member, which is to be rotated by the speed reducer 100, coupled thereto with bolts or the like.

The casing 122 is shaped like a hollow tube as a whole. The internal gear 116 is provided on the inner periphery of the casing 122. A flange or the like may be provided on the outer periphery of the casing 122. The casing 122 has a first metal ring 144 located on the non-input side of the casing 122 and a second metal ring 145 located on the input side of the casing 122. The first and second metal rings 144 and 145 are fixedly attached to and integrated into the casing 122. The first and second metal rings 144 and 145 may be fixedly attached to the casing 122 with a plurality of bolts arranged next to each other in the circumferential direction.

In the following description, the first and second metal rings 144 and 145 may be simply referred to as the metal rings 144 and 145.

The casing 122 has a depression receiving therein the first metal ring 144. The first metal ring 144 protrudes in the axial direction beyond the depression. The first metal ring 144 serves as the outer ring of the first main bearing 124. The first metal ring 144 may have the outer periphery flush with the outer periphery of the casing 122.

The first metal ring 144, which serves as the outer ring of the first main bearing 124, is located on the output side of the casing 122. The first metal ring 144 is exposed on the output side of the casing 122. The portion of the first metal ring 144 that protrudes in the axial direction beyond the depression of the casing 122 constitutes an inner sliding surface 148 serving as the outer ring. The inner sliding surface 148 is in contact with the first carrier (shaft flange) 118. The first metal ring 144 is firmly fitted onto the casing 122, and the fit can be, for example, a clearance fit, an interference fit or a transition fit. The clearance may be determined by the difference in thermal expansion coefficient.

The casing 122 has a depression for receiving therein the second metal ring 145. The second metal ring 145 protrudes in the axial direction beyond the depression. The second metal ring 145 serves as the outer ring of the second main bearing 126. The second metal ring 145 may have the outer periphery flush with the outer periphery of the casing 122.

The second metal ring 145, which serves as the outer ring of the second main bearing 126, is located on the input side of the casing 122. The second metal ring 145 is exposed on the input side of the casing 122. The portion of the second metal ring 145 that protrudes in the axial direction beyond the depression of the casing 122 constitutes the inner sliding surface 148 serving as the outer ring. The inner sliding surface 148 is in contact with the second carrier (hold flange) 120. The second metal ring 145 is firmly fitted onto the casing 122, and the fit can be, for example, a clearance fit, an interference fit or a transition fit. The clearance may be determined by the difference in thermal expansion coefficient.

The first main bearing 124 is arranged between the first carrier 118 and the casing 122. The second main bearing 126 is arranged between the second carrier 120 and the casing 122. The main bearings 124 and 126 of the present embodiment, shown in FIGS. 1 and 2, are plain bearings. The main bearings 124 and 126 have the inner sliding surface 148 serving as part of the outer ring and an outer sliding surface 149 serving as part of the inner ring. The outer sliding surface 149 is formed on the outer peripheral surface of the carriers 118 and 120. The inner sliding surface 148 is formed on the inner peripheral surface of the metal rings 144 and 145.

The inner sliding surface 148 serving as part of the outer ring of the main bearings 124 and 126 is made of a material having a higher thermal conductivity than the resin making the carriers 118 and 120 forming the outer sliding surface 149 serving as part of the inner ring.

Any material can be used to make the metal rings 144 and 145 serving as the outer ring of the main bearings 124 and 126 as long as the material exhibits a higher thermal conductivity than the resin of the carriers 118 and 120 serving as the inner ring and a higher strength than the resin of the carriers 118 and 120. For example, the material used to make the metal rings 144 and 145 may be metallic or non-metallic materials. The metal rings 144 and 145 relating to the present embodiment may be made of copper- or aluminum-based metals, or iron-based metals such as bearing steel.

The metal rings 144 and 145 can be solid or hollow. The metal rings 144 and 145 may have a multi-layered structure with a core material being wrapped in a surface material forming the inner sliding surface 148. For example, one of the core and surface materials of the multi-layered structure of the metal rings 144 and 145 may be made of iron-based metals and the other may be made of copper- or aluminum-based metals. As another example, the metal rings 144 and 145 may be made of sintered metals.

As for the main bearings 124 and 126, the inner and outer sliding surfaces 148 and 149 are outside the outer pins 117 in the radial direction. As shown in FIG. 1, the first and second metal rings 144 and 145 both overlap the outer pins 117 when seen in the radial direction. This arrangement can contribute to maintain the strength of the casing 122 along the entire length.

The inner pins 140 are inserted into the inner pin holes 141, which are formed in the external gears 114, with a clearance therebetween. The inner pins 140 are fitted at one end thereof into recesses 118a in the first carrier 118 and at the other end thereof into recesses 120b in the second carrier 120. The inner pins 140 are fixedly inserted into the recesses 118a and 120b with bolts 140a. Alternatively, the inner pins 140 may be press-fitted into the recesses 118a and 120b. In this case, the inner pins 140 may not be necessarily fixed using bolts or the like. The inner pins 140 are in contact with part of the inner pin holes 141, which are formed in the external gears 114. With such arrangement, the inner pins 140 restricts the external gears 114 from rotating on their own axis and only allows the external gears 114 to oscillate. The inner pins 140 serve as a coupling member for transmitting power between the first and second carriers 118 and 120 and the external gears 114.

The carrier pins 138 are inserted into the carrier pin holes 139, which are formed in the external gears 114, with a clearance therebetween. The carrier pins 138 are fitted at one end thereof into recesses 118c in the first carrier 118 and at the other end thereof into recesses 120c in the second carrier 120. The carrier pins 138 are fixedly inserted into the recesses 118c and 120c with bolts 138a. Alternatively, the carrier pins 138 may be press-fitted into the recesses 118c and 120c. In this case, the carrier pins 138 may not be necessarily fixed using bolts or the like. The carrier pins 138 are not in contact with the carrier pin holes 139 formed in the external gears 114. With such arrangement, the carrier pins 138 do not play role in restricting the external gears 114 from rotating on their own axis. The carrier pins 138 serve as a coupling member contributing only to couple together the first and second carriers 118 and 120.

Speed reducers have seen an increase in its applications, including collaborative robots working closely with people. In order to expand the applications, it is desired to reduce the weight and noise of the speed reducers. Conventional speed reducers are made up by components made of iron-based metals. In order to diminish the weight, the components may be made of materials with low specific gravity. Favorable materials with low specific gravity include resin. On the other hand, if the components are made of resin, the components may experience temperature rise due to poorer heat dissipation and resultantly have shortened lifetime. For this reason, the materials of the components are desirably selected in consideration of the purposes of weight reduction and heat dissipation. Here, the weight reduction may lead to compromised strength, which needs to be avoided.

In the speed reducer 100, a large amount of heat is often generated inside the speed reducer 100, more specifically, around the main bearings 124 and 126, which are plain bearings. In addition, a large amount of heat is also often generated around the input shaft 112, which is rotatable at a relatively high speed. Furthermore, the speed reducer 100 may malfunction unless the inner pins 140 and external gears 114 maintain sufficient strength. As noted, the speed reducers experience a large temperature increase if the heat generated inside is dissipated outside less efficiently. The resin components experience a sudden drop in rigidity and strength as the temperature rises. Accordingly, the continued use of the less rigid and strong resin components may probably result in malfunction.

To deal with this issue, one of the members that are movable relative to each other is made of a resin, the other member is desirably made of a material exhibiting a higher resistance against wear and a higher thermal conductivity [W/(m·K)] than the resin member. In this case, the heat generated inside can be dissipated outside in a better manner than when the other member is made of a low-thermal-conductivity material. At the same time, the members can achieve a longer lifetime than when the other member is made of a low-wear-resistance material.

The material used to make the inner sliding surface 148 serving as the outer ring may be made of any material as long as it exhibits higher wear-resistance and thermal conductivity than the resin used to make the internal gear body 116a forming the outer sliding surface 149 serving as the inner ring. The inner sliding surface 148 can be made of, for example, metal, non-metal, and highly thermally conductive materials. The first and second metal rings 144 and 145, which constitute the inner sliding surface 148 of the present embodiment, and the outer pins 117 may be made of iron- and aluminum-based metals such as bearing steel, light metals such as aluminum, magnesium, beryllium, and titanium, or composites thereof. Alternatively, the first and second metal rings 144 and 145 and the outer pins 117 may be made of ceramics or other materials. As the other components such as the carriers 118 and 120 are made of resin, the speed reducer 100 can achieve both light weight and sufficient mechanical strength.

The input shaft 112 and the input shaft bearings 134 located between the first carrier 118 and the input shaft 112 receive high-speed rotation before it is slowed down. This means that the input shaft 112 and the input shaft bearings 134 experience a relatively large temperature rise and allow the rotation to be input only at low speed if they exhibit low resistance against heat. For this reason, the input shaft bearings 134, input shaft 112 and eccentric bearings 130 may be made of metals, such as iron-based metals. This can prevent a drop in the allowable number of rotations input into them. Since the input shaft 112 is subjected to large torsional stress, the input shaft 112 is preferably made of a more rigid material than the first carrier 118. The input shaft 112 may be made of aluminum or iron-based metals with a higher torsional strength than aluminum, for example. The iron-based metals can include carbon steel, bearing steel, and stainless steel, any of which can be used depending on the desired characteristics.

The carrier pins 138 are desirably highly rigid in order to reliably achieve sufficient coupling strength between the first and second carriers 118 and 120. Considering this, the carrier pins 138 may be made of metals. According to the present example, the carrier pins 138 are made of a material that has higher wear-resistance and thermal conductivity than resin, for example, metals such as aluminum.

The following now describes how the speed reducer 100 configured as described above operates. As rotational power is transmitted from the driving unit to the input shaft 112, the eccentric portions 112a of the input shaft 112 rotate around the rotational center line passing through the input shaft 112 (the central axis 1La). This causes the eccentric portions 112a to oscillate the external gears 114. The external gears 114 oscillate in such a manner that their own axial center rotates around the rotational center line of the input shaft 112. As the external gears 114 oscillate, the meshing between the external gears 114 and the outer pins 117 of the internal gear 116 takes place at sequentially shifted positions. Accordingly, every time the input shaft 112 rotates once, either the external gears 114 or internal gear 116 rotates on its own axis by an amount determined by the difference between the number of teeth of the external gears 114 and the number of outer pins 117 of the internal gear 116. In the present embodiment, the rotation of the external gears 114 on their own axis results in reduced rotations being output through the first carrier 118 or casing 122.

In the speed reducer 100 of the present embodiment, the first and second main bearings 124 and 126 are constituted by the first and second metal rings 144 and 145, and the first and second carriers 118 and 120, which account for the main portion of the weight of the speed reducer 100, are made of resin. This can contribute to successful weight reduction.

In the speed reducer 100 of the present embodiment, the metal rings 144 and 145 forming the inner sliding surface 148 are made of a material exhibiting higher wear-resistance and thermal conductivity than the resin used to make the carriers 118 and 120 forming the outer sliding surface 149. This can help dissipating the heat generated in the speed reducer 100 more efficiently via the metal rings 144 and 145 and the outer pins 117. As a result, the present embodiment can prevent a temperature rise in the speed reducer 100 more effectively.

In the speed reducer 100 of the present embodiment, as described above, the first and second metal rings 144 and 145 wrap the outer pins 117 when seen in the radial direction. This arrangement can contribute to maintain the strength of the casing 122 along the entire length in the axial direction. Therefore, the present embodiment can prevent deformation of the casing 122 and deformation of the carriers 118 and 120, and also prevent failure of the external gears 114. As a result, the present embodiment can maintain sufficient strength.

In the present embodiment, the outer pins 117 are made of metals or the like. This can contribute to prevent the failure of the external gears 114 and to maintain sufficient strength. As for the main bearings 124 and 126, the inner and outer sliding surfaces 148 and 149 do not wrap the outer pins 117 when seen in the axial direction, and the inner and outer sliding surfaces 148 and 149 and the outer pins 117 are arranged substantially consecutively in the axial direction. With such arrangement, the thickness of the speed reducer 100 can be reduced while the speed reducer 100 maintains the strength. In other words, the dimension of the speed reducer 100 in the direction extending along the central axis 1La can be reduced, so that the size reduction can be accomplished.

The inner sliding surface 148 of the first and second metal rings 144 and 145 is close to the outer pins 117 in the radial direction. Accordingly, the heat transferred from the main bearings 124 and 126, which are sliding bearings, to the first and second metal rings 144 and 145 can be dissipated outside, so that the speed reducer 100 can achieve better heat dissipation.

If the inner and outer sliding surfaces 148 and 149 experience an excessive temperature rise, this may cause the resin on the surfaces to melt or the surfaces to stick together. In this case, the speed reducer 100 may fait According to the present embodiment, however, improved heat dissipation can be achieved. This can prevent the heat from being contained in the speed reducer 100, thereby preventing problems from occurring. In addition, since the outer pins 117 are made of metals or the like, the outer pins 117 can release the heat transferred from the vicinity of the main bearings 124 and 126, to prevent a local temperature rise. As a result, the speed reducer 100 can achieve improved heat dissipation.

At the same time, since the metal rings 144 and 145 and the carriers 118 and 120 constitute the main bearings 124 and 126, metal or heavy components can be reduced in number when compared with the case where ball bearings, roller bearings, and other configurations are employed. In this manner, the speed reducer 100 can be reliably configured, while keeping sufficient heat dissipation and achieving further weight reduction.

Second Embodiment

Figure 3:
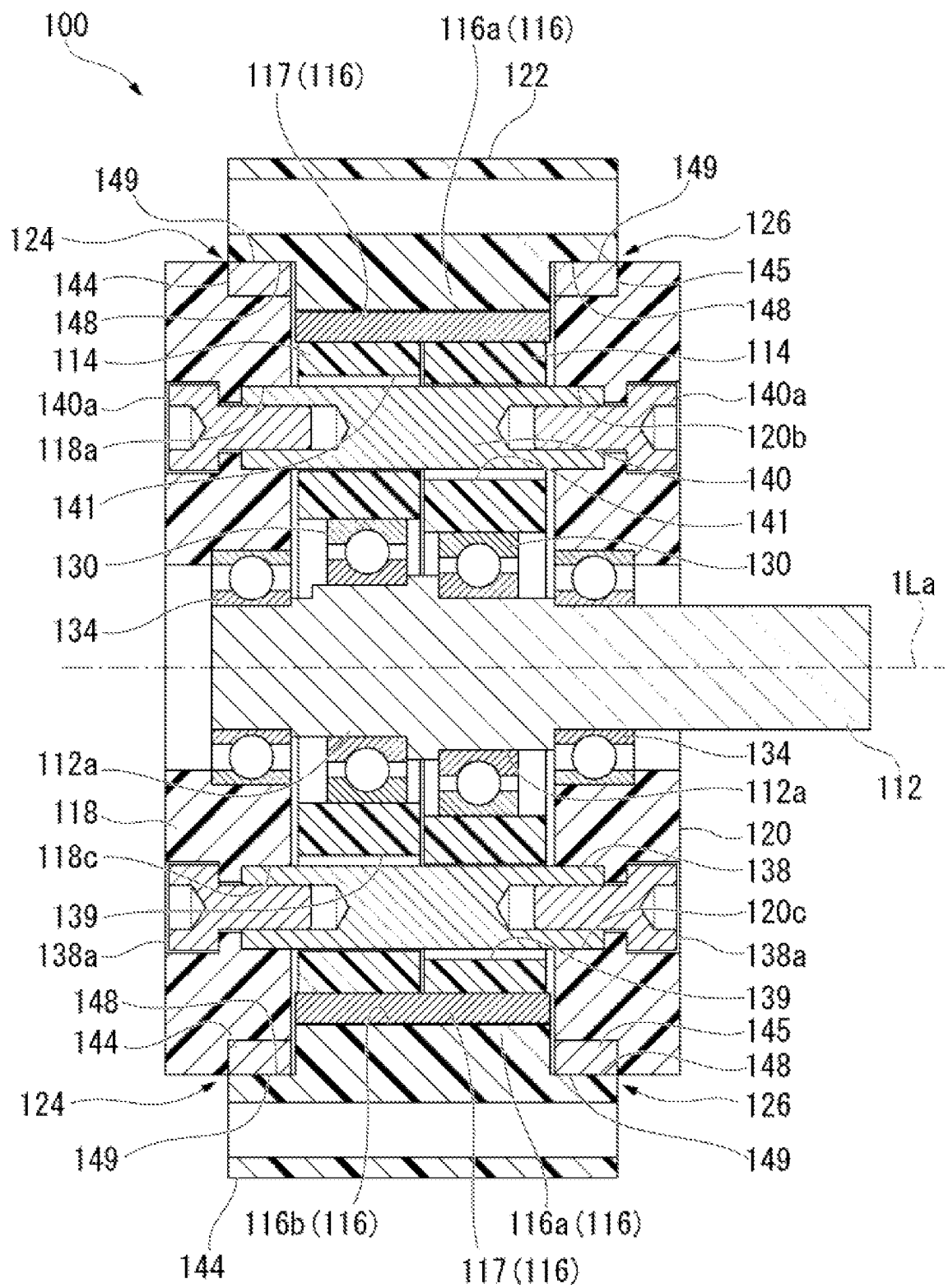
FIG. 3 is a sectional view showing a speed reducer relating to a second embodiment of the present disclosure along a main axis.

The following describes a speed reducer relating to a second embodiment of the disclosure with reference to the accompanying drawings. FIG. 3 is a sectional view showing the speed reducer relating to the second embodiment along a direction extending along a main axis. The present embodiment is different from the first embodiment in terms of the main bearings. The other components relating to the second embodiment have counterparts in the first embodiment, and are thus assigned with the same reference signs and not described now.

In the speed reducer 100 of the present embodiment, as shown in FIG. 3, the first metal ring 144 of the first main bearing 124 is provided on the first carrier (shaft flange) 118. The first metal ring 144 has the outer periphery constituting the outer sliding surface 149 of the main bearing 124. The first carrier (shaft flange) 118 has a depression for receiving therein the first metal ring 144. The first metal ring 144 is adjacent to the outer pins 117 in the axial direction. In the first carrier (shaft flange) 118, the first metal ring 144 serves as the inner ring of the first main bearing 124. The first metal ring 144 may have the outer periphery flush with the outer periphery of the first carrier (shaft flange) 118.

The first metal ring 144, which serves as the inner ring of the first main bearing 124, is located on the input side in the first carrier (shaft flange) 118. The outer peripheral portion of the first metal ring 144, which is flush with the outer periphery of the first carrier (shaft flange) 118, forms the outer sliding surface 149 serving as the inner ring. The outer sliding surface 149 of the first metal ring 144 is in contact with the casing 122. The first metal ring 144 is firmly fitted onto the first carrier (shaft flange) 118, and the fit can be, for example, a clearance fit, an interference fit or a transition fit. The clearance may be determined by the difference in thermal expansion coefficient.

The inner peripheral surface of the casing 122 in contact with the outer sliding surface 149 forms the inner sliding surface 148 serving as the outer ring of the first main bearing 124. Therefore, the outer ring of the first main bearing 124 is integrated with the casing 122.

Likewise, the second metal ring 145 of the second main bearing 126 is provided on the second carrier (hold flange) 120 in the speed reducer 100 of the present embodiment, as shown in FIG. 3. The second metal ring 145 has the outer periphery constituting the outer sliding surface 149 of the main bearing 126.

The second carrier (hold flange) 120 has a depression for receiving therein the second metal ring 145. The second metal ring 145 is adjacent to the outer pins 117 in the axial direction. In the second carrier (hold flange) 120, the second metal ring 145 serves as the inner ring of the second main bearing 126. The second metal ring 145 may have the outer periphery flush with the outer periphery of the second carrier (hold flange) 120.

The second metal ring 145, which serves as the inner ring of the second main bearing 126, is located on the output side in the second carrier (hold flange) 120. The outer peripheral portion of the second metal ring 145, which is flush with the outer periphery of the second carrier (hold flange) 120, forms the outer sliding surface 149 serving as the inner ring. The outer sliding surface 149 of the second metal ring 145 is in contact with the casing 122. The second metal ring 145 is firmly fitted onto the second carrier (hold flange) 120, and the fit can be, for example, a clearance fit, an interference fit or a transition fit. The clearance may be determined by the difference in thermal expansion coefficient.

The inner peripheral surface of the casing 122 in contact with the outer sliding surface 149 forms the inner sliding surface 148 serving as the outer ring of the second main bearing 126. Therefore, the outer ring of the second main bearing 126 is integrated with the casing 122. Note that the metal rings 144 and 145 of the main bearings 124 and 126 can be alternatively configured to radially externally cover the entire outer periphery of the carriers 118 and 120.

In the speed reducer 100 of the present embodiment shown in FIG. 3, the inner and outer sliding surfaces 148 and 149 are respectively made of resin and metals. Accordingly, the second embodiment can produce the same effects as the first embodiment.

Third Embodiment

Figure 4:
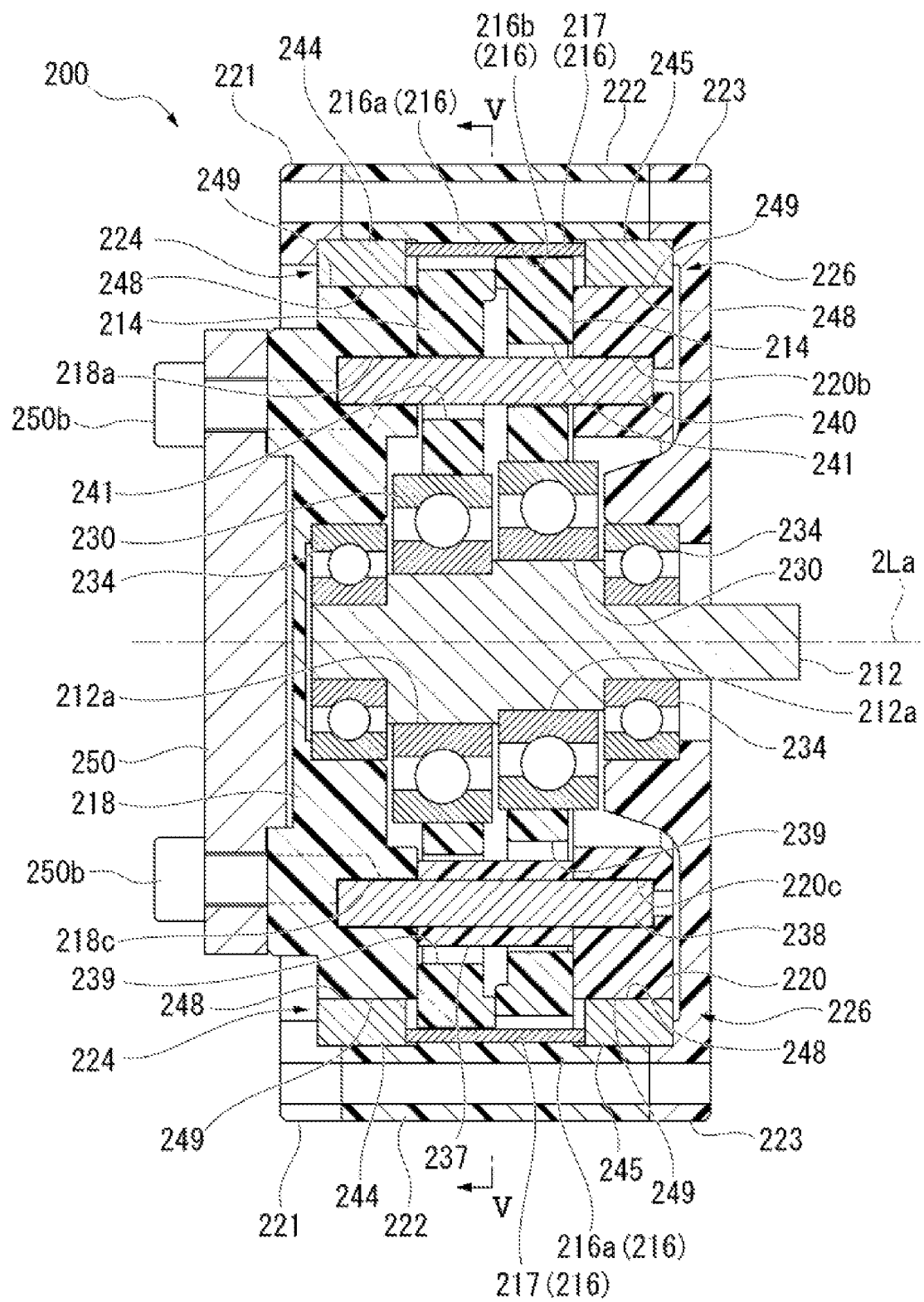
FIG. 4 is a sectional view showing a speed reducer relating to a third embodiment of the present disclosure along a main axis.
Figure 5:
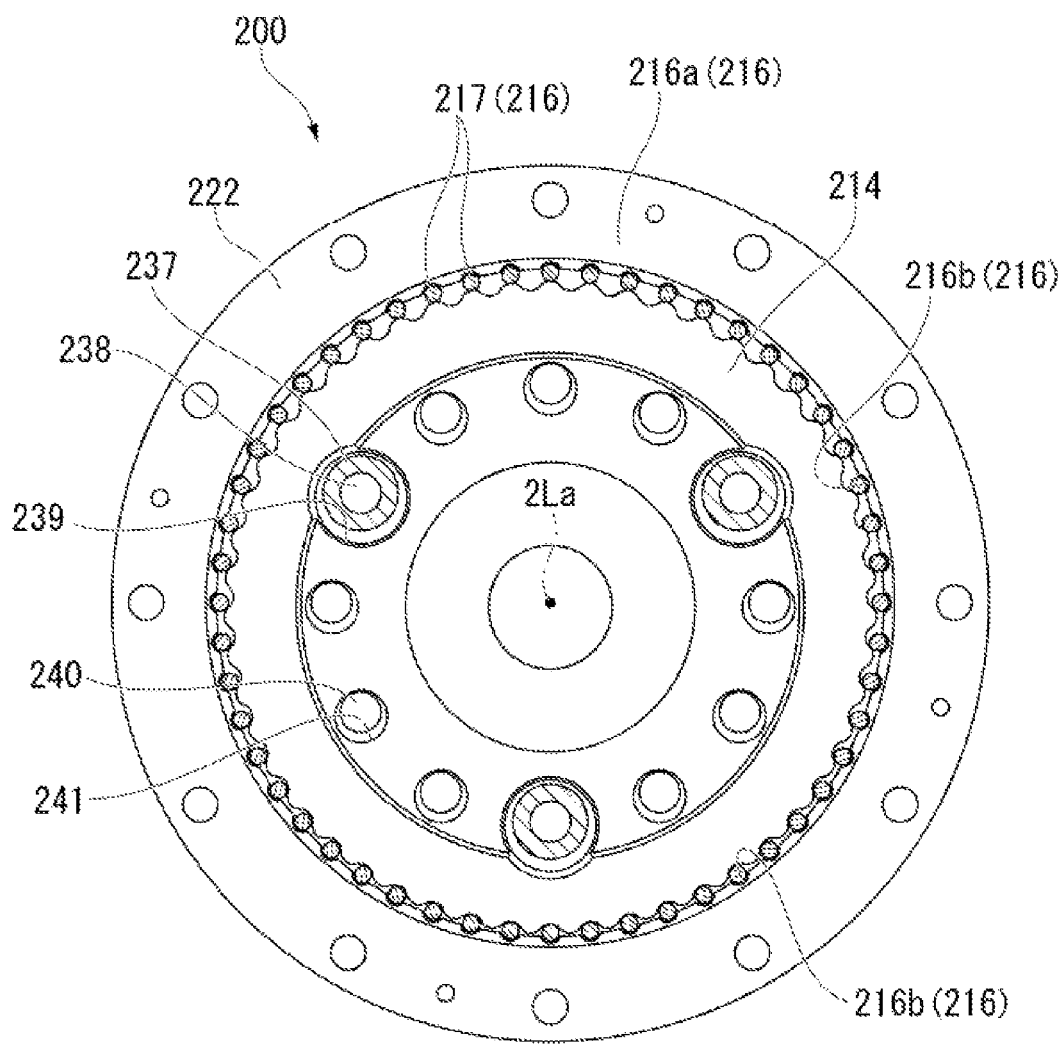
FIG. 5 is a sectional view along a line V-V in FIG. 4.

The following describes a speed reducer relating to a third embodiment of the disclosure with reference to the accompanying drawings. FIG. 4 is a sectional view showing the speed reducer relating to the third embodiment along a direction extending along a main axis. FIG. 5 is a sectional view along a line V-V in FIG. 4. In FIGS. 4 and 5, the reference numeral 200 indicates the speed reducer.

The speed reducer 200 relating to the third embodiment is an eccentric oscillation speed reducer having an external gear and an internal gear meshing with each other. Oscillating the external gear causes one of the internal and external gears to rotate on its own axis, so that the generated rotational component is output to a driven device through an output member.

The speed reducer 200 of the present embodiment is different from the speed reducer 100 relating to the first embodiment in that two external gears 214 are assembled together with a phase difference of 180 degrees, as shown in FIGS. 4 and 5. Except for this, the speed reducer 200 relating to the third embodiment is the same as the speed reducer 100 relating to the first embodiment. The speed reducer 200 relating to the third embodiment includes an input shaft 212, external gears 214, an internal gear 216, a first carrier 218, a second carrier 220, a casing 222, a first main bearing 224, a second main bearing 226, inner pins 240 and carrier pins 238. Hereinafter, the expression "main axis direction" refers to the direction extending along a central axis 2La of the internal gear 216, and the expressions "circumferential direction" and "radial direction" respectively refer to the circumferential and radial directions of the circle centered on the central axis 2La. For convenience, the input side refers to one side in the axial direction (the right side in FIG. 4) and the non-input side refers to the other side (the left side in FIG. 4). In the following description, the first and second carriers 218 and 220 may be simply referred to as the carriers 218 and 220. Likewise, the first and second main bearings 224 and 226 may be simply referred to as the main bearings 224 and 226.

The input shaft 212 is rotatable around the rotational center line when acted upon by rotational power input from a drive device (not shown). The speed reducer 200 relating to the third embodiment is a center crank type, where the rotational center line of the input shaft 212 is aligned with the central axis 2La of the internal gear 216. The drive device is, for example, a motor, a gear motor or an engine.

The input shaft 212 relating to the present embodiment is an eccentric shaft having a plurality of eccentric portions 212a for oscillating the external gears 214. Having such a configuration, the input shaft (eccentric body) 212 is sometimes referred to as a crankshaft. The axial center of the eccentric portions 212a is eccentric to the rotational center line of the input shaft 212. In the present embodiment, two eccentric portions 212a are adjacent to each other. The adjacent eccentric portions 212a are 180° out of phase in terms of eccentricity.

The input shaft 212 is supported on the input side by a second cover 223 via an input shaft bearing 234 and on the non-input side by the first carrier 218 via an input shaft bearing 234. In other words, the input shaft 212 is supported such that it is rotatable relative to the first carrier 218 and the second cover 223. The input shaft bearings 234 are not limited to any particular configurations, but can be ball bearings with spherical rollers in the present embodiment. Preload may be applied to the input shaft bearings 234, but no preload is applied in the present example.

The internal gear 216 meshes with the external gears 214. According to the present embodiment, the internal gear 216 includes an internal gear body 216a integrated into the casing 222 and outer pins (internal tooth pins) 217 disposed in pin grooves 216b formed in the internal gear body 216a at intervals in the circumferential direction. The outer pins 217 are cylindrical pin members rotatably supported on the internal gear body 216a. The outer pins 217 form the internal teeth of the internal gear 216. The number of outer pins 217 (the number of internal teeth) of the internal gear 216 is slightly (in this example, by one) greater than the number of external teeth of the external gears 214.

The internal gear body 216a is made of resin. The internal gear body 216a can be made of a variety of resin. In the present embodiment, the internal gear body 216a is made of, for example, polyacetal (POM). The present embodiment, however, is not limited to such, and the internal gear body 216a may be made of other resin than POM, for example, polyaryletherketones (PAEK) including polyetheretherketone (PEEK).

The resin used to make the internal gear body 116a and other constituent parts of the present embodiment may be resin containing reinforcing fibers such as glass or carbon fibers, a resin without reinforcing fibers, a lamination of a base material such as paper or fabric impregnated with resin. The resin used for the constituent parts of the present embodiment may be a resin having thermally conductive fillers mixed therein. The thermally conductive fillers include, for example, nano-order fillers, powders of ceramics such as aluminum oxide and aluminum nitride, and powders of metals such as aluminum, copper and graphite.

In the speed reducer 200, a large amount of heat is often generated inside, in particular, around the input shaft 212, which is rotatable at a relatively high speed. The speed reducer 200 experiences a large temperature rise if the heat generated inside is dissipated outside less efficiently. The resin components experience a sudden drop in strength as the temperature rises. Accordingly, the continued use of the resin components may probably result in breakage. To deal with this, one of the gears that mesh with each other is made of a resin, the other gear is desirably made of a material exhibiting a higher thermal conductivity [W/(m·K)] than the resin gear. In the eccentric oscillation speed reducer 200, the outer pins 217 are made of a material that has a higher thermal conductivity than the resin material used for the internal gear body 216a. In this case, the heat generated inside can be dissipated outside in a better manner than when the outer pins 217 are made of a low thermal conductivity material.

The outer pins 217 can be made of any material as long as it exhibits a higher thermal conductivity than the resin used to make the internal gear body 216a and can be made of metal, highly thermally conductive resin, non-metal materials and the like. Highly thermally conductive resin include resin having thermally conductive fillers mixed therein. The outer pins 217 may be, for example, made of resin having carbon nanotubes (CNTs), boron nitride nanotubes (BNNTs) mixed therein. The outer pins 217 relating to the present embodiment may be made of iron-based metals such as bearing steel.

The outer pins 217 can be solid or hollow. The outer pins 217 may have a multi-layered structure with a core material being wrapped in a surface material. For example, one of the core and surface materials of the multi-layered structure of the outer pins 217 may be made of iron-based metals, and the other may be made of copper- or aluminum-based metals. Such a structure can eliminate the trade-off between the mechanical and thermal characteristics. As yet another example of the core and surface materials of the multi-layered structure of the outer pins 217, one of them may be made of metals, and the other may be made of resin. In a further different example, the outer pins 117 may be made of sintered metals.

The external gears 214 are provided in a one-to-one correspondence with the eccentric portions 212*a*. The external gears 214 are rotatably supported on the eccentric portions 212*a* via eccentric bearings 230. The external gears 214 have twelve through holes arranged at equal intervals and offset from the axis of the external gears 214. Three of the twelve through holes, which are at equal intervals of 120 degrees around the axis of the external gears 214, serve as carrier pin holes 239. The carrier pin holes 239 receive carrier pins 238. The remaining nine through holes serve as inner pin holes 241. The inner pin holes 241 receive inner pins 240. In the present embodiment, the diameter of the carrier pin holes 239 is greater than that of the inner pin holes 241. The present embodiment, however, is not limited to such, and the carrier pin holes 239 may have the same diameter as the inner pin holes 241.

The external gears 214 are made of resin. The external gears 214 can be made of a variety of types of resin. In particular, since the external gears 214 are located near the input shaft 212, which experiences a large temperature rise, the external gears 214 may be made of resin that have a higher heat resistance temperature than the internal gear body 216*a*. Considering this, the external gears 214 are made of, for example, PEEK. The present embodiment, however, is not limited to such, and the external gears 214 may be made of, for example, POM or other resin than PEEK.

The carrier pin holes 239 and the inner pin holes 241 are at the same distance from the center in the radial direction and shaped like a circle. Corrugated teeth are formed on the outer periphery of the external gears 214. The external gears 214 oscillate within a plane to which the axis of the external gears 214 is normal, such that the corrugated teeth move while keeping touching the internal gear 216. A gap is provided between the inner pins 240 and the inner pin holes 241 to absorb the oscillating component of the external gears 214. The inner pins 240 partially touch the inner wall surface of the inner pin holes 241.

The carriers 218 and 220 are arranged on the lateral portion of the external gears 214 in the axial direction. The first carrier (shaft flange) 218 is located on the non-input-side lateral portion of the external gears 214. The second carrier (hold flange) 220 is located on the input-side lateral portion of the external gears 214. The first and second carriers 218 and 220 are rotatably supported by the casing 222 via first and second main bearings 224 and 226. The carriers 218 and 220 are shaped like a disc as a whole. The first carrier 218 rotatably supports the input shaft 212 via an input shaft bearing 234. The second carrier 220 may be configured to support the input shaft 212 via an input shaft bearing 234, but does not support the input shaft bearing 234 and the input shaft 212 in the present embodiment.

The first and second carriers 218 and 220 are coupled to each other via the carrier and inner pins 238 and 240. The carrier and inner pins 238 and 240 are positioned offset from the axial center of the external gears 214 in the radial direction and penetrate the external gears 214 in the axial direction. In the present embodiment, the carrier and inner pins 238 and 240 are provided as separate parts from the carriers 218 and 220. The present embodiment, however, is not limited to such. As another example, the carrier and inner pins 238 and 240 may be partly integrated into the carriers 218 and 220.

One of the first carrier 218 and the casing 222 serves as an output member for outputting rotational power to a driven device, and the other serves as a stationary member fixedly attached to an external member for supporting the speed reducer 200. The output member is rotatably supported on the stationary member via the main bearings 224 and 226. In the present embodiment, the output member is the first carrier 218, and the stationary member is the casing 222. The non-input-side end surface of the first carrier 218 may have a driven member 250, which is to be rotated by the speed reducer 200, coupled thereto with bolts 250*b*. The bolts 250*b* relating to the present embodiment may be made of iron-based metals.

The casing 222 is shaped like a hollow tube as a whole. The internal gear 216 is provided on the inner periphery of the casing 222. A flange or the like may be provided on the outer periphery of the casing 222, but no flange is provided in the present example. The casing 222 has a first cover 221 covering the casing 222 on the non-input side and a second cover 223 covering the casing 222 on the input side. The first and second covers 221 and 223 are fixedly attached to the casing 222 with a plurality of bolts arranged next to each other in the circumferential direction.

The casing 222 has a depression for receiving therein the input side of the outer ring of the first main bearing 224. The first cover 221 has a depression for receiving therein part of the non-input side of the outer ring of the first main bearing 224. The outer ring of the first main bearing 224 is supported by and sandwiched between the casing 222 and the first cover 221 in the axial direction. The casing 222 has a depression for receiving therein the non-input side of the outer ring of the second main bearing 226. The second cover 223 has a depression for receiving therein part of the input side of the outer ring of the second main bearing 226. The outer ring of the second main bearing 226 is supported by and sandwiched between the casing 222 and the second cover 223 in the axial direction. The second cover 223 has another depression for receiving therein the outer ring of the input-side input shaft bearing 234. In other words, the second cover 223 rotatably supports the input shaft 212 on the input side thereof via the input shaft bearing 234.

The first main bearing 224 is arranged between the first carrier 218 and the casing 222. The second main bearing 226 is arranged between the second carrier 220 and the casing 222. The main bearings 224 and 226 relating to the present embodiment respectively have metal rings 244 and 245 forming the inner sliding surface 248. The metal rings 244 and 245 rotatably supports the carriers 218 and 220.

The main bearings 224 and 226 are plain bearings. The main bearings 224 and 226 have (i) the metal rings 244 and 245 forming the inner sliding surface 248 serving as the outer ring and (ii) an outer sliding surface 249 serving as the inner ring. The outer sliding surface 249 is formed on the outer peripheral surface of the carriers 218 and 220. The metal rings 244 and 245 serving as the outer ring are firmly fitted onto the casing 222, and the fit can be, for example, a clearance fit, an interference fit or a transition fit. The clearance may be determined by the difference in thermal expansion coefficient. Pressure may be applied to the main bearings 224 and 226, but no pressure is applied in the present example.

In the present embodiment, the metal rings 244 and 245 serving as the outer ring of the main bearings 224 and 226 are made of a material having a higher thermal conductivity than the resin used for the internal gear body 216*a*. Furthermore, the metal rings 244 and 245 are in contact with the outer pins 217 in the axial direction. As shown in FIG. 4, the end of the metal rings 244 and 245 may be in direct contact with the end of the outer pins 217. The present embodiment, however, is not limited to such, and the end of the metal rings 244 and 245 may be in contact with the end of the outer pins 217 with a spacer being provided therebetween in the axial direction. The spacer may be made of a material exhibiting a higher thermal conductivity than the resin used for the internal gear body 216a. With such arrangement, the heat transferred to the outer pins 217 is dissipated to the carriers 218 and 220 and the casing 222 via the metal rings 244 and 245. This can contribute to achieve improved heat dissipation. In addition, the heat transferred to the first carrier 218 is dissipated to the outside through the driven member 250. This can contribute to achieve improved heat dissipation.

The metal rings 244 and 245 and the outer pins 217 can be made of any material as long as it exhibits higher thermal conductivity than the resin used to make the internal gear body 216a and can be made of metal, highly thermally conductive resin, non-metal materials and the like. The metal rings 244 and 245 and the outer pins 217 relating to the present embodiment may be made of iron-based metals such as bearing steel.

The first carrier 218 can be made of any material as long as it exhibits higher thermal conductivity than the resin used to make the internal gear body 216a and can be made of metal, highly thermally conductive resin, non-metal materials and the like. In order to achieve both light weight and sufficient mechanical strength, the first carrier 218 may be made of light metals (metals with a specific gravity of 4, 5 or less) such as aluminum, magnesium, beryllium and titanium or a combination of these. The first carrier 218 relating to the present embodiment is made of aluminum-based metals. In this way, the first carrier 218 can be made of a metal material with a lower specific gravity than is the input shaft 212.

The second carrier 220 can be made of metals or various types of resin. In the present embodiment, the second carrier 220 is made of POM, for example. In this way, the second carrier 220 can achieve a reduced weight. In order to diminish the heat conduction from the input shaft bearing 234, the second carrier 220 is not in direct contact with the input shaft bearing 234 but arranged with a space being provided therebetween. The second carrier 220 may be made of a material having a higher thermal conductivity than the resin used for the internal gear body 216a. This can contribute to further improve the heat dissipation.

The inner pins 240 are inserted into the inner pin holes 241, which are formed in and penetrate the external gears 214, with a gap therebetween. The inner pins 240 are fitted at one end thereof into recesses 218a in the first carrier 218 and at the other end thereof into recesses 220b in the second carrier 220. The inner pins 240 are press-fitted in the recesses 218a and 220b and not secured using bolts or the like. The inner pins 240 are in contact with part of the inner pin holes 241, which are formed in the external gears 214. With such arrangement, the inner pins 240 restricts the external gears 214 from rotating on their own axis and only allows the external gears 114 to oscillate. The inner pins 240 serve as a coupling member playing a role in transmitting power between the first and second carriers 218 and 220 and the external gears 214.

The carrier pins 238 are inserted into the carrier pin holes 239, which are formed in the external gears 214, with a gap therebetween. The carrier pins 238 are fitted at one end thereof into recesses 218c in the first carrier 218 and at the other end thereof into recesses 220c in the second carrier 220. The carrier pins 238 are press-fitted in the recesses 218c and 220c and not secured using bolts or the like. The carrier pins 238 are surrounded by tubular spacers 237. The spacers 237 touch, at one end thereof, the first carrier 218 and, at the other end thereof, the second carrier 220. The spacers 237 are designed to keep an appropriate distance in the axial direction between the first carrier 218 and the second carrier 220. The carrier pins 238 and spacers 237 are not in contact with the carrier pin holes 239 formed in the external gears 214, so that they do not contribute to restrain the external gears 214 from rotating on their own axis. The carrier pins 238 serve as a coupling member contributing only to couple together the first and second carriers 218 and 220.

The constituents of the speed reducer relating to the present embodiment are desirably made of a material selected in consideration of the purposes of weight reduction and heat dissipation. In recent years, speed reducers have seen an increase in its applications including collaborative robots working closely with people. For this reason, it is desired to reduce the weight and noise of the speed reducers. Conventional speed reducers are constituted by parts made of iron-based metals. In order to reduce the weight, the constituents may be made of materials with low specific gravity. Suitable materials with low specific gravity include resin. On the other hand, if the components are made of resin, they may experience a temperature rise due to poorer heat dissipation and resultantly have shortened lifetime.

The input shaft 212 and the input shaft bearings 234 located between the first carrier 218 and the input shaft 212 receive high-speed rotation input thereto before it is slowed down. This means that the input shaft 212 and the input shaft bearings 234 experience a relatively large temperature rise and they allow a smaller number of rotations input thereto if they exhibit low resistance against heat. For this reason, the input shaft bearings 234, input shaft 212 and eccentric bearings 230 may be made of metals, such as iron-based metals. This can prevent a drop in the allowable number of rotations input into them. Since the input shaft 212 is subjected to large torsional stress, the input shaft 212 is preferably made of a more rigid material than the first carrier 218. The input shaft 212 is made of iron-based metals with a higher torsional strength than aluminum. The iron-based metals that can be used to make the constituents of the speed reducer relating to the present embodiment can include carbon steel, bearing steel, and stainless steel, any of which can be used depending on the desired characteristics.

The carrier pins 238 are desirably highly rigid in order to reliably achieve sufficient coupling strength between the first and second carriers 218 and 220. Considering this, the carrier pins 238 may be made of metals and the spacers 237 may be made of resin in order to achieve reduced weight. In the present embodiment, the carrier pins 238 are made of iron-based metals and the spacers 237 are made of POM. The casing 222 is integrated with the internal gear body 216a and may be made of the same material as the internal gear body 216a. For the purposes of weight reduction, the first and second covers 221 and 223 may be made of resin. The first and second covers 221 and 223 may be made of the same resin or different types of resin. In the present embodiment, the first and second covers 221 and 223 may be made of POM, for example.

The following now describes how the speed reducer 200 works. As rotational power is transmitted from the driving unit to the input shaft 212, the eccentric portions 212a of the input shaft 212 rotate around the rotational center line of the input shaft 212. This causes the eccentric portions 212a to oscillate the external gears 214. The external gears 214 oscillate in such a manner that their own axial center rotates around the rotational center line of the input shaft 212. As the external gears 114 oscillate, the meshing between the external gears 214 and the outer pins 217 of the internal gear 216 takes place at sequentially shifted positions. Accordingly, every time the input shaft 212 rotates once, either the external gears 214 or the internal gear 216 rotates on its own axis by an amount determined by the difference between the number of teeth of the external gears 214 and the number of outer pins 217 of the internal gear 216. In the present embodiment, the external gears 214 rotate on their own axis, which results in reduced rotations being output through the first carrier 118.

In the speed reducer 200 of the present embodiment, the main bearings 224 and 226 have no metal constituents heavier than resins, except for the metal rings 244 and 245. Thus, the speed reducer 200 can achieve further weight reduction.

The speed reducer 200 relating to the present embodiment can produce the same effects as the speed reducers relating to the above-described embodiments.

Fourth Embodiment

Figure 6:
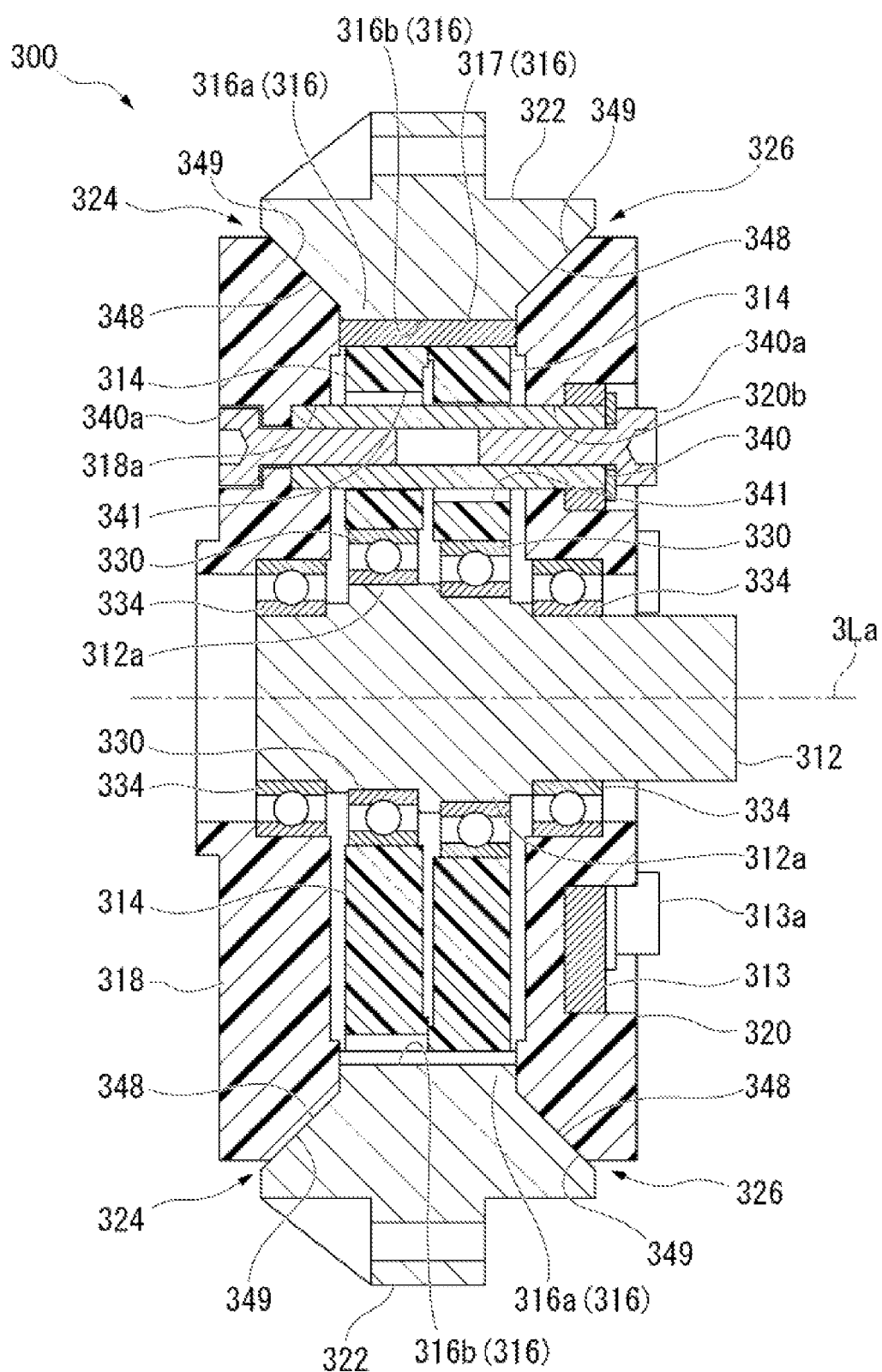
FIG. 6 is a sectional view showing a speed reducer relating to a fourth embodiment of the present disclosure along a main axis.

The following describes a speed reducer relating to a fourth embodiment of the disclosure with reference to the accompanying drawings. FIG. 6 is a sectional view showing the speed reducer relating to the fourth embodiment along the axial direction. The present embodiment is different from the first embodiment in terms of the main bearings. The other components relating to the fourth embodiment have counterparts in the first embodiment, and they are assigned with the corresponding reference signs with the digit in the hundreds place is 3 in place of 1, and not described now.

In a speed reducer 300 relating to the present embodiment, as shown in FIG. 6, a casing 322 has an inner sliding surface 348 integrated therewith, serving as the outer ring of first and second main bearings 324 and 326. The casing 322 is entirely made of a material exhibiting higher wear-resistance and higher thermal conductivity than the resin used to make an outer sliding surface 349 serving as the inner ring of the first and second main bearings 324 and 326. Specifically, the casing 322 is made of metals. In the following description, the first and second main bearings 324 and 326 may be simply referred to as the main bearings 324 and 326.

In the speed reducer 300 relating to the present embodiment, as shown in FIG. 6, the inner and outer sliding surfaces 348 and 349 are shaped such that they have a larger diameter at a position away from external gears 314 than at a position close to the external gears 314 in the direction extending along the central axis 3La. The inner and outer sliding surfaces 348 and 349 form an angle of, for example, 30° to 60° relative to the central axis 3La. The present embodiment is, however, not limited to such, and the inner and outer sliding surfaces 348 and 349 may form an angle in the range of 40° to 50°, more preferably 45° relative to the central axis 3La.

Alternatively, in the speed reducer 300 relating to the present embodiment, the inner and outer sliding surfaces 348 and 349 form an angle of, for example, 45° to 40° relative to the central axis 3La. In this case, only a small angle is made by the end surface (the outer peripheral surface) of first and second carriers (shaft flange) 318 and (hold flange) 320, which are made of resin. This can save the first and second carriers 318 and 320 from deformation. Stated differently, the first carrier (shaft flange) 318 and the second carrier (hold flange) 320, which are made of resin, can be prevented from becoming too thin in the axial direction near their outer edge.

In the speed reducer 300 relating to the present embodiment, the casing 322 and the first carrier (shaft flange) 318 tightly seal the internal space of the speed reducer 300 via the first main bearing 324. Likewise, the casing 322 and the second carrier (hold flange) 320 tightly seal the internal space of the speed reducer 300 via the second main bearing 326. The external gears 314 and the outer pins (internal tooth pins) 317 are housed in the internal space of the speed reducer 300. The main bearings 324 and 326 are plain bearings. The internal space of the speed reducer 300 is tightly sealed by the inner and outer sliding surfaces 348 and 349.

In the speed reducer 300 relating to the present embodiment, a drive gear 313, which is configured to input a driving force to the input shaft (eccentric body) 312, is provided and rotatable integrally with a drive shaft 313a. FIG. 6 does not show the carrier pins.

In the speed reducer 300 relating to the present embodiment, the casing 322 is entirely made of a thermally conductive material that exhibits a higher wear resistance than resin, for example, metals. This allows the heat generated by the main bearings 324 and 326 to be quickly dissipated outside through the casing 322. As a result, the temperature rise of the speed reducer 300 can be effectively prevented. In addition, since the constituents other than the casing 322, the inner pins 340 and the drive gear 313 are made of resin, the speed reducer 300 can achieve reduced weight. Furthermore, since the casing 322 is made of metals, the speed reducer 300 can maintain sufficient strength and rigidity.

In the speed reducer 300 relating to the present embodiment, the inner and outer sliding surfaces 348 and 349 form an angle in the above-described range relative to the central axis 3La. This means that the inner and outer sliding surfaces 348 and 349 can have an increased area without causing an increase in the thickness of the speed reducer 300 in the axial direction. Furthermore, since the present embodiment can prevent deformation of the casing 322, the first carrier (shaft flange) 318 and the second carrier (hold flange) 320, the speed reducer 300 can be strong enough to prevent any malfunctions. As a result, the speed reducer 300 can avoid failures or the like and can stably keep operating.

Furthermore, the speed reducer 300 relating to the present embodiment can produce the same effects as the speed reducers relating to the above-described embodiments.

Fifth Embodiment

Figure 7:
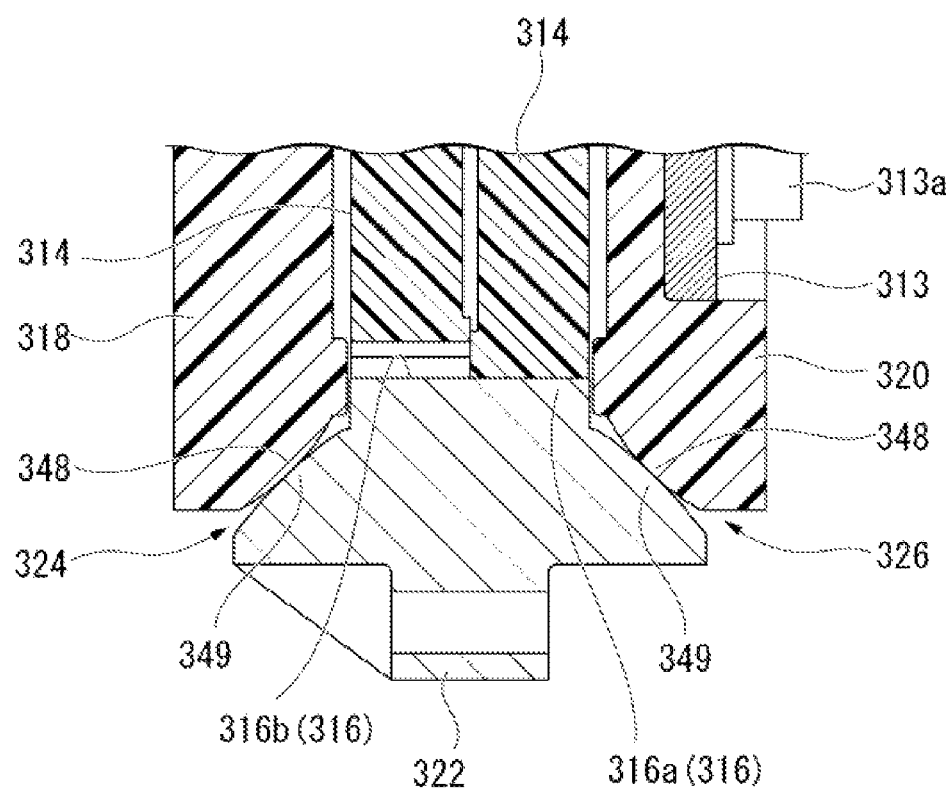
FIG. 7 is an enlarged sectional view showing a speed reducer relating to a fifth embodiment of the present disclosure, more specifically, a region near a main bearing.

The following describes a speed reducer relating to a fifth embodiment of the disclosure with reference to the accompanying drawings. FIG. 7 is an enlarged sectional view showing a portion of the speed reducer relating to the fifth embodiment that is near the main bearings, obtained by cutting the speed reducer along the axial direction. The present embodiment is different from the fourth embodiment described above in terms of the main bearings. Except for this difference, the present embodiment includes the same constituents as in the fourth embodiment, which are denoted by the same reference numerals and are not described here.

In the speed reducer 300 relating to the present embodiment, as shown in FIG. 7, the inner and outer sliding surfaces 348 and 349 of the main bearings 324 and 326 bulge out or project in the direction extending along the central axis 3La. Alternatively, one of the inner and outer sliding surfaces 348 and 349 may bulge out or project in the direction along the central axis 3La.

The inner and outer sliding surfaces 348 and 349 preferably touch each other along the entire surface, so that they slidably support each other with touching each other by a large area. This ideal condition, however, may encounter difficulties due to distortions caused by the manufacturing process. This can result in backlash, which may cause the speed reducer 300 to fail. To prevent the speed reducer 300 from failing, the inner and outer sliding surfaces 348 and 349 include crush allowance as precautions.

The crush allowance of the inner and outer sliding surfaces 348 and 349 can be a projection having a curved cross-section, as shown in FIG. 7. With such configuration, the inner and outer sliding surfaces 348 and 349 contact each other over a range determined by the crush allowance. Accordingly, the range over which they touch each other can be reliably acquired. This can prevent manufacturing errors from keeping the inner and outer sliding surfaces 348 and 349 away from each other, as a result of which the inner and outer sliding surfaces 348 and 349 can reliably touch each other at the middle or in the vicinity thereof in the axial direction. Accordingly, the first carrier (shaft flange) 318 and the second carrier (hold flange) 320 can operate in a more stable manner relative to the casing 322. Furthermore, since the present embodiment can prevent deformation of the casing 322, the first carrier (shaft flange) 318 and the second carrier (hold flange) 320, the speed reducer 300 can be strong enough to prevent any malfunctions. In addition, the temperature rise experienced by the main bearings 324 and 326 can be also prevented.

Furthermore, the speed reducer 300 relating to the present embodiment can produce the same effects as the speed reducers relating to the above-described embodiments.

Sixth Embodiment

Figure 8:
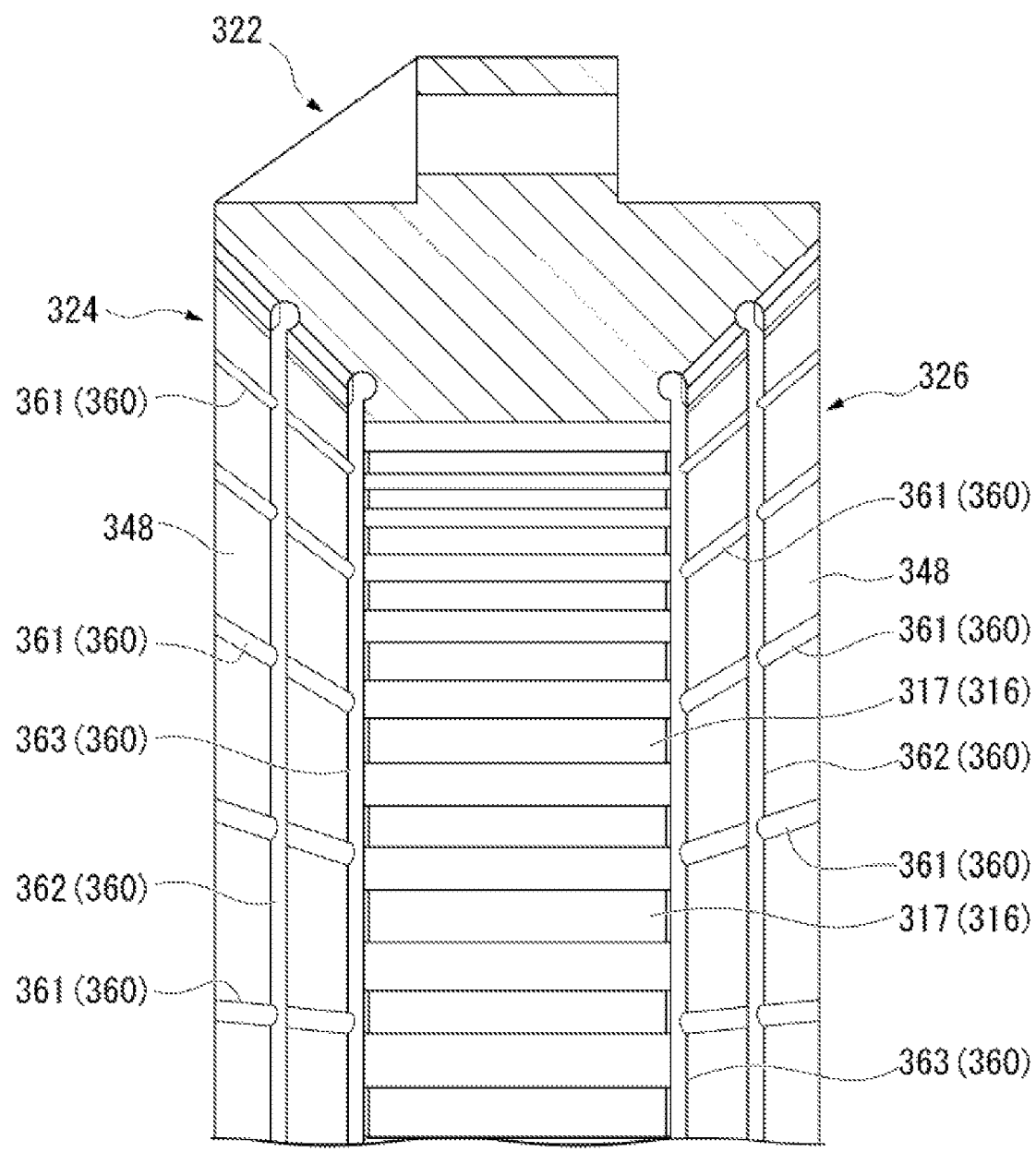
FIG. 8 is a sectional view showing a casing constituting an inner sliding surface of a main bearing of a speed reducer relating to a sixth embodiment of the present disclosure.

The following describes a speed reducer relating to a sixth embodiment of the disclosure with reference to the accompanying drawings. FIG. 8 is a sectional view showing a casing constituting an inner sliding surface of a main bearing of the speed reducer relating to the sixth embodiment of the present disclosure. The present embodiment is different from the fourth embodiment described above in terms of the main bearings. Except for this difference, the present embodiment includes the same constituents as in the fourth embodiment, which are denoted by the same reference numerals and are not described here.

In the speed reducer 300 relating to the present embodiment, as shown in FIG. 8, a casing 322 forms an inner sliding surface 348 with grooves 360 formed therein. The grooves 360, which are formed in the inner sliding surface 348, include radial grooves (groove) 361 extending in the radial direction and circumferential grooves (grooves) 362 and 363 extending in the circumferential direction. The radial grooves 361 are formed on the inner sliding surface 348 and spaced away from each other in the circumferential direction. The radial grooves 361 may be arranged at equal intervals in the circumferential direction, for example.

The circumferential grooves 362 are near the middle of the inner sliding surface 348 in the axial direction. The circumferential grooves 363 are formed in the inner sliding surface 348 near the external gear 314 in the axial direction. The radial grooves 361 are not closer to the external gears 314 than are the circumferential grooves 363 in the axial direction. The radial grooves 361 extend to the edge of the inner sliding surface 348 in a direction away from the external gear 314 in the axial direction, to become in communication with the outside.

The circumferential grooves 362 and 363 continuously extend in the circumferential direction of the inner sliding surface 348, making a full circle. The radial grooves 361 are connected to the circumferential grooves 363 such that they terminate in the circumferential grooves 363. In the inner sliding surface 348, no other grooves are formed between the input shaft 312 and the circumferential grooves 363. This means that the grooves 360 are separated from the outer pins 317 and not in contact with the outer pins 317. The grooves 360 may be all equal in depth and width, or the circumferential grooves 362 and 363 may be larger than the radial grooves 361.

According to the speed reducer 300 relating to the present embodiment shown in FIG. 8, the grooves 360 can catch any foreign matter such as dust and particles that enter between the inner sliding surface 348 and the outer sliding surface 349. This can prevent foreign matters from entering the inner space within the speed reducer 300. In other words, the present embodiment can prevent foreign substances such as dust and particles from affecting how the external gears 314, outer pins 317 and the like work. In addition, the grooves 360 can catch excessive grease, lubricant or the like between the inner sliding surface 348 and the outer sliding surface 349.

Furthermore, the speed reducer 300 relating to the present embodiment can produce the same effects as the speed reducers relating to the above-described embodiments.

Figure 9:
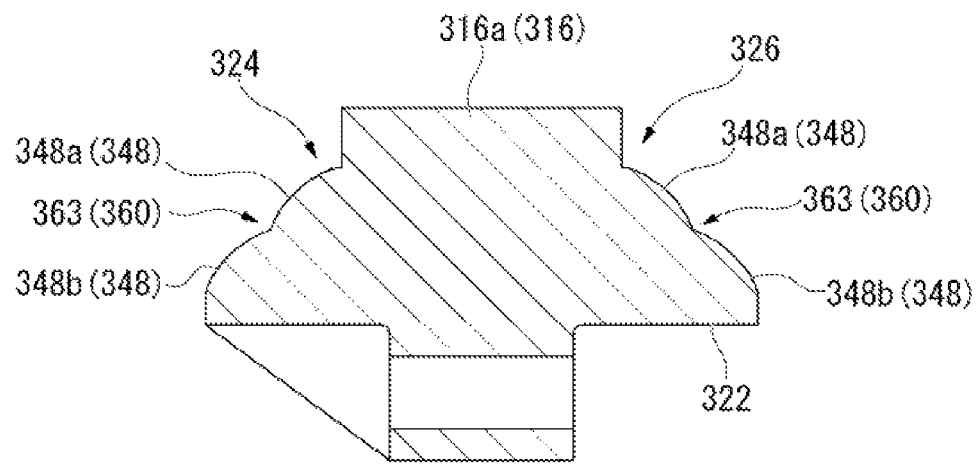
FIG. 9 is an enlarged sectional view showing the casing to indicate an example relation between a groove and a crush allowance of the inner sliding surface in the sixth embodiment.
Figure 10:
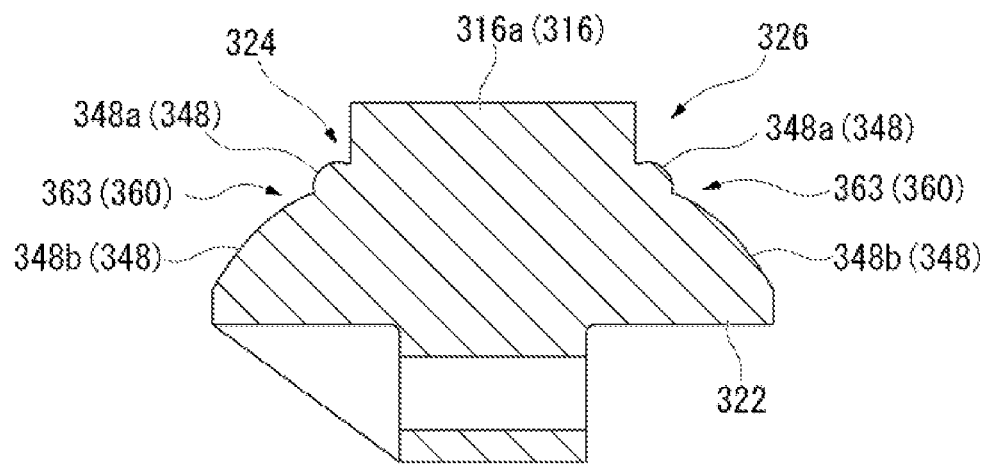
FIG. 10 is a sectional view showing the casing to indicate an example relation between the groove and the crush allowance of the inner sliding surface in the sixth embodiment.

Furthermore, the features of the present embodiment shown in FIG. 8 can be combined with, for example, the features of the fifth embodiment shown in FIG. 7. FIG. 9 is an enlarged sectional view showing the casing 322 to indicate a relation between the grooves 360 and the crush allowance of the inner sliding surface 348 in the speed reducer 300 relating to the sixth embodiment. FIG. 10 is a sectional view showing the casing 322 to indicate another example of the relation between the grooves 360 and the crush allowance of the inner sliding surface 348 in the speed reducer 300 relating to the sixth embodiment. Specifically, a plurality of projections to serve as crush allowance having an arc-shaped cross-section are formed on the inner sliding surface 348, and grooves can be formed between the projections.

For example, as shown in FIG. 9, the casing 322 has two parallel ridges running in the circumferential direction and having an arc-shaped cross-section, and the space between the circumferential protrusions can serve as the circumferential grooves 363. The portion of the inner sliding surface 348 that is radially close to the input shaft 312 has curved ridges 348a. In addition, the portion of the inner sliding surface 348 that is radially close to the outer peripheral edge of the casing 322 has curved ridges 348b. The ridges 348a and 348b are formed such that they have substantially the same curvature in the cross-section. Between the ridges 348a and 348b, the circumferential grooves 363 are formed. In this way, a crush allowance can be provided on the inner sliding surface 348, which improves the stability of operation and prevents contamination inside the speed reducer 300.

Alternatively, as shown in FIG. 10, the curvature of the ridges 348a in the cross-section can be greater than that of the ridges 348b in the cross-section. In this way, the circumferential grooves 363 can be formed at a position further closer to the input shaft 312 in the radial direction.

In the sixth embodiment shown in FIGS. 8 to 10, the grooves 360 are formed on the inner sliding surface 348 of the casing 322. The grooves, however, can be formed on the outer sliding surface 349, for example. In this case, the outer sliding surface 349 is preferably made of metals, instead of resin. This means that the inner sliding surface 348 can be made of resin. In other words, as in the second embodiment shown in FIG. 3, the carriers 318 and 320 can have metal rings provided thereon, and the outer sliding surface 349 can have grooves formed therein.

Seventh Embodiment

Figure 11:
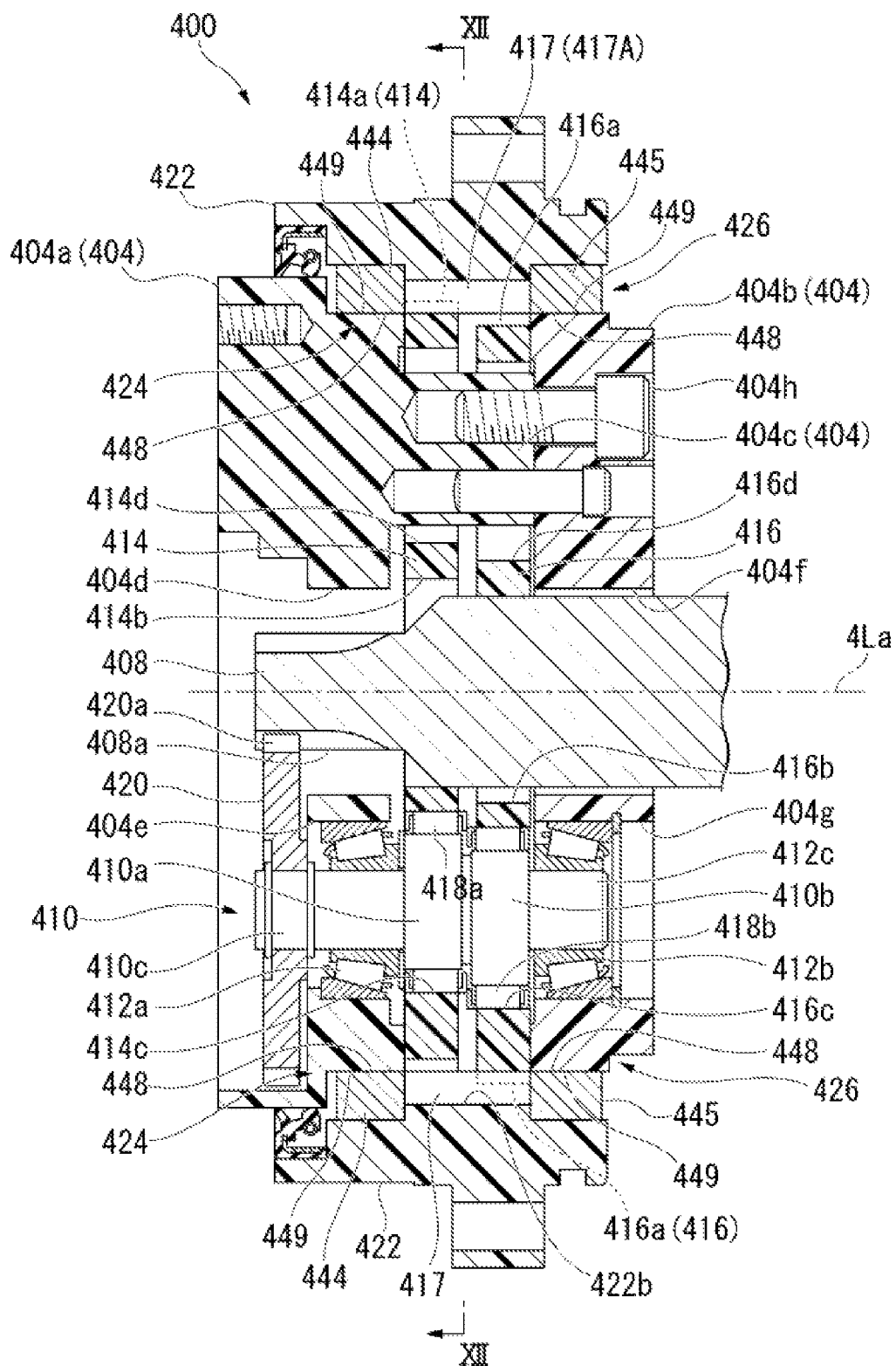
FIG. 11 is a sectional view showing a speed reducer relating to a seventh embodiment of the present disclosure along a main axis.
Figure 12:
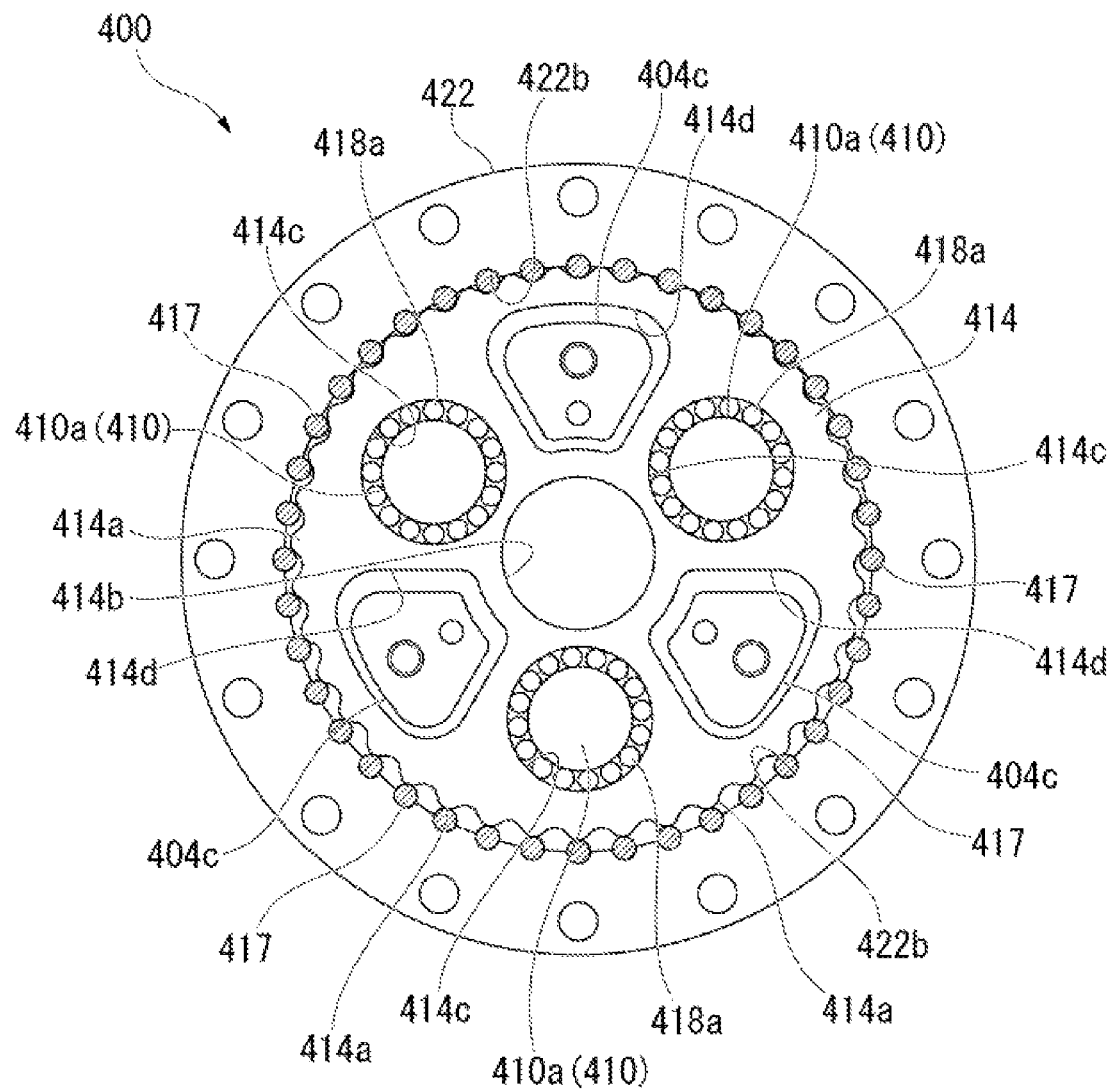
FIG. 12 is a sectional view along a line XII-XII in FIG. 11.

The following describes a speed reducer relating to a seventh embodiment of the disclosure with reference to the accompanying drawings. FIG. 11 is a sectional view showing the speed reducer relating to the seventh embodiment along the axial direction. FIG. 12 is a sectional view along the line XII-XII in FIG. 11. In FIGS. 11 and 12, the reference numeral 400 indicates the speed reducer.

The eccentric oscillation speed reducer 400 relating to the present embodiment is applied as a speed reducer to, for example, swivels of robots such as revolving drums and arm joints and swivels of various types of machine tools such as collaborative robots. The speed reducer 400 rotates, for example, at speeds from 80 rpm to 200 rpm, when used.

In the speed reducer 400 of the present embodiment, as shown in FIGS. 11 and 12, as an input shaft 408 is rotated, a crankshaft (eccentric body) 410 is rotated. In response to the rotation of eccentric portions 410a and 410b of the crankshaft 410, the first and second external gears 414 and 416 are oscillatorily rotated. In this way, the input rotation is slowed down, and the reduced rotations can be output.

The speed reducer 400 includes a casing (outer tube) 422, a carrier 404, an input shaft 408, a plurality of (for example, three) crankshafts 410, a first external gear 414, a second external gear 416 and a plurality of (for example, three) transmission gears 420.

The casing 422 forms the outer surface of the speed reducer 400 and has a substantially cylindrical shape. A large number of pin grooves 422b are formed on the inner peripheral surface of the casing 422. Each pin groove 422b extends in the axial direction of the casing 422 and has a semicircular sectional shape when cut along the plane orthogonal to the axial direction. The pin grooves 422b are arranged at regular intervals and next to each other in the circumferential direction on the inner peripheral surface of the casing 422.

The casing 422 has a large number of internal tooth pins (outer pins) 417. Each internal tooth pin 417 is attached in a corresponding one of the pin grooves 422b. More specifically, each internal tooth pin 417 is fitted in the corresponding pin groove 422b and retained therein such that it extends in the axial direction of the casing 422. In this manner, the internal tooth pins 417 are at equal intervals in the circumferential direction of the casing 422. The internal tooth pins 417 mesh with first external teeth 414a of the first external gear 414 and second external teeth 416a of the second external gear 416. The internal tooth pins 417 form an internal gear 417A.

The carrier 404 is housed within the casing 422 while being aligned with the casing 422. The carrier 404 is rotatable relative to the casing 422 about the same axis. Specifically, the carrier 404 is positioned inside the casing 422 in the radial direction. The carrier 404 is supported by first and second main bearings 424 and 426, which are spaced away from each other in the axial direction, on the casing 422 such that the carrier 404 and the casing 422 are rotatable relative to each other. In the following description, the first and second main bearings 424 and 426 may be simply referred to as the main bearings 424 and 426.

The carrier 404 includes a base and a second carrier (hold flange) 404b. The base has a first carrier (shaft flange) 404a and a plurality of (for example, three) shaft portions 404c.

The first carrier 404a is positioned near one of the ends of the casing 422 in the axial direction. The first carrier 404a has a through hole 404d formed at the radial center thereof. Around the through hole 404d, a plurality of (for example, three) crankshaft mounting holes 404e (hereinafter referred to simply as "mounting holes 404e") are arranged next to each other at equal intervals in the circumferential direction.

The second carrier 404b is positioned away from the first carrier 404a in the axial direction and near the other of the ends of the casing 422 in the axial direction. The second carrier 404b has a through hole 404f formed at the radial center thereof. Around the through hole 404f, a plurality of (for example, three) crankshaft mounting holes 404g (hereinafter referred to simply as "mounting holes 404g") are provided. The mounting holes 404g are positioned correspondingly to the mounting holes 404e formed in the first carrier 404a. Inside the casing 422, a closed space (internal space) is defined by the inner surfaces of the second and first carriers 404b and 404a and the inner peripheral surface of the casing 422.

The three shaft portions 404c are integrated with the first carrier 404a. The shaft portions 404c extend linearly from one of the main surfaces (the inner main surface) of the first carrier 404a toward the second carrier 404b. The three shaft portions 404c are arranged next to each other at equal intervals in the circumferential direction (see FIG. 12). The shaft portions 404c are fastened to the second carrier 404b with bolts 404h (see FIG. 11). In this manner, the first carrier 404a, the shaft portions 404c and the second carrier 404b are integrated with each other.

The first and second carriers 404a (shaft flange) and 404b (hold flange) are rotatably supported by the casing 422 via the first and second main bearings 424 and 426. The first carrier 404a is rotatably supported by the casing 422 via the first main bearing 424. The second carrier 404b is rotatably supported by the casing 422 via the second main bearing 426. The casing 422 has a first metal ring 444 located on the first carrier 404a side in the axial direction of the input shaft 408 and a second metal ring 445 located on the second carrier 404b side in the axial direction of the input shaft 408. The first and second metal rings 444 and 445 are integrated into the casing 422.

The casing 422 has a depression for housing therein the first metal ring 444. The first metal ring 444 is housed within the depression formed in the casing 422 in the axial direction. The first metal ring 444 serves as the outer ring of the first main bearing 424. The outer periphery of the first metal ring 444 is connected to the inner periphery of the casing 422.

The first metal ring 444, which serves as the outer ring of the first main bearing 424, is located on the front end side of the input shaft 408 in the axial direction. The inner peripheral surface of the first metal ring 444 constitutes an inner sliding surface 448 serving as an outer ring. The inner sliding surface 448 is in contact with the outer peripheral surface of the first carrier 404a. The first metal ring 444 is firmly fitted onto the casing 422, and the fit can be, for example, a clearance fit, an interference fit or a transition fit. The clearance may be determined by the difference in thermal expansion coefficient.

The casing 422 has a depression for housing therein the second metal ring 445. The second metal ring 445 is housed within the depression formed in the casing 422 in the axial direction. The second metal ring 445 serves as the outer ring of the second main bearing 426. The outer periphery of the second metal ring 445 is connected to the inner periphery of the casing 422.

The second metal ring 445, which serves as the outer ring of the second main bearing 426, is located on the base end side of the input shaft 408 in the axial direction. The inner peripheral surface of the second metal ring 445 constitutes an inner sliding surface 448 serving as the outer ring. The inner sliding surface 448 is in contact with the outer peripheral surface of the second carrier 404b. The second metal ring 445 is firmly fitted onto the casing 422, and the fit can be, for example, a clearance fit, an interference fit or a transition fit. The clearance may be determined by the difference in thermal expansion coefficient.

The first main bearing 424 is sandwiched between the first carrier 404a and the casing 422. The second main bearing 426 is sandwiched between the second carrier 404b and the casing 422. The main bearings 424 and 426 of the present embodiment are plain bearings. The main bearings 424 and 426 have the inner sliding surface 448 serving as the outer ring and an outer sliding surface 449 serving as the inner ring. The outer sliding surface 449 is formed on the outer peripheral surface of the first and second carriers 404a and 404b.

The inner sliding surface 448, which is formed on the first and second metal rings 444 and 445, and the outer sliding surface 449 are positioned at substantially the same distance in the radial direction as are the internal tooth pins 417. As shown in FIGS. 11 and 12, the first and second metal rings 444 and 445 are both in contact with the internal tooth pins 417 in the direction extending along the central axis (main axis) 4La of the input shaft 408. Since the first and second metal rings 444 and 445 and the internal tooth pins 417 are in contact with each other in the axial direction, the speed reducer 400 can keep the strength along the entire length of the casing 422 in the axial direction.

The input shaft 408 serves as an input part to which a driving force of a driving motor (not shown) is input. The input shaft 408 is inserted through the through hole 404f in the second carrier 404b and the through hole 404d in the first carrier 404a. The input shaft 408 is disposed such that the central axis 4La is aligned with the axis of the casing 422 and the carrier 404 and rotatable around the axis. An input gear 408a is provided on the outer peripheral surface of the front end of the input shaft 408.

The three crankshafts 410 are arranged, within the casing 422, at regular intervals around the input shaft 408 (see FIG. 12). The crankshafts 410 are each supported by a pair of crank bearings 412a and 412b such that they are rotatable about an axis relative to the carrier 404 (see FIG. 11). More specifically, a first crank bearing 412a is mounted on a portion of each crankshaft 410 that is at a predetermined distance from one of the ends of the crankshaft 410 in the axial direction inwardly in the axial direction. The first crank bearings 412a are mounted in the mounting holes 404e in the first carrier 404a. A second crank bearing 412b is attached to the other end of each crankshaft 410 in the axial direction. The second crank bearings 412b are mounted in the mounting holes 404g in the second carrier 404b. In this manner, the crankshafts 410 are rotatably supported by the first and second carriers 404a and 404b.

Each crankshaft 410 has a shaft body 412c and eccentric portions 410a and 410b integrated with the shaft body 412c. The first and second eccentric portions 410a and 410b are arranged next to each other in the axial direction between the crank bearings 412a and 412b. The first and second eccentric portions 410a and 410b are each shaped like a circular cylinder. The first and second eccentric portions 410a and 410b project radially outward from the shaft body 412c as they are arranged eccentrically to the axis of the shaft body 412c. The first and second eccentric portions 410a and 410b are arranged with predetermined eccentricities from the axis and have a phase difference of a predetermined angle from each other.

One of the ends of each crankshaft 410, specifically, the portion mounted in the mounting hole 404e in the first carrier 404a has a mating portion 410c to which the transmission gear 420 is mounted.

The first external gear 414 is located in the closed space within the casing 422 and is attached to the first eccentric portion 410a of each crankshaft 410 via a first roller bearing 418a. As each crankshaft 410 rotates, the first eccentric portion 410a eccentrically rotates. The eccentric rotation results in the first external gear 414 oscillatorily rotating while meshing with the internal tooth pins 417.

The first external gear 414 is sized such that it is slightly smaller than the inner diameter of the casing 422. The first external gear 414 has first external teeth 414a, a central through hole 414b, a plurality of (for example, three) first eccentric portion insertion holes 414c, and a plurality of (for example, three) shaft portion insertion holes 414d. The first external teeth 414a are shaped like smooth and continuous waves along the entire circumference of the external gear 414.

The central through hole 414b is provided at the center of the first external gear 414 in the radial direction. The central through hole 414b receives therein the input shaft 408 with a clearance therebetween.

The three first eccentric portion insertion holes 414c are arranged at regular intervals next to each other in the circumferential direction around the central through hole 414b in the first external gear 414. Each first eccentric portion insertion hole 414c receives therein the first eccentric portion 410a of each crankshaft 410 via the first roller bearing 418a.

The three shaft portion insertion holes 414d are arranged at regular intervals next to each other in the circumferential direction around the central through hole 414b in the first external gear 414. The shaft portion insertion holes 414d are positioned between the three first eccentric portion insertion holes 414c in the circumferential direction. Each shaft portion insertion hole 414d receives therein a corresponding one of the shaft portions 404c with a clearance therebetween.

The second external gear 416 is located in the closed space within the casing 422 and is attached to the second eccentric portion 410b of each crankshaft 410 via a second roller bearing 418b. The first and second external gears 414 and 416 are next to each other in the axial direction correspondingly to the first and second eccentric portions 410a and 410b. As each crankshaft 410 rotates, the second eccentric portion 410b eccentrically rotates. The eccentric rotation results in the second external gear 416 oscillatorily rotating while meshing with the internal tooth pins 417.

The second external gear 416 is sized such that it is slightly smaller than the inner diameter of the casing 422 and configured in the same manner as the first external gear 414. In other words, the second external gear 416 has second external teeth 416a, a central through hole 416b, a plurality of (for example, three) second eccentric portion insertion holes 416c, and a plurality of (for example, three) shaft portion insertion holes 416d. These are configured in the same manner as the first external teeth 414a, the central through hole 414b, the first eccentric portion insertion holes 414c, and the shaft portion insertion holes 414d Each second eccentric insertion hole 416c receives therein the second eccentric portion 410b of each crankshaft 410 via the second roller bearing 418b.

Each transmission gear 420 transmits the rotation of the input gear 408a to the corresponding one of the crankshafts 410. Each of the transmission gears 420 is fitted onto the mating portion 410c, which is provided on one of the ends of the shaft body 412c of the corresponding crankshaft 410. Each transmission gear 420 is rotatable integrally with the crankshaft 410 around the same axis as the crankshaft 410. Each of the transmission gears 420 has external teeth 420a that mesh with the input gear 408a.

The following describes the materials used to make the constituents of the speed reducer 400 relating to the present embodiment shown in FIGS. 11 and 12.

In the speed reducer 400 relating to the present embodiment, the carrier 404 and the casing 422 are made of resin so that the speed reducer 400 can have a reduced weight. The inner sliding surface 448 serving as the outer ring of the main bearings 424 and 426 is made of a material having a higher thermal conductivity than the resin making the first and second carriers 404a and 404b forming the outer sliding surface 449 serving as the inner ring.

Any material can be used to make the metal rings 444 and 445 serving as the outer ring of the main bearings 424 and 426 as long as the material exhibits a higher thermal conductivity than the resin of the carrier 404 serving as the inner ring and a higher strength than the resin of the carrier 404. The material can be a metal material, a non-metal material or the like. The metal rings 444 and 445 relating to the present embodiment may be made of copper- or aluminum-based metals or alloys, or iron-based metals such as bearing steel and stainless steel. The internal tooth pins 417 may be made of the same material as the metal rings 444 and 445. The input shaft 408, the crankshafts 410, the first roller bearings 418a, the second roller bearings 418b, the first crank bearings 412a, the second crank bearings 412b, the transmission gears 420 and the like may be formed from the same material as the metal rings 444 and 445. Furthermore, the first and second external gears 414 and 416 may be made of the same material as the carrier 404.

In the speed reducer 400 relating to the present embodiment, the main bearings 424 and 426 have no heavy and metal constituents heavier than resins, except for the metal rings 444 and 445. Thus, the speed reducer 400 can achieve further weight reduction.

According to the above arrangement of the present embodiment, the heat transferred to the first and second metal rings 444 and 445 can be dissipated outside through the main bearings 424 and 426, which are sliding bearings. Therefore, the speed reducer 400 can achieve improved heat dissipation. Due to the improved heat dissipation, the inner and outer sliding surfaces 448 and 449 can be saved from excessive temperature rise, which may melt the resin of the surfaces or cause the surfaces to stick to each other. In this manner, the speed reducer 400 can be prevented from failing. This can accordingly prevent the heat from being contained in the speed reducer 400, thereby preventing problems to occur.

On the inner periphery of the casing 422, the first metal ring 444, the internal tooth pins 417 and the second metal ring 445, which are made of metals, are arranged adjacent to each other in the axial direction and in contact with each other. This arrangement can contribute to maintain the strength of the casing 422 along the entire length in the axial direction. In this manner, the speed reducer 400 can be prevented from failing and maintain sufficient strength. In addition, the above arrangement can prevent a rise in the surface pressure of the tooth flanks of the external gears 414 and 416, thereby reducing a loss in the lifetime of the external gears 414 and 416.

The present embodiment is not limited to the above, and can be modified and improved in various manners within a spirit of the invention. For example, while two oscillating external gears 414 and 416 are provided in the present embodiment, the present embodiment is not limited to such. For example, one or three or more external gears may be alternatively provided.

In the present embodiment, the input shaft 408 is provided at the center of the carrier 404, and the crankshafts 410 are arranged to surround the input shaft 408. The present embodiment, however, is not limited to such. For example, it may also be possible to adopt a center crank type gear device in which the crankshafts 410 are arranged at the center of the carrier 404. In this case, the input shaft 408 may be located at any position as long as the input shaft 408 can mesh with the transmission gears 420 mounted on the crankshafts 410.

According to the foregoing illustrative description, the casing 422 and the carrier 404 are made of resin, and the metal rings 444 and 445 are made of metals such as aluminum alloys in the present embodiment. As an alternative example, the casing 422 can be made of metals, and the carrier 404 can be made of metals. In this case, the metals can be aluminum alloys, but the present embodiment is not limited to such. The constituents of the speed reducer 400 can be made of any appropriately selected one of the materials that can achieve light weight and sufficient rigidity as long as the inner and outer sliding surfaces 448 and 449 are made of different materials such as resin and metals.

Furthermore, the speed reducer 400 relating to the present embodiment can produce the same effects as the speed reducers relating to the above-described embodiments.

Eighth Embodiment

Figure 13:
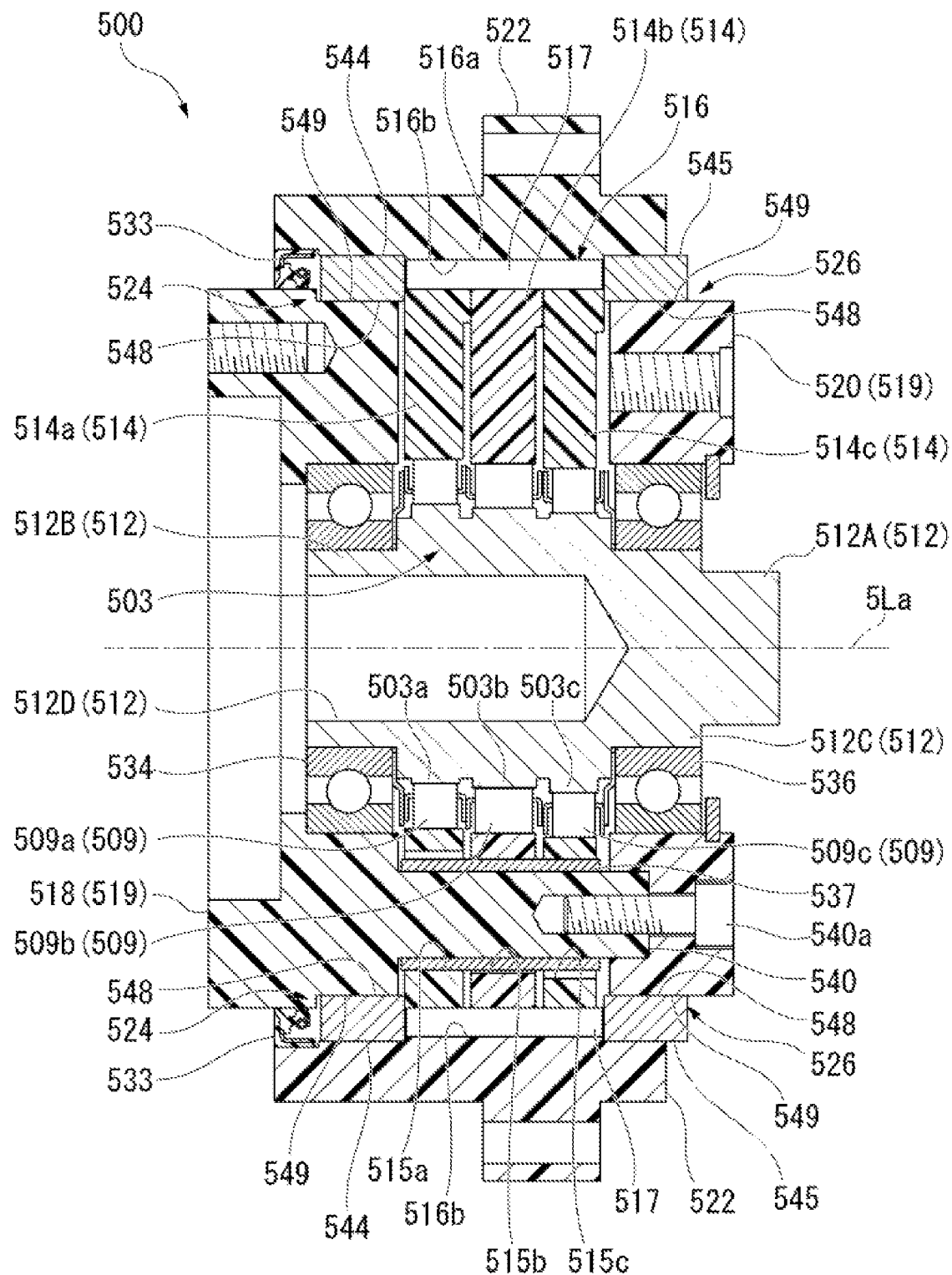
FIG. 13 is a sectional view showing a speed reducer relating to an eighth embodiment of the present disclosure along a main axis.

The following describes a speed reducer relating to an eighth embodiment of the disclosure with reference to the accompanying drawings. FIG. 13 is a sectional view showing the speed reducer relating to the eighth embodiment along a direction extending along a main axis. In FIG. 13, the reference numeral 500 indicates the speed reducer.

The speed reducer 500 of the present embodiment is an eccentric oscillation type and includes an input shaft (an eccentric body) 512, eccentric portions 503, external gears 514 corresponding to the eccentric portions 503, eccentric portion bearings 509, a carrier 519, and an internal gear 516 as shown in FIG. 13.

The input shaft 512 has an opening 512D at the output-side end thereof in the axial direction extending along a central axis (the main axis) 5La, as shown in FIG. 13. The input shaft 512 has a protrusion 512A at the input-side end thereof in the axial direction, with which a motor (not shown) is capable of engaging. The input shaft 512 is situated at the radial center of the speed reducer 500. The input shaft 512 has a supporting portion 512B formed at a position close to the output-side end and a supporting portion 512C formed at a position close to the input-side end.

The input shaft 512 is supported by the carrier 519 via a pair of bearings 534 and 536. The bearing 534 is aligned with the supporting portion 512B and supports the input shaft 512. The bearing 536 is aligned with the supporting portion 512C and supports the input shaft 512. The rolling elements of the bearings 534 and 536 are balls. The rolling elements provide a gap (clearance), which is not shown, between the inner ring and the outer ring. The input shaft 512 has the eccentric portions 503 integrated therewith, which are sandwiched between the bearings 534 and 536. With such arrangement, the input shaft 512 can serve as an eccentric shaft. In the direction extending along the central axis 5La, the output side refers to the direction from the eccentric portions 503 to the bearing 534. In the direction extending along the central axis 5La, the input side refers to the direction from the eccentric portions 503 to the bearing 536.

The eccentric portions 503 include a first eccentric portion 503a, a second eccentric portion 503b and a third eccentric portion 503c. The three or first, second and third eccentric portions 503a, 503b and 503c are arranged next to each other in the direction extending along the central axis 5La. The first and third eccentric portions 503a and 503c (the two outer eccentric portions) are spaced apart along the central axis 5La. Between the first and third eccentric portions 503a and 503c, the second eccentric portion (inner eccentric portion) 503b is placed. In other words, in the direction extending along the central axis 5La, the first eccentric portion 503a and the third eccentric portion 503c sandwich the second eccentric portion 503b therebetween.

The centers of the three eccentric portions 503a, 503b and 503c are eccentric to the central axis 5La of the input shaft 512 by the same amount. The three eccentric portions 503a, 503b and 503c are arranged with a phase difference of 120 degrees in terms of eccentricity, which is obtained by dividing 360 degrees by three or the number of eccentric portions 503a, 503b and 503c. The maximum eccentric positions of the eccentric portions 503a, 503b and 503c, where their radial dimension relative to the central axis 5La takes the largest value, are positioned differently from each other in the circumferential direction centered on the central axis 5La.

Specifically, in the clockwise (counter-clockwise) direction centered around the central axis 5La of the input shaft 512, relative to the maximum eccentric position of the first eccentric portion 503a, the maximum eccentric position of the second eccentric portion 503b is 120 degrees away. Furthermore, the maximum eccentric position of the third eccentric portion 503c is 120 degrees away relative to the maximum eccentric position of the second eccentric portion 503b. In addition, the maximum eccentric position of the first eccentric portion 503a is 120 degrees away from the maximum eccentric position of the third eccentric portion 503c.

The eccentric portion bearings 509 are arranged around the outer periphery of the eccentric portions 503 and are configured to transmit the eccentric rotation of the eccentric portions 503. The eccentric portion bearings 509 include a first eccentric portion bearing 509a, a second eccentric portion bearing 509b and a third eccentric portion bearing 509c, which are corresponding to the eccentric portions 503a, 503b and 503c. The three eccentric portion bearings 509a, 509b and 509c each have a roller and a retainer that restricts the roller in the circumferential direction. None of the three eccentric portion bearings 509a, 509b and 509c have inner or outer rings. Note that the term "roller" includes "needle roller" as used herein.

The external gears 514 are attached to the outer periphery of the eccentric portions 503 via the eccentric portion bearings 509. The eccentric portions 503 cause the external gears 514 to oscillatorily rotate. The external gears 514 include a first external gear 514a, a second external gear 514b and a third external gear 514c, which are corresponding to the eccentric portions 503a, 503b and 503c.

The three external gears 514a, 514b and 514c respectively include a plurality of inner pin holes 515a, 515b and 515c. The inner pin holes 515a, 515b and 515c penetrate the external gears 514a, 514b and 514c, respectively. In the external gears 514a, 514b and 514c, inner pins 540 with rotatable inner rollers 537 are fitted with a clearance.

The carrier 519 includes a first carrier (shaft flange) 518 and a second carrier (hold flange) 520. The first carrier 518 has the inner pins 540 integrated therewith. The first and second carriers 518 and 520 are coupled together using bolts 540a to form a single part. The bolts 540a are screwed in from the outside of the second carrier 520 and coupled to the inner pins 540.

The first carrier 518 is located on the output side with respect to the first external gear 514a. The second carrier 520 is located on the input side with respect to the third external gear 514c. The carrier 519 is supported on the casing 522 via the first and second main bearings 524 and 526. The first carrier 518 is supported by the casing 522 via a first main bearing 524. The second carrier 520 is supported by the casing 522 via a second main bearing 526. In the following description, the first and second main bearings 524 and 526 may be simply referred to as the main bearings 524 and 526.

The main bearings 524 and 526 are both plain bearings constituted by an inner sliding surface 548 and an outer sliding surface 549. The main bearings 524 and 526 respectively have first and second metal rings 544 and 545. In the following description, the first and second metal rings 544 and 545 may be simply referred to as the metal rings 544 and 545. The main bearing 524 has the first metal ring 544. The second main bearing 526 has the second metal ring 545. The first metal ring 544 is positioned on the output side with respect to the casing 522. The second metal ring 545 is positioned on the input side with respect to the casing 522. The first and second metal rings 544 and 545 are integrated into the casing 522.

The outer periphery of the first metal ring 544 is fixedly attached to the inner periphery of the casing 522. The casing 522 has a depression on the inner periphery thereof for receiving therein the first metal ring 544. The first metal ring 544 is housed within the depression formed in the casing 522 in the axial direction. The first metal ring 544 serves as the outer ring of the first main bearing 524.

The first metal ring 544, which serves as the outer ring of the first main bearing 524, is provided on the casing 522 on the output side. The inner peripheral surface of the first metal ring 544 constitutes the inner sliding surface 548 serving as the outer ring. The inner sliding surface 548 is in contact with the first carrier (shaft flange) 518. The first metal ring 544 is firmly fitted onto the casing 522, and the fit can be, for example, a clearance fit, an interference fit or a transition fit. The clearance may be determined by the difference in thermal expansion coefficient.

The outer periphery of the second metal ring 545 is fixedly attached to the inner periphery of the casing 522. The casing 522 has a depression on the inner periphery thereof for receiving therein the second metal ring 545. The second metal ring 545 protrudes beyond the depression formed in the casing 522 toward the input side in the direction extending along the central axis 5La. The second metal ring 545 serves as the outer ring of the second main bearing 526.

The second metal ring 545, which serves as the outer ring of the second main bearing 526, is provided on the casing 522 on the input side. The second metal ring 545 is exposed on the input side of the casing 522. The inner peripheral surface of the second metal ring 545 constitutes the inner sliding surface 548 serving as the outer ring. The inner sliding surface 548 is in contact with the second carrier (hold flange) 520. The second metal ring 545 is firmly fitted onto the casing 522, and the fit can be, for example, a clearance fit, an interference fit or a transition fit. The clearance may be determined by the difference in thermal expansion coefficient.

The first main bearing 524 is arranged between the first carrier 518 and the casing 522. The second main bearing 526 is arranged between the second carrier 520 and the casing 522. The main bearings 524 and 526 have the outer sliding surface 549 serving as the inner ring. The outer sliding surface 549 is in contact with the inner sliding surface 548. The outer sliding surface 549 is formed on the outer peripheral surface of the carriers 518 and 520. The outer sliding surface 549 is movable while remaining slidable against the inner sliding surface 548 formed on the inner peripheral surface of the metal rings 544 and 545.

As for the main bearings 524 and 526, the inner ring is the outer sliding surface 549, which is formed on the carriers 518 and 520, and the outer ring is the inner sliding surface 548, which is formed on the metal rings 544 and 545. The metal rings 544 and 545 are supported on the inner periphery of the casing 522.

The inner and outer sliding surfaces 548 and 549 formed on the first and second metal rings 544 and 545 are positioned at substantially the same distance in the radial direction as are outer pins (internal tooth pins) 517. The first and second metal rings 544 and 545 are both in contact with the internal tooth pins 517 in the direction extending along the central axis 5La of the input shaft 512. Since the first and second metal rings 544 and 545 and the internal tooth pins 517 are in contact with each other in the direction extending along the central axis 5La, the speed reducer 500 can keep the strength along the entire length of the casing 522 in the direction extending along the central axis 5La.

The inner sliding surface 548 serving as the outer ring of the main bearings 524 and 526 is made of a material having a higher thermal conductivity than the resin making the carriers 518 and 520 forming the outer sliding surface 549 serving as the inner ring.

Any material can be used to make the metal rings 544 and 545 serving as the outer ring of the main bearings 524 and 526 as long as the material exhibits a higher thermal conductivity than the resin of the carrier 518 and 520 serving as the inner ring and a higher strength than the resin of the carriers 518 and 520. The material can be a metal material, a non-metal material or the like. The metal rings 544 and 545 relating to the present embodiment may be made of copper- or aluminum-based metals, or iron-based metals such as bearing steel.

The internal gear 516 includes the internal tooth pins 517 shaped like a circular cylinder and an internal gear body 516a having pin grooves 516b formed therein for rotatably supporting the internal tooth pins 517. The internal gear body 516a is integrated with the casing 522. There is a small difference in the number of teeth between the internal gear 516 and the first external gear 514a. There is a small difference in the number of teeth between the internal gear 516 and the second external gear 514b. There is a small difference in the number of teeth between the internal gear 516 and the third external gear 514c. An oil seal 533 is disposed between the casing 522 and the first carrier 518 and outside the metal ring 544.

As a motor, which is not shown, is driven, the input shaft 512 resultantly rotates. As a result, the eccentric portions 503 provided on the outer periphery of the input shaft 512 eccentrically rotate integrally with the input shaft 512. The rotation of the eccentric portions 503 causes the external gears 514a, 514b and 514c, which correspond to the eccentric portions 503a, 503b and 503c, to attempt to oscillatorily rotate around the input shaft 512. Here, the external gears 514a, 514b and 514c are restricted by the internal gear 516 from rotating on their own axis and are thus only allowed to oscillate while keeping in contact with the internal gear 516.

The inner pin holes 515a, 515b and 515c and the inner pins 540 (and the inner rollers 537) absorb the oscillation component. As a result, the first, second and third external gears 514a, 514b and 514c rotate relative to the internal gear 516, which is stationary, by the amount determined by the difference in the number of teeth between the external gears 514a, 514b and 514c and the internal gear 516. In other words, it is only the component of the rotation on their own axis resulting from the difference in the number of teeth between the first to third external gears 514a to 514c and the internal gear 516 that is transmitted to the carrier 519.

The following describes the materials used to make the constituents of the speed reducer 500 relating to the present embodiment shown in FIG. 13.

In the speed reducer 500 relating to the present embodiment, the carrier 519, the casing 522, the first external gear 514a, the second external gear 514b, and the third external gear 514c are made of resin so that the speed reducer 500 can have a reduced weight. The inner sliding surface 548 serving as the outer ring of the main bearings 524 and 526 may be made of a material having a higher thermal conductivity than the resin making the first and second carriers 518 and 520 forming the outer sliding surface 549 serving as the inner ring.

Any material can be used to make the metal rings 544 and 545 serving as the outer ring as long as the material exhibits a higher thermal conductivity than the resin of the carrier 519 serving as the inner ring and a higher strength than the resin of the carrier 519. The material can be a metal material, a non-metal material or the like. The metal rings 544 and 545 relating to the present embodiment may be made of copper- or aluminum-based metals or alloys, or iron-based metals such as bearing steel and stainless steel. The internal tooth pins 517 may be made of the same material as the metal rings 544 and 545. The input shaft 512, the eccentric portion bearings 509 and the bearings 534 and 536 may be made of the same material as the metal rings 544 and 545.

In the speed reducer 500 relating to the present embodiment, the main bearings 524 and 526 have no heavy and metal constituents heavier than resin, except for the metal rings 544 and 545. Thus, the speed reducer 500 can achieve further weight reduction.

According to the above arrangement of the present embodiment, the heat transferred to the first and second metal rings 544 and 545 can be dissipated outside through the main bearings 524 and 526, which are sliding bearings. Accordingly, the speed reducer 500 can accomplish improved heat dissipation. Due to the improved heat dissipation, the inner and outer sliding surfaces 548 and 549 can be saved from excessive temperature rise, which may melt the resin of the surfaces or cause the surfaces to stick to each other. In this manner, the speed reducer 500 can be prevented from failing. This can accordingly prevent the heat from being contained in the speed reducer 500, thereby preventing problems to occur.

On the inner periphery of the casing 522, the first metal ring 544, the internal tooth pins 517 and the second metal ring 545, which are made of metals, are arranged adjacent to each other in the axial direction and in contact with each other. This arrangement can contribute to maintain the strength of the casing 522 along the entire length in the axial direction. This can prevent the failure of the speed reducer 500 and maintain sufficient strength.

In the present embodiment shown in FIG. 13, the first carrier 518 serves as an output shaft to a destination machine, which is not shown. The carrier 519 includes the second carrier 520, so that the inner pins 540 are held on both sides, but the carrier 519 may be configured to hold the inner pins on one side. Furthermore, three or more eccentric portions are arranged with a phase difference of 360 degrees/(number of eccentric portions) in terms of eccentricity, but the present embodiment is not limited to such. Furthermore, the present embodiment is not limited to such a configuration that the length in the axial direction of the two outer ones of the three or more eccentric portions that are positioned outermost in the axial direction is less than the length in the axial direction of the inner eccentric portion that is positioned inside the outer eccentric portions.

The speed reducer 500 relating to the present embodiment can produce the same effects as the speed reducers relating to the above-described embodiments.

Ninth Embodiment

Figure 14:
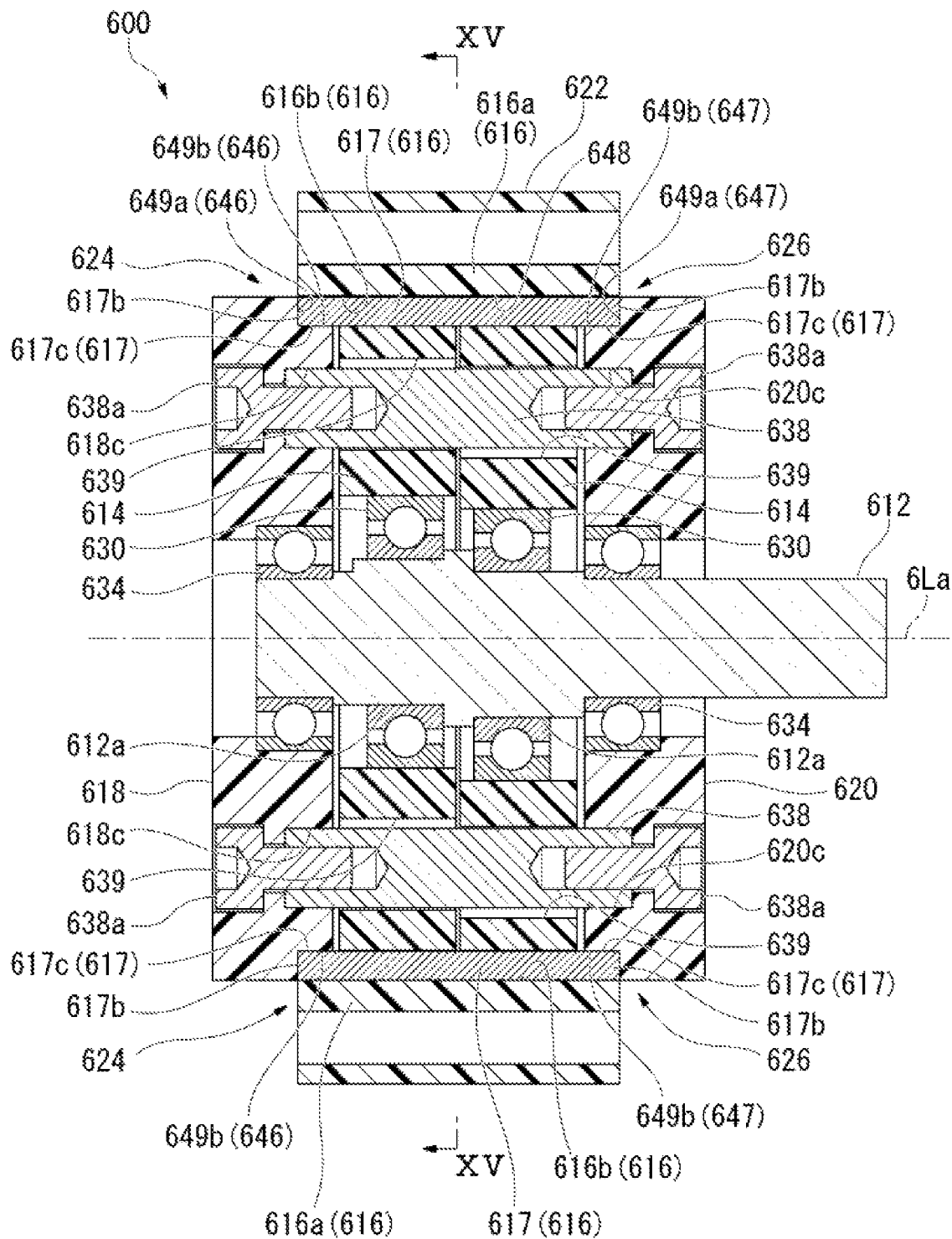
FIG. 14 is a sectional view showing a speed reducer relating to a ninth embodiment of the present disclosure along a main axis.
Figure 15:
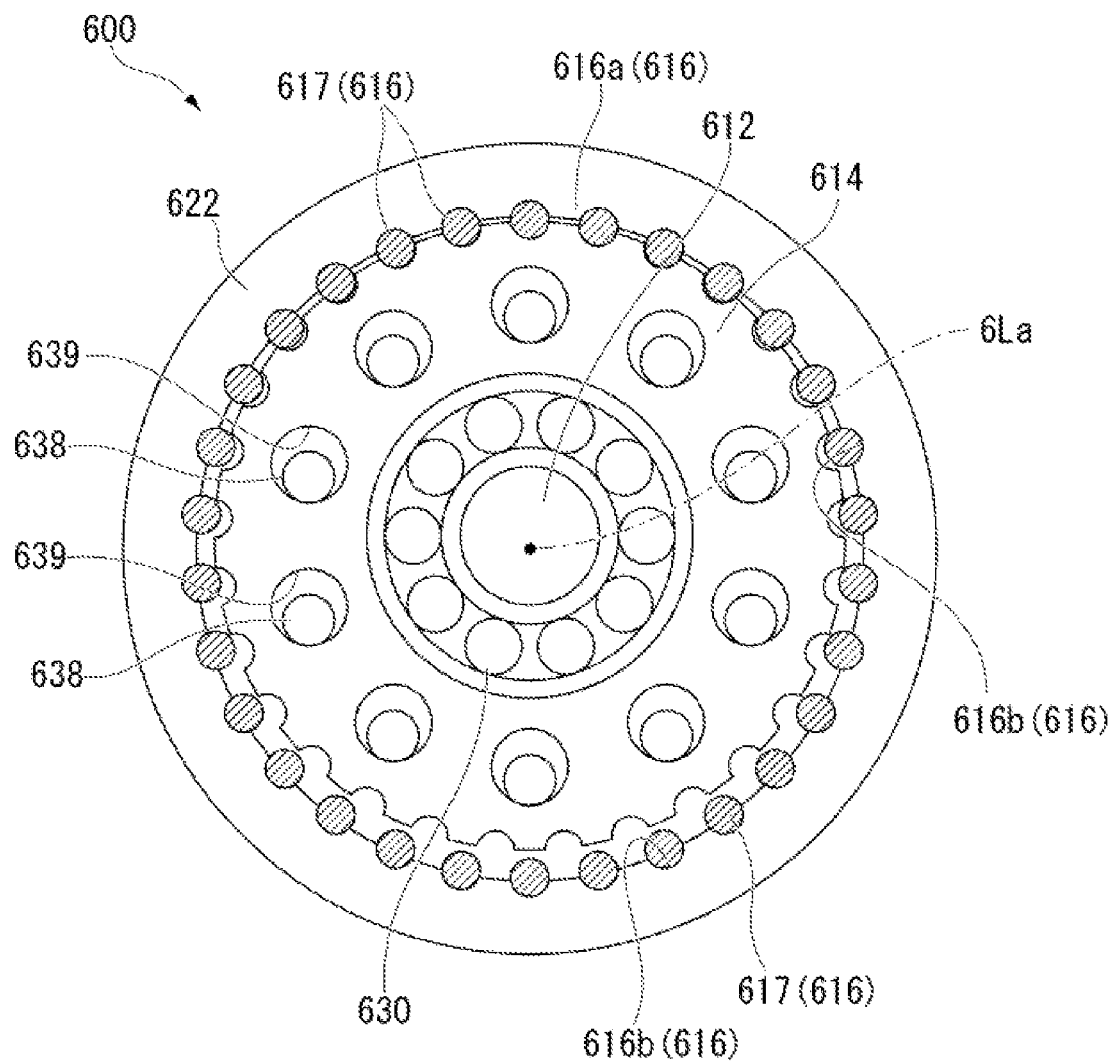
FIG. 15 is a sectional view along a line XV-XV in FIG. 14.

The following describes a speed reducer relating to a ninth embodiment of the disclosure with reference to the accompanying drawings. FIG. 14 is a sectional view showing the speed reducer relating to the ninth embodiment along a direction extending along a main axis. FIG. 15 is a sectional view along a line XV-XV in FIG. 14. In FIGS. 14 and 15, the reference numeral 600 indicates the speed reducer.

The speed reducer 600 relating to the ninth embodiment is an eccentric oscillation speed reducer having an external gear and an internal gear meshing with each other. Oscillating the external gear causes one of the internal and external gears to rotate on its own axis, so that the generated rotational component is output to a driven device through an output member.

The speed reducer 600 relating to the ninth embodiment includes, as shown in FIGS. 14 and 15, an input shaft 612, external gears 614, an internal gear 616, a first carrier 618, a second carrier 620, a casing 622, a first main bearing 624, a second main bearing 626 and carrier pins 638. Hereinafter, the expression "axial direction" refers to the direction extending along the central axis (the main axis) 6La of the internal gear 616, and the expressions "circumferential direction" and "radial direction" respectively refer to the circumferential and radial directions of the circle centered on the central axis 6La. In the following description, for convenience, the input side refers to one side in the axial direction (the right side in FIG. 14) and the non-input side or output side refers to the other side (the left side in FIG. 14). In the following description, the first and second carriers 618 and 620 may be simply referred to as the carriers 618 and 620. Furthermore, the first and second main bearings 624 and 626 may be simply referred to as the main bearings 624 and 626.

The input shaft 612 is rotatable around the center line when acted upon by rotational power input from a drive source. The speed reducer 600 relating to the ninth embodiment is, as shown in FIGS. 14 and 15, a center crank type, where the rotational center line of the input shaft 612 is aligned with the center line 6La of the internal gear 616. The drive source is, for example, a motor, a gear motor or an engine.

The input shaft 612 is an eccentric shaft having a plurality of eccentric portions 612a for oscillating the external gears 614. Having such a configuration, the input shaft (eccentric body) 612 is sometimes referred to as a crankshaft. The axial center of the eccentric portions 612a is eccentric to the rotational center line of the input shaft 612. In the present embodiment, two eccentric portions 612a are adjacent to each other on the input shaft 612. The adjacent eccentric portions 612a are 180° out of phase in terms of eccentricity.

The input shaft 612 is supported on the input side by the second carrier 620 via an input shaft bearing 634 and on the non-input side by the first carrier 618 via an input shaft bearing 634. The input shaft 612 is rotatably supported by the first and second carriers 618 and 620. The input shaft bearings 634 are not limited to any particular configurations, but can be, for example, ball bearings with spherical rollers.

The internal gear 616 meshes with the external gears 614. According to the present embodiment, the internal gear 616 includes an internal gear body 616a integrated into the casing 622, and outer pins (internal tooth pins) 617 disposed in pin grooves 616b formed in the internal gear body 616a at intervals in the circumferential direction. The outer pins 617 are cylindrical pin members rotatably supported on the internal gear body 616a. The outer pins 617 have the same radial dimension along the entire length in the axial direction. The outer pins 617 form the internal teeth of the internal gear 616. The number of outer pins 617 (the number of internal teeth) of the internal gear 616 is slightly (in this example, by one) greater than the number of external teeth of the external gear 614.

The internal gear body 616a and the casing 622 are made of resin. Although the internal gear body 616a and the casing 622 can be made of a variety of types of resin, the internal gear body 616a and the casing 622 are made of polyacetal (POM) in this example. The present embodiment, however, is not limited to such, and the internal gear body 616a and the casing 622 may be made of other resin than POM, for example, polyetheretherketone (PEEK).

The resin used to make the internal gear body 616a, the casing 622 and other constituent parts of the present embodiment may be a resin containing reinforcing fibers such as glass or carbon fibers, a resin without reinforcing fibers, a lamination of a base material such as paper or fabric impregnated with a resin. The resin used for the constituent parts of the present embodiment may be a resin having thermally conductive fillers mixed therein.

In the speed reducer 600, the outer pins 617 may be made of a material that has a higher thermal conductivity [W/(m·K)] than the resin material used for the internal gear body 616a.

The outer pins 617 can be made of any material as long as it exhibits higher thermal conductivity and rigidity than the resin used to make the internal gear body 616a and can be made of metal, highly thermally conductive resin, non-metal materials and the like. The outer pins 617 may be, for example, made of a resin having carbon nanotubes (CNTs), boron nitride nanotubes (BNNTs) mixed therein. The outer pins 617 relating to the present embodiment, shown in FIGS. 14 and 15, may be made of iron-based metals such as bearing steel.

The outer pins 617 can be solid or hollow. The outer pins 617 may have a multi-layered structure with a core material being wrapped in a surface material. For example, one of the core and surface materials of the multi-layered structure of the outer pins 617 may be made of iron-based metals, and the other may be made of copper- or aluminum-based metals. Such a structure can eliminate the trade-off between the mechanical and thermal characteristics. As yet another example of the core and surface materials of the multi-layered structure of the outer pins 617, one of them may be made of metals and the other may be made of resin. The outer pins 617 may be made of sintered metals and ceramics.

The external gears 614 are provided in a one-to-one correspondence with the eccentric portions 612a. The external gears 614 are rotatably supported on the eccentric portions 612a via eccentric bearings 630. As shown in FIG. 15, the external gears 614 have a plurality of carrier pin holes (inner pin holes) 639 provided off the central axis of the external gears 614, arranged at equal intervals, and next to each other in the circumferential direction. The carrier pin holes 639 receive therein carrier pins (inner pins) 638. The carrier pin holes 639 all have the same diameter. The radial dimension of the carrier pin holes 639 is greater than the radial dimension of the carrier pins 638.

The external gears 614 are made of resin, like the internal gear body 616a. The external gears 614 can be made of a variety of resin. The external gears 614 are located closer to the input shaft 612 than is the internal gear body 616a. The external gears 614 may be made of, for example, PEEK. The present embodiment, however, is not limited to such, and the external gears 614 may be made of other resin than PEEK, for example, POM.

The carrier pin holes 639 are at the same distance from the center in the radial direction and shaped like a circle. Corrugated teeth are formed on the outer periphery of the external gears 614. The external gears 614 oscillate within a plane to which the central axis 6La is normal, such that the corrugated teeth move while keeping touching the internal gear 616. A gap is provided between the carrier pins 638 and the carrier pin holes 639 to absorb the oscillating component of the external gears 614. The carrier pins 638 partially touch the inner wall surface of the carrier pin holes 639.

The carriers 618 and 620 sandwich the external gears 614 therebetween in the axial direction. The first carrier (shaft flange) 618 is located on the non-input-side lateral portion of the external gears 614. The second carrier (hold flange) 620 is located on the input-side lateral portion of the external gears 614. The first and second carriers 618 and 620 are rotatably supported by the casing 622 via the first and second main bearings 624 and 626. The first carrier (shaft flange) 618 is rotatably supported by the casing 622 via the first main bearing 624. The second carrier (hold flange) 620 is rotatably supported by the casing 622 via the second main bearing 626.

The carriers 618 and 620 are shaped like a disc as a whole. The first carrier 618 rotatably supports the input shaft 612 via the input shaft bearing 634. The second carrier 620 rotatably supports the input shaft 612 via the input shaft bearing 634. The carrier pins (inner pins) 638 are coupled to the first carrier (shaft flange) 618 and to the second carrier (hold flange) 620 with bolts 638a. The bolts 638a are made of rigid materials such as iron-based metals.

The first and second carriers 618 and 620 are coupled to each other via the carrier pins 638. The carrier pins 638 are positioned off the axial center of the external gears 614 in the radial direction and penetrate the external gears 614 in the axial direction. In the present embodiment, the carrier pins 638 are separate parts from the carriers 618 and 620. The present embodiment, however, is not limited to such. As another example, some of the carrier pins 638 may be integrated with the carriers 618 and 620.

One of the first carrier 618 and the casing 622 serves as an output member for outputting rotational power to a driven device, and the other serves as a stationary member fixedly attached to an external member for supporting the speed reducer 600. The output member is rotatably supported on the stationary member via the main bearings 624 and 626. The non-input-side end surface of the first carrier 618 may have a driven member, which is to be rotated by the speed reducer 600, coupled thereto with bolts or the like. Alternatively, the outer peripheral flange of the casing 622 may have a driven member, which is to be rotated by the speed reducer 600, coupled thereto with bolts or the like.

The casing 622 is shaped like a hollow tube as a whole. The internal gear 616 is provided on the inner periphery of the casing 622. A flange or the like may be provided on the outer periphery of the casing 622. The casing 622 has pin grooves 616b supporting the outer pins 617, which extend along the central axis 6La. The outer pins 617 extend beyond the pin grooves 616b in the direction extending along the central axis 6La. In other words, the length of the outer pins 617 in the direction extending along the central axis 6La is greater than the length of the pin grooves 616b in the direction extending along the central axis 6La. The outer pins 617 protrude outward beyond the pin grooves 616b in the direction extending along the central axis 6La.

The carriers 618 and 620 have circumferential recesses 646 and 647 housing therein the protruding portions of the outer pins 617 beyond the pin grooves 616b. The circumferential recesses 646 and 647 are continuous in the circumferential direction of the carriers 618 and 620. The circumferential recesses 646 and 647 have the same sectional shape along the entire length in the circumferential direction. The circumferential recesses 646 and 647 have a rectangular cross-section when cut along the radial direction. The sectional shape of the circumferential recesses 646 and 647 in the radial direction is compatible with the sectional shape of the outer pins 617 in the axial direction. The circumferential recesses 646 and 647 each have a flat annular surface 649a extending along the radial direction and a cylindrical outer peripheral surface 649b connected to the annular surface 649a.

As the carriers 618 and 620 rotate relative to the casing 622 around the central axis 6La, the outer pins 617 protruding beyond the pin grooves 616b are allowed to move in the circumferential direction within the circumferential recesses 646 and 647. The circumferential recesses 646 and 647 formed in the carriers 618 and 620 serve as the inner ring of the main bearings 624 and 626.

The main bearings 624 and 626 have the outer pins 617 and the pin grooves 616b serving as retainers for defining the positions of the outer pins 617 in the circumferential direction. The internal gear body 616a serves as the outer ring of the main bearings 624 and 626. This means that the main bearings 624 and 626 of the present embodiment are plain bearings formed by the outer pins 617. The first main bearing 624 is arranged between the first carrier 618 and the casing 622. The second main bearing 626 is arranged between the second carrier 620 and the casing 622.

The first main bearing 624 is constituted by the pin grooves 616b formed in the casing 622, the outer pins 617 and the circumferential recess 646 provided in the outer periphery of the first carrier 618 on the input side. In the circumferential recess 646, the end surface 617*b* of the outer pins 617 is slightly separated from or in contact with the annular surface 649*a*. In the circumferential recess 646, the peripheral surface 617*c* of the outer pins 617 is in contact with the outer peripheral surface 649*b*.

As the first carrier 618 rotates relative to the casing 622 around the central axis 6La, the output-side end surface 617*b* of the outer pins 617 moves without contacting the annular surface 649*a* or while remaining in sliding contact with the annular surface 649*a*. The peripheral surface 617*c* of the outer pins 617 near the end surface 617*b* moves while remaining rolling contact with the outer peripheral surface 649*b* as the first carrier 618 rotates relative to the casing 622 around the central axis 6La. The peripheral surface 617*c* of the outer pins 617 remains in contact with the outer peripheral surface 649*b* along a line extending along the central axis 6La.

The second main bearing 626 is constituted by the pin grooves 616*b* formed in the casing 622, the outer pins 617, and the circumferential recess 647 provided in the outer periphery of the second carrier 620 on the output side. In the circumferential recess 647, the end surface 617*b* of the outer pins 617 is slightly separated from or in contact with the annular surface 649*a*. In the circumferential recess 647, the peripheral surface 617*c* of the outer pins 617 is in contact with the outer peripheral surface 649*b*.

As the second carrier 620 rotates relative to the casing 622 around the central axis 6La, the input-side end surface 617*b* of the outer pins 617 moves without contacting the annular surface 649*a* or while remaining in sliding contact with the annular surface 649*a*. The peripheral surface 617*c* of the outer pins 617 near the end surface 617*b* moves while remaining rolling contact with the outer peripheral surface 649*b* as the second carrier 620 rotates relative to the casing 622 around the central axis 6La. The peripheral surface 617*c* of the outer pins 617 remains in contact with the outer peripheral surface 649*b* along a line extending along the central axis 6La.

The length of the portion of the peripheral surface 617*c* that is in contact with the outer peripheral surface 649*b* in the direction extending along the central axis 6La is the same among the outer pins 617. The sites where the peripheral surfaces 617*c* of the outer pins 617 are in contact with the outer peripheral surface 649*b* are at equal intervals in the circumferential direction. The outer pins 617 are separated away from each other in the circumferential direction by a distance, which is reliably defined by the pin grooves 616*b* separated away from each other in the circumferential direction by a distance.

In the main bearings 624 and 626, the respective ends of each outer pin 617 in the direction extending along the central axis 6La receive a radially outward force from the circumferential recesses 646 and 647. In addition, the middle portion of each outer pin 617 in the direction extending along the central axis 6La receives a radially inward force from the pin groove 616*b*. This means that the main bearings 624 and 626 support the casing 622 and the carriers 618 and 620 such that the casing 622 can rotate relative to the carriers 618 and 620 along the entire circumference.

The distance between the annular surface 649*a* of the circumferential recess 646 and the annular surface 649*a* of the circumferential recess 647 in the direction extending along the central axis 6La is slightly greater than or substantially equal to the axial dimension of the outer pins 617.

Furthermore, the outer peripheral surface 649*b* is at a given distance in the radial direction from the central axis 6La and the given distance is equal to the value obtained by subtracting the radial dimension of the outer pins 617 from the maximum radial dimension of the pin grooves 616*b*.

The radial dimension of the annular surface 649*a* can be equal to the radial dimension of the outer pins 617. In this case, the outer peripheral surface of the carriers 618 and 620 has the same radial dimension as the cylindrical surface obtained by connecting together the radially outermost positions of the outer pins 617. Here, all of the end surfaces 617*b* of the outer pins 617 can touch the annular surface 649*a*. The radial dimension of the annular surface 649*a* can be smaller than the radial dimension of the outer pins 617. In this case, the cylindrical surface obtained by connecting together the radially outermost radial positions of the outer pins 617 has a greater radial dimension than the outer peripheral surface of the carriers 618 and 620. Furthermore, the length of the outer peripheral surface 649*b* in the axial direction is substantially equal to the length, in the axial direction, of the peripheral surface 617*c* of the outer pins 617 in contact with the outer peripheral surface 649*b*.

In the main bearings 624 and 626, the outer pins 617 are made of a thermally conductive material having a higher resistance against wear than the resin making the outer ring, which is constituted by the pin groves 616*b* formed in (the inner peripheral surface 648 of) the casing 622, and the inner ring, which is constituted by the outer peripheral surface 649*b* formed in the carriers 118 and 120. Specifically, any material can be used to make the outer pins 617 as long as the material exhibits a higher thermal conductivity than the resin of the casing 622 and the carriers 618 and 120 and a higher strength than the resin of the carriers 618 and 620. The material can be a metal material, a non-metal material or the like. The outer pins 617 relating to the present embodiment shown in FIGS. 14 and 15 may be made of copper- or aluminum-based metals or alloys, or iron-based metals such as bearing steel.

In the main bearings 624 and 626, the outer pins 617 are sandwiched between (i) the pin grooves 616*b* corresponding to the inner peripheral surface 648 serving as the outer ring and (ii) the outer peripheral surface 649*b* of the circumferential recesses 646 and 647 serving as the inner ring. In other words, the outer pins 617 are sandwiched between (i) the casing 622 and (ii) the carriers 618 and 620.

The outer pins 617 protruding beyond the pin grooves 616*b* in the direction extending along the central axis 6La also constitute the internal gear 616. Therefore, the main bearing 624, the internal gear 616 and the main bearing 626 are arranged adjacent to each other along the central axis 6La. This arrangement can contribute to maintain the strength of the speed reducer 600 along the entire length in the axial direction.

The carrier pins (inner pins) 638 are inserted into the carrier pin holes (inner pin holes) 639, which are formed in the external gears 614, with a gap therebetween. The carrier pins 638 are fitted at one end thereof into recesses 618*c* in the first carrier 618 and at the other end thereof into recesses 620*c* in the second carrier 620. The carrier pins 638 are fixedly inserted into the recesses 618*c* and 620*c* with bolts 638*a*. The carrier pins 638 may be press-fitted in the recesses 618*c* and 620*c*, in which case the carrier pins 638 are not secured using bolts or the like.

The carrier pins (inner pins) 638 are in contact with part of the carrier pin holes 639, which are formed in the external gears 614. With such arrangement, the carrier pins 638 restrict the external gears 614 from rotating on their own axis and only allows the external gears 614 to oscillate. The carrier pins 638 serve as a coupling member playing a role in transmitting power between the first and second carriers 618 and 620 and the external gears 614. Some of the carrier pins 638 may not be in contact with the carrier pin holes 639 formed in the external gears 614. In this case, the carrier pins 638 do not play a role in restricting the external gears 614 from rotating on their own axis. Accordingly, the carrier pins 638 serve as a coupling member only contributing to couple together the first and second carriers 618 and 620 in this case.

Speed reducers have seen an increase in its applications including collaborative robots working closely with people. In order to expand the applications, it is desired to reduce the weight and noise of the speed reducers. Conventional speed reducers are constituted by parts made of iron-based metals. In order to reduce the weight, the constituents may be made of materials with low specific gravity. Suitable materials with low specific gravity include resin. On the other hand, if the components are made of resin, this may compromise the strength and rigidity. Accordingly, the speed reducers may possibly experience problems or break down. If the components are made of resin, the components may experience temperature rise due to poorer heat dissipation and resultantly shortened lifetime. For this reason, the materials of the components are desirably selected in consideration of the purposes of unchanged strength, weight reduction and heat dissipation. In particular, the weight reduction may lead to compromised strength, which needs to be avoided.

In the speed reducer 600, many of its components can be made of resin to reduce weight. The casing 622, the carriers 618 and 620 and the external gears 614 account for a large portion of the volume of the components of the speed reducer 600. If these components are made of resin, the speed reducer 600 can achieve significant weight reduction. In consideration of the strength and heat dissipation, the input shaft 612, the carrier pins (inner pins) 638, the bolts 638a, the eccentric bearings 630, the input shaft bearings 634, and the outer pins 617 are preferably made of metals.

Furthermore, the main bearings 624 and 626 of the speed reducer 600 are constituted by the outer pins 617, instead of having separate bearings, to rotatably support the casing 622 and the carriers 618 and 620. This allows the speed reducer 600 to achieve further weight reduction. The main bearings 624 and 626 have no metal constituents except for the outer pins 617. Thus, the speed reducer 600 can achieve further weight reduction.

In the main bearings 624 and 626, the peripheral surface 617c of the outer pins 617 moves while remaining rolling contact with the outer peripheral surface 649b as the carriers 618 and 620 rotate relative to the casing 622 around the central axis 6La. This can reduce the friction and improve the reliability of the operation when compared with the case where the surfaces are in sliding contact. Furthermore, the annular surface 649a and the outer peripheral surface 649b are made of resin, and the outer pins 617 are made of metals. In this way, the heat generated from these components touching each other can be efficiently released to improve heat dissipation.

In the speed reducer 600, a large amount of heat is often generated around the main bearings 624 and 626. In addition, a large amount of heat is often generated around the input shaft 612, which is rotatable at a relatively high speed. Furthermore, the speed reducer 600 may malfunction unless the carrier pins (inner pins) 638 and the external gears 614 maintain sufficient strength. As noted, the speed reducers experience a large temperature increase if the heat generated inside is dissipated outside less efficiently. The resin components experience a sudden drop in rigidity and strength as the temperature rises. Accordingly, the continued use of the resin components may probably result in breakage.

To deal with this, one of the members that are movable relative to each other is made of resin, the other member is desirably made of a material exhibiting a higher resistance against wear and a higher thermal conductivity [W/(m·K)] than the resin member. In this way, the heat generated inside can be dissipated outside in a better manner than when the other member is made of a low thermal conductivity material. Furthermore, the members can achieve a longer lifetime than when the other member is made of a low wear-resistance material. Furthermore, the noise can be reduced.

The material used to make the outer pins 617 constituting the main bearings 624 and 626 may be made of any material as long as it exhibits higher wear-resistance and higher thermal conductivity than the resin used to make the outer peripheral surface 649b and the annular surface 649a serving as the inner ring. The material can be metal, non-metal, highly rigid, or highly thermally conductive materials. The outer pins 617, which constitute the main bearings 624 and 626 of the present embodiment, may be made of iron- and aluminum-based metals such as bearing steel, light metals such as aluminum, magnesium, beryllium, and titanium, or composites thereof. Alternatively, the outer pins 617 may be made of ceramics. As the other components such as the carriers 618 and 620 and the casing 622 are made of resin, the speed reducer 600 can achieve both light weight and sufficient mechanical strength.

The input shaft 612 and the eccentric bearings 630 and the input shaft bearings 634, which are located in contact with the input shaft 612, receive high-speed rotation input thereto before it is slowed down. This means that the input shaft 612, the eccentric bearings 630 and the input shaft bearings 634 experience a relatively large temperature rise, and they allow a smaller number of rotations input thereto if they exhibit low resistance against heat. For this reason, the input shaft 612, the input shaft bearings 634 and the eccentric bearings 630 may be made of metals, such as iron-based metals. This can prevent a drop in the allowable number of rotations input into them. Since the input shaft 612 is subjected to large torsional stress, the input shaft 612 is preferably made of a more rigid material than the carriers 618 and 620. The input shaft 612 may be made of iron-based metals with a higher torsional strength than aluminum. The iron-based metals can include carbon steel, bearing steel, and stainless steel, any of which can be used depending on the desired characteristics.

The carrier pins (inner pins) 638 are desirably highly rigid in order to reliably perform the transfer of the rotation to the external gears 614. The carrier pins 638 are desirably highly rigid in order to reliably achieve sufficient coupling strength between the first and second carriers 618 and 620. Considering this, the carrier pins 638 and the bolts 638a may be made of metals. In this example, the carrier pins 638 may be made of iron-based metals.

The following now describes how the speed reducer 600 configured as described above operates. As rotational power is transmitted from the driving unit to the input shaft 612, the eccentric portions 612a of the input shaft 612 rotate around the central axis 6La of the input shaft 612. This causes the eccentric portions 612a to oscillate the external gears 614. The external gears 614 oscillate in such a manner that their own axial center rotates around the rotational center line of the input shaft 612. As the external gears 614 oscillate, the meshing between the external gears 614 and the outer pins 617 of the internal gear 616 takes place at sequentially shifted positions. Accordingly, every time the input shaft 612 rotates once, either the external gears 614 or the internal gear 616 rotates on its own axis by an amount determined by the difference between the number of teeth of the external gears 614 and the number of outer pins 617 of the internal gear 616. In the present embodiment shown in FIGS. 14 and 15, the rotation of the external gears 614 on their own axis results in reduced rotations being output through the first carrier 618 or casing 622.

Here, in the main bearings 624 and 626, the outer pins 617 protruding beyond the pin grooves 616b move while remaining rolling relative to the circumferential recesses 646 and 647 as the carriers 618 and 620 rotate relative to the casing 622 around the central axis 6La. The peripheral surface 617c of the outer pins 617 is in contact with the outer peripheral surface 649b along a line extending along the central axis 6La.

In the speed reducer 600 relating to the present embodiment, the outer pins 617 serve both as the internal tooth pins or the internal teeth of the internal gear 616 and as the rollers of the main bearings 624 and 626. This allows the speed reducer 600 to be made up by a smaller number of parts, thereby achieving size and weight reduction. In particular, since no separate members need to be provided outside the outer pins 617 as part of the main bearings, the speed reducer 600 can have a reduced thickness. In addition, since the outer pins 617 are arranged near the outer periphery of the speed reducer 600 such that they cover a large part of the speed reducer 600 in the thickness direction, the speed reducer 600 can be strong enough to prevent deformation, which results in malfunctions.

The speed reducer 600 relating to the present embodiment has no heavy and metal constituents heavier than resins, except for the outer pins 617. Thus, the speed reducer 600 can achieve further weight reduction. Since one of the members is made of resin and the other is made of a material exhibiting higher wear-resistance and higher thermal conductivity than the resin, the members can achieve reduced weight, increased rigidity, enhanced heat dissipation and improved reliability of operation.

The speed reducer 600 relating to the present embodiment can produce the same effects as the speed reducers relating to the above-described embodiments.

Tenth Embodiment

Figure 16:
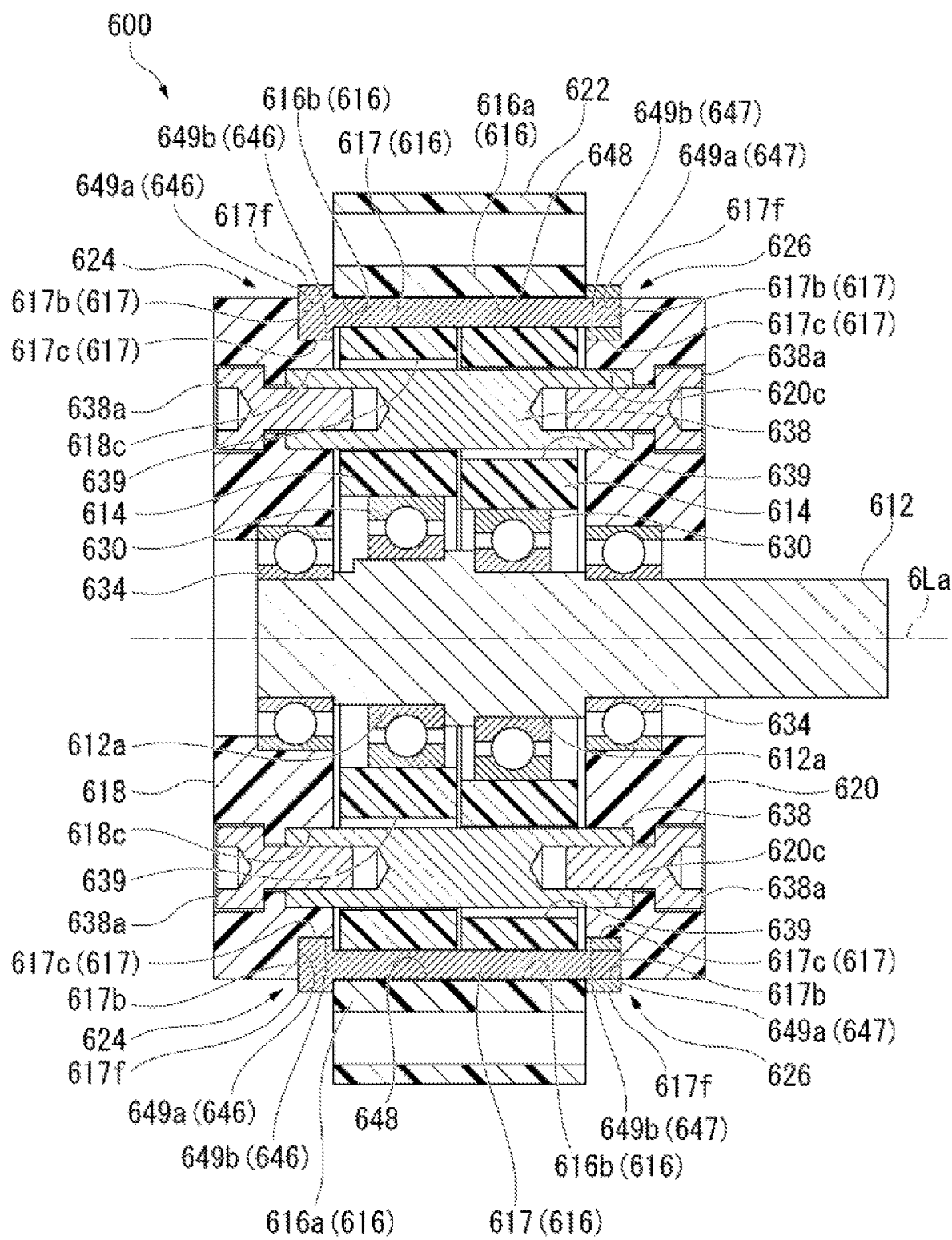
FIG. 16 is a sectional view showing a speed reducer relating to a tenth embodiment of the present disclosure along a main axis.

The following describes a speed reducer relating to a tenth embodiment of the disclosure with reference to the accompanying drawings. FIG. 16 is a sectional view showing the speed reducer relating to the tenth embodiment along the axial direction. The present embodiment is different from the ninth embodiment in terms of the outer pins. The other components relating to the tenth embodiment have counterparts in the ninth embodiment, and they are assigned with the same reference signs and not described now.

In the speed reducer 600 relating to the present embodiment, as shown in FIG. 16, the outer pins 617 in the main bearings 624 and 626 each have diameter-enlarged portions 617f at the respective ends. The diameter-enlarged portions 617f are formed in the portion of each outer pin 617 that protrude beyond the pin groove 616b. The portion of each outer pin 617 that is housed in the pin groove 616b is configured in the same manner as in the ninth embodiment. The radial dimension of the diameter-enlarged portions 617f is greater than the radial dimension of the portion of the outer pin 617 that is housed in the pin groove 616b. The radial dimension of the diameter-enlarged portions 617f remains unchanged along the entire length of the diameter-enlarged portions 617f in the direction extending along the central axis 6La. The diameter-enlarged portions 617f at the respective ends of each outer pin 617 are both shaped in the same manner.

The end surfaces 617b of the diameter-enlarged portions 617f of each outer pin 617 are slightly separated from or in contact with the annular surfaces 649a. The peripheral surfaces 617c of the diameter-enlarged portions 617f touch the outer peripheral surfaces 649b. As a result, the circumferential recesses 646 and 647 are positioned closer to the central axis 6La in the radial direction. For similar reasons, the annular surfaces 649a have a greater radial dimension.

The circumferential recess 646 has a greater size in the radial direction than in the ninth embodiment, due to the sectional shape of the diameter-enlarged portion 617f. The peripheral surface 617c of the diameter enlarged portion 617f moves while remaining rolling contact with the outer peripheral surface 649b as the carriers 618 and 620 rotate relative to the casing 622 around the central axis 6La. The peripheral surface 617c of the outer pins 617 remains in contact with the outer peripheral surface 649b along a line extending along the central axis 6La.

In the speed reducer 600 relating to the present embodiment shown in FIG. 16, the peripheral surface 617c of the diameter-enlarged portion 617f has a greater radial dimension than the peripheral surface 617c of the ninth embodiment. Here, if the outer pins 617 rotate at the same rate, the circumferential speed of the peripheral surface 617c increases proportionally to the radial dimension. It is presupposed that the outer pins 617 rotate at a constant speed when the outer pins 617 serve as the internal tooth pins of the internal gear 616 and come into contact with the external gears 614 as a result of the rotation of the carriers 618 and 620 relative to the casing 622 around the central axis 6La.

While rotating, the peripheral surface 617c may touch the outer peripheral surface 649b of the circumferential recesses 646 and 647. As a result, if the outer pins 617 rotate in an ideal manner, the peripheral surface 617c establishes a rolling contact with the outer peripheral surface 649b. However, if the circumferential speed of the outer pins 617 is too different from the circumferential speed of the outer peripheral surface 649b, the peripheral surface 617c may unfortunately establish a sliding contact with the outer peripheral surface 649b. The sliding contact may increase friction, generate more heat, shorten the lifetime, increase the noise, result in a higher failure rate, when compared with the rolling contact. Therefore, there is a demand to prevent these.

In the speed reducer 600 relating to the present embodiment shown in FIG. 16, the outer pins 617 are thicker as they have the diameter-enlarged portions 617f. This can prevent the sliding contact from being established between the peripheral surface 617c and the outer peripheral surface 649b and help maintaining the rolling contact. In this manner, the circumferential speed of the outer pins 617 can be controlled. In other words, since the outer pins 617 have the diameter-enlarged portions 617f, they may be less affected by the sliding resistance produced by the carriers 618 and 620. In this manner, the outer pins 617 can be rotated mainly by the contact resistance produced between them and the external gears 614.

This can align the large number of outer pins 617 in terms of the number of rotations, so that the carriers 618 and 620 can rotate relative to the casing 622 around the central axis 6La more reliably. Note that the radial dimension of the carriers 618 and 620 and casing 622 and their relative rotation around the central axis 6La may determine the favorable number of rotations of the outer pins 617.

As described above, since the outer pins 617 have the diameter-enlarged portions 617f, the circumferential speed of the peripheral surface 617c, which is in contact with the outer peripheral surface 649b, increases. This means that, even if the outer pins 617 rotate at the same speed, the circumferential speed of the outer pins 617 can be increased toward the circumferential speed of the outer peripheral surface 649b. In this manner, the circumferential speed of the outer pins 617 can be easily aligned with the speed of the relative rotation between the carriers 618 and 620 and the casing 622. Accordingly, the present embodiment can adjust the number of rotations of the large number of outer pins 617 more efficiently.

Stated differently, in the speed reducer 600 relating to the present embodiment, the circumferential speed is higher on the peripheral surface 617c of the diameter-enlarged portions 617f than at a site in contact with the pin grooves 616b. Since the outer pins 617 are in contact with the outer peripheral surface 649b while rotating at a high speed, it is preferable that the circumferential speed of the peripheral surface 617c abutting the outer peripheral surface 649b is ideally the same among all of the outer pins 617.

Here, the variation in the speed among the outer pins 617, in other words, the variation in the circumferential speed can be controlled or reduced more effectively if the relative speed of the outer pins 617, which are in contact with the outer peripheral surface 649b, is high. For this reason, the diameter-enlarged portions 617f can help align the large number of outer pins 617 in terms of the rotational speed, so that the outer pins 617 all can have the same circumferential speed. In this manner, the present embodiment can reduce variation in circumferential speed among the large number of outer pins 617.

In the speed reducer 600 relating to the present embodiment, the outer pins 617 can have a larger radial dimension by having the diameter-enlarged portions 617f without affecting the external gears (oscillating gears) 614, which are inside the outer pins 617 in the radial direction and mesh with the outer pins 617. This can increase the circumferential speed at the site abutting the outer peripheral surface 649b. The present embodiment can effectively and easily control the large number of outer pins 617 such that they can rotate at the same speed.

The speed reducer 600 relating to the present embodiment can produce the same effects as the speed reducers relating to the above-described embodiments.

While each outer pin 617 has the diameter-enlarged portions 617f on its respective ends in the present embodiment, each outer pin 617 may have the diameter-enlarged portion 617f only on one of the ends.

Eleventh Embodiment

Figure 17:
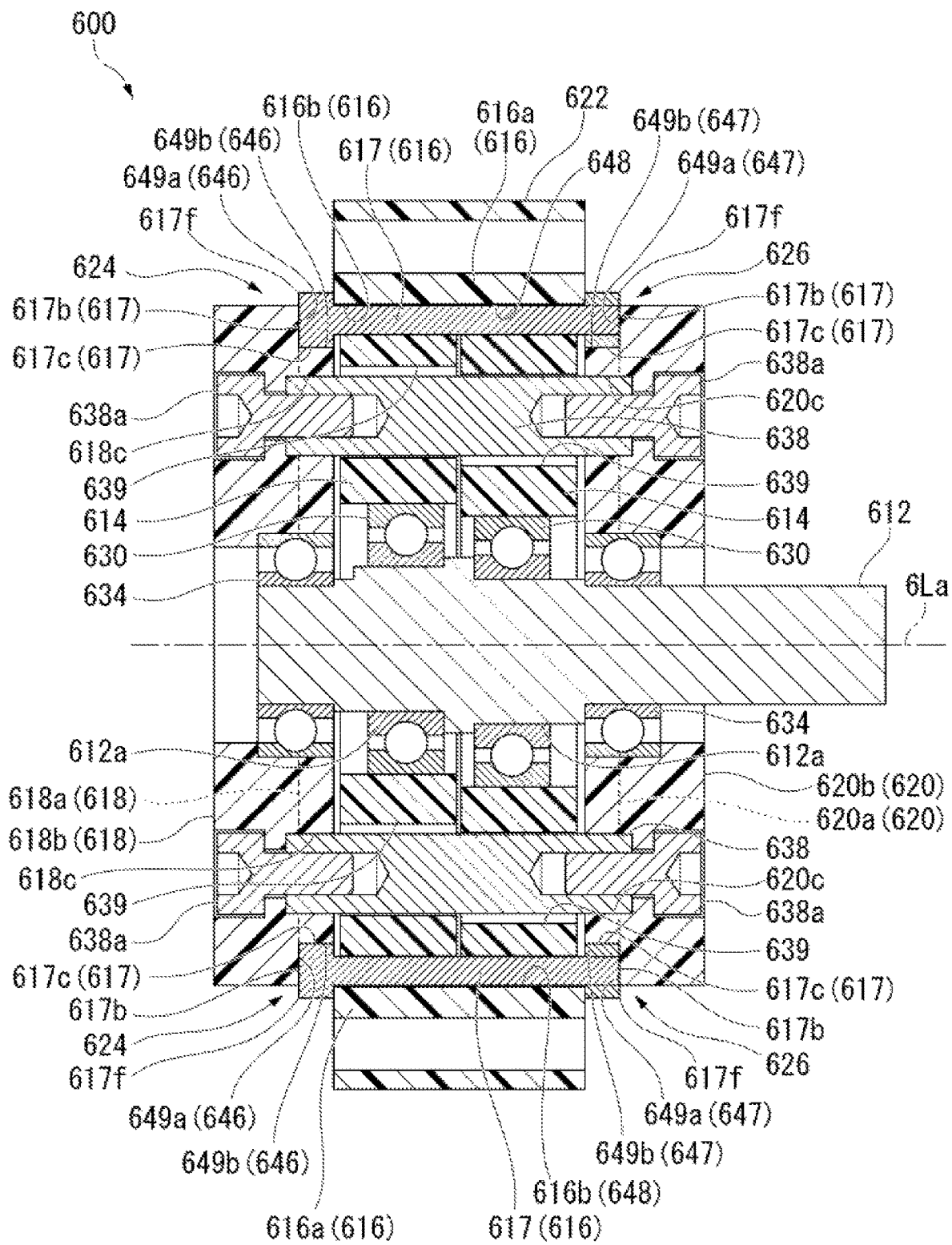
FIG. 17 is a sectional view showing a speed reducer relating to an eleventh embodiment of the present disclosure along a main axis.

The following describes a speed reducer relating to an eleventh embodiment of the disclosure with reference to the accompanying drawings. FIG. 17 is a sectional view showing the speed reducer relating to the eleventh embodiment along the axial direction. The present embodiment is different from the tenth embodiment in terms of how the carriers are divided. The other components relating to the eleventh embodiment have counterparts in the tenth embodiment, and they are assigned with the same reference signs and not described now.

In the speed reducer 600 relating to the present embodiment, as shown in FIG. 17, the first carrier (shaft flange) 618 is divided into two portions next to each other in the direction extending along the central axis 6La. Here, the dividing plane can be oriented such that the central axis 6La is normal to the dividing plane, and aligned with the annular surface 649a, as indicated by the dotted line in FIG. 17. The first carrier (shaft flange) 618 is divided into an inner shaft flange 618a and an outer shaft flange 618b. The inner shaft flange 618a is arranged to enclose therein the inner space of the speed reducer 600, and the outer shaft flange 618b is positioned outside the speed reducer 600.

The inner shaft flange 618a is arranged to enclose therein the inner space of the speed reducer 600. The outer periphery of the inner shaft flange 618a is aligned with the outer peripheral surface 649b. The thickness of the inner shaft flange 618a is equal to the dimension of the outer peripheral surface 649b in the axial direction. The outer shaft flange 618b is arranged outside the speed reducer 600. The outer periphery of the outer shaft flange 618b is partly aligned with the annular surface 649a. The first carrier (shaft flange) 618 is configured such that the inner and outer shaft flanges 618a and 618b are stacked on each other in the direction extending along the central axis 6La.

Likewise, the second carrier (hold flange) 620 can be divided into two portions next to each other in the direction extending along the central axis 6La. Here, the dividing plane can be oriented such that the central axis 6La is normal to the dividing plane, and aligned with the annular surface 649a, as indicated by the dotted line in FIG. 17. The second carrier (hold flange) 620 is divided into an inner hold flange 620a and an outer hold flange 620b. The inner hold flange 620a is arranged to enclose therein the inner space of the speed reducer 600, and the outer hold flange 620b is positioned outside the speed reducer 600.

The inner hold flange 620a is arranged to enclose therein the inner space of the speed reducer 600. The outer periphery of the inner hold flange 620a is aligned with the outer peripheral surface 649b. The thickness of the inner hold flange 620a is equal to the dimension of the outer peripheral surface 649b in the axial direction. The outer hold flange 620b is arranged outside the speed reducer 600. The outer periphery of the outer hold flange 620b is partly aligned with the annular surface 649a. The second carrier (hold flange) 620 is configured such that the inner and outer hold flanges 620a and 620b are stacked on each other in the direction extending a long the central axis 6La.

The four flanges, specifically, the inner and outer shaft flanges 618a and 618b, and the inner and outer hold flanges 620a and 620b are all connected to the carrier pins (inner pins) 638 using the bolts 638a.

When the speed reducer 600 relating to the present embodiment is assembled, the input shaft 612 and its surrounding parts, the outer pins 617 and the external gears 614 are housed in the casing 622. After this, the two flanges, or the inner shaft flange 618a and the inner hold flange 620a are incorporated such that they touch the diameter-enlarged portions 617f of the outer pins 617.

Furthermore, the carrier pins 638 are introduced into the carrier pin holes 639, and the two flanges, or the outer shaft flange 618b and the outer hold flange 620b are brought into contact with or placed near the end surfaces 617b of the outer pins 617. Following this, the inner and outer shaft flanges 618a and 618b, and the inner and outer hold flanges 620a and 620b are coupled to the carrier pins (inner pins) 638 using the bolts 638a.

In the above manner, the speed reducer 600 can be assembled without being affected by the presence of the diameter-enlarged portions 617f in the outer pins 617, so that the assembling can be completed within a shorter period of time and the efficiency can be improved. Furthermore, the outer peripheral surface 649b, which is brought into contact with the outer pins 617, can be formed simply by controlling the shape of the outer periphery of the inner shaft and hold flanges 618a and 620a. This means that the flanges can be more easily made. When the carrier pins 638 are formed as an integral part of the first carrier (shaft flange) 618, the carrier pins 638 can be integrally made with the inner shaft flange 618a.

The speed reducer 600 relating to the present embodiment can produce the same effects as the speed reducers relating to the above-described embodiments.

Like the ninth embodiment, for example, the present embodiment can be practiced without the diameter-enlarged portions 617f in the outer pins 617.

Twelfth Embodiment

Figure 18:
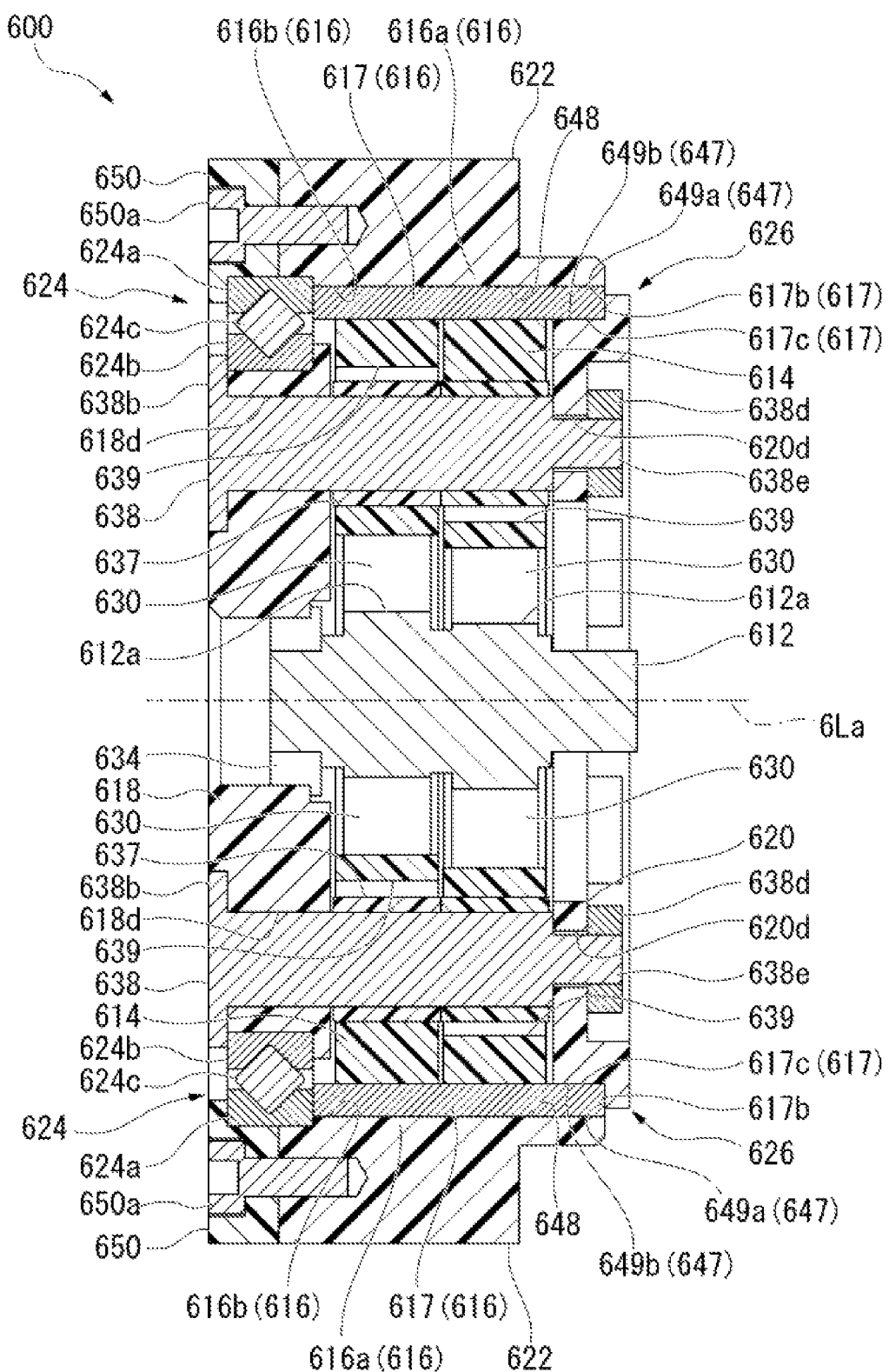
FIG. 18 is a sectional view showing a speed reducer relating to a twelfth embodiment of the present disclosure along a main axis.

The following describes a speed reducer relating to a twelfth embodiment of the disclosure with reference to the accompanying drawings. FIG. 18 is a sectional view showing the speed reducer relating to the twelfth embodiment along the axial direction. The present embodiment is different from the ninth to eleventh embodiments in terms of the main bearings. The other components relating to the twelfth embodiment have counterparts in the ninth to eleventh embodiments, and they are assigned with the same reference signs and not described now.

In the speed reducer 600 relating to the present embodiment, as shown in FIG. 18, the main bearing 624 arranged on the outer pins 617 at one end thereof is a crossed roller bearing. The other ends of the outer pins 617 serve as the main bearing 626, as in the ninth to eleventh embodiments. In the main bearing 626, the pin grooves 616b extend along the entire length of the outer pins 617 extending along the central axis 6La. The pin grooves 616b extend from the radially outside of the external gears 614 to the radially outside of the second carrier 620.

Therefore, like the pin grooves 616b, the casing 622 having the internal gear 616 integrated therewith extends to the radially outside of the second carrier 620. In this way, the outer pins 617, which constitute the internal teeth of the internal gear 616, and the pin grooves 616b, form the inner peripheral surface 648 of the main bearing 626.

The main bearing 624 includes an outer ring 624a rotatable integrally with the casing 622, an inner ring 624b rotatable integrally with the first carrier 618, and a plurality of rollers 624c, which are rolling elements. A V-groove having a V-shaped cross-section is formed on the surfaces of the outer and inner rings 624a and 624b that face each other, so that the V grooves of the outer and inner rings 624a and 624b face each other. Between the outer ring 624a and the inner ring 624b, the rollers 624c are arranged such that, using the V-grooves, the axes of the adjacent rollers run orthogonally to each other.

The main bearing 624, which is a crossed roller bearing, is adjacent to the outer pins 617 on the output side in the direction extending along the central axis 6La. The output-side ends of the outer pins 617 are adjacent to the outer ring 624a. The inner ring 624b is, in the direction along the central axis 6La, spaced apart from the external gear 614 that is located on the output side. The main bearing 624, which is a crossed roller bearing, is preferably made of metals.

The outer ring 624a is mounted in a recess formed in the casing 622. In the present embodiment, a member 650, which is a stationary or output member, is attached to the casing 622 using bolts 650a. The outer ring 624a of the main bearing 624 is sandwiched between the portions of the casing 622 to which the bolts 650a are attached. In other words, the casing 622 and the member 650 integrated with the casing 622 cover the outer ring 624a of the main bearing 624. The inner ring 624b of the main bearing 624 is arranged radially outside and attached to the first carrier 618.

In the speed reducer 600 of the present embodiment, the carrier pins 638 have a flange portion 638b at the output-side end thereof. The output-side ends of the carrier pins 638 run through holes 618d formed in the first carrier 618. The output-side ends of the carrier pins 638 are fixedly secured in the first carrier 618 using the flange portions 638b. The input-side ends of the carrier pins 638 are fitted in holes 620d formed in the second carrier 620. The input-side ends of the carrier pins 638 make male screw portions 638e, which are fixedly secured in the second carrier 620 using nuts 638d. The carrier pins 638 are surrounded by tubular inner rollers 637. The carrier pins (inner pins) 638 are inserted into and run through the carrier pin holes (inner pin holes) 639, which are formed in the external gears 614, with a gap therebetween.

In the present embodiment, the input shaft bearing 634 supports the output-side end of the input shaft 612. The input shaft 612 is connected, at the input side thereof, to a motor shaft or the like, which is not shown. Here, a motor shaft or other bearings can be used to support the input shaft 612 on the input side thereof. For this reason, no bearings are shown on the input side of the input shaft 612.

In the present embodiment, the main bearing 624 on the output side is a crossed roller bearing. This can produce rolling contact and thus diminish the resistance, so that the carriers 618 and 620 can rotate relative to the casing 622 stably. In particular, during the rotation, the carriers 618 and 620 and the casing 622 can remain at a desired position more stably in the thrust direction.

The speed reducer 600 relating to the present embodiment can produce the same effects as the speed reducers relating to the above-described embodiments.

Thirteenth Embodiment

Figure 19:
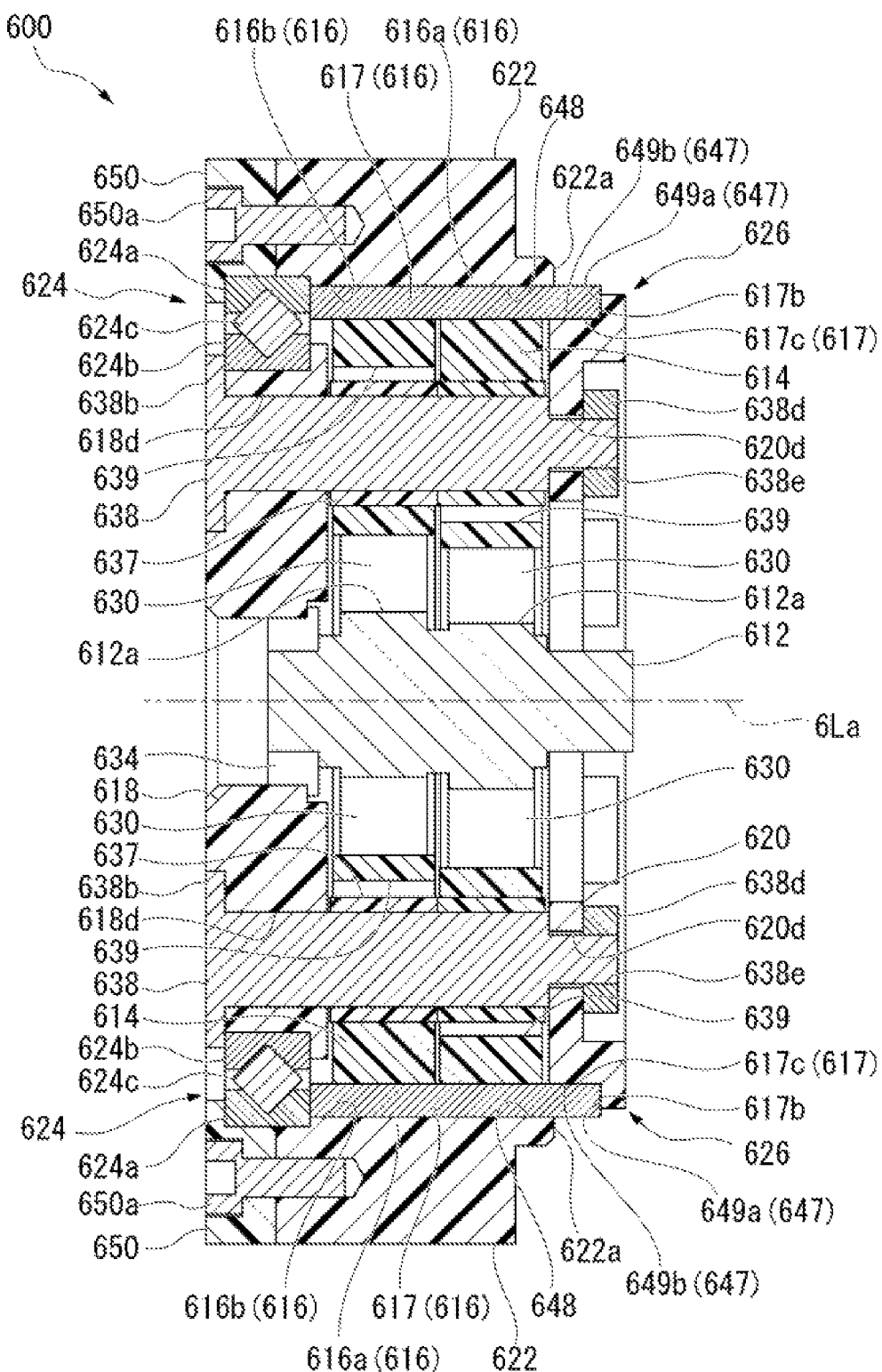
FIG. 19 is a sectional view showing a speed reducer relating to a thirteenth embodiment of the present disclosure along a main axis.

The following describes a speed reducer relating to a thirteenth embodiment of the disclosure with reference to the accompanying drawings. FIG. 19 is a sectional view showing the speed reducer relating to the thirteenth embodiment along the axial direction. The present embodiment is different from the twelfth embodiment in terms of the main bearings. The other components relating to the thirteenth embodiment have counterparts in the twelfth embodiment, and they are assigned with the same reference signs and not described now.

In the speed reducer 600 relating to the present embodiment, as shown in FIG. 19, the input-side ends of the outer pins 617 also serve as the main bearing 626, as in the twelfth embodiment. In the main bearing 626, the pin grooves 616b, which form the inner peripheral surface 648, do not extend along the entire length of the outer pins 617 in the direction extending along the central axis 6La. In other words, the pin grooves 616b are positioned radially outside the external gears 614, but not positioned radially outside the second carrier 620.

Like the pin grooves 616b, the casing 622 covers and is positioned radially outside the external gears 614. The casing 622 does not occupy a region radially outside the second carrier 620. The input-side end surface 622*a* of the casing 622, which is positioned on the inner-periphery side near the central axis 6La, may be flush with the output-side end surface of the second carrier 620. Accordingly, the outer pins 617 are not in contact with the pin grooves 616*b* on the radially outer side with respect to the second carrier 620.

Since the casing 622 does not occupy the region radially outside the second carrier 620, the speed reducer 600 relating to the present embodiment can achieve further reduction in weight. Furthermore, the speed reducer 600 relating to the present embodiment can produce the same effects as the speed reducers relating to the above-described embodiments.

Fourteenth Embodiment

Figure 20:
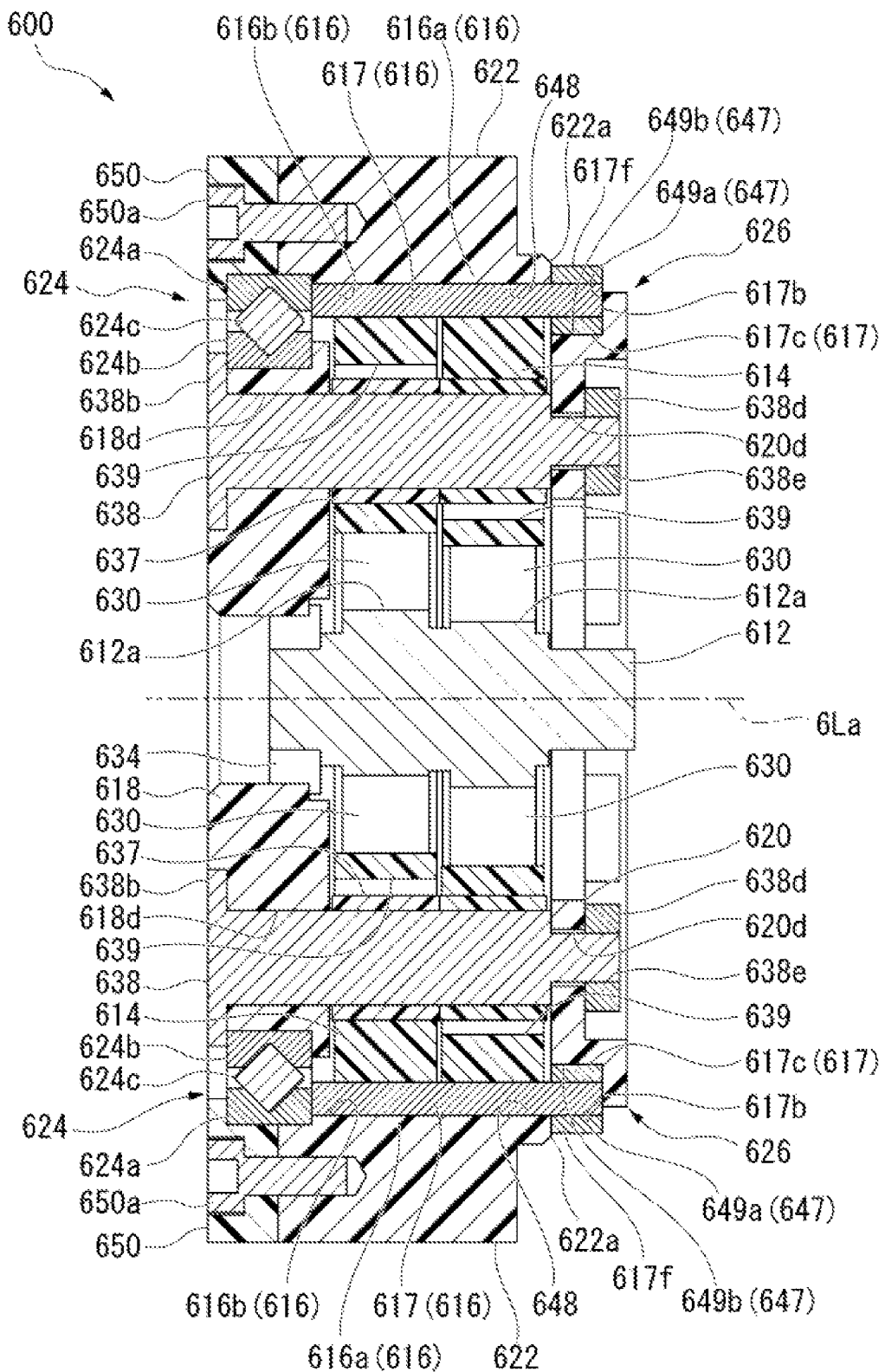
FIG. 20 is a sectional view showing a speed reducer relating to a fourteenth embodiment of the present disclosure along a main axis.

The following describes a speed reducer relating to a fourteenth embodiment of the disclosure with reference to the accompanying drawings. FIG. 20 is a sectional view showing the speed reducer relating to the fourteenth embodiment along the axial direction. The present embodiment is different from the twelfth and thirteenth embodiments in terms of the main bearings. The other components relating to the fourteenth embodiment have counterparts in the twelfth and thirteenth embodiments, and they are assigned with the same reference signs and not described now.

In the speed reducer 600 relating to the present embodiment, as shown in FIG. 20, the input-side ends of the outer pins 617 also serve as the main bearing 626 as in the thirteenth embodiment and are not covered by the pin grooves 616*b* forming the inner peripheral surface 648. The outer pins 617 have the diameter-enlarged portions 617*f* at the input-side ends thereof as in the tenth embodiment.

The outer pins 617 of the main bearing 626 have the diameter-enlarged portions 617*f* on the input side, where the outer pins 617 are not in contact with the pin grooves 616*b*. The outer pins 617 have the diameter-enlarged portions 617*f* at the portion that is on the input side in the axial direction with respect to the end surface 622*a* of the casing 622. The diameter-enlarged portions 617*f* are formed in the portion of the outer pins 617 that protrudes beyond the pin grooves 616*b*. The diameter-enlarged portions 617*f* are sandwiched, in the direction extending along the central axis 6La, between the end surface 622*a* and the annular surface 649*a*. The diameter-enlarged portions 617*f* partly protrude beyond the circumferential recess 647 in the direction extending along the central axis 6La.

In the speed reducer 600 configured in the above manner, the main bearing 624, which is positioned on the output side, is a crossed roller bearing so that it can stably keep the parts in the designed position in the thrust direction and is made of metals so that it can ensure that the casing 622 and the carriers 618 and 620 can rotate relative to each other stably. In the speed reducer 600, the diameter-enlarged portions 617*f* are positioned on the input side. The output-side end of the diameter-enlarged portions 617*f* in the central axis 6La direction is restricted from moving out of position by the end surface 622*a*, and the input-side end of the diameter-enlarged portions 617*f* in the central axis 6La direction is restricted from moving out of position by the annular surface 649*a*. This arrangement can contribute to restrict the casing 622 and the carriers 618 and 620 from moving out of position in the direction extending along the central axis 6La. Accordingly, the speed reducer 600 can operate more stably.

The speed reducer 600 relating to the present embodiment can produce the same effects as the speed reducers relating to the above-described embodiments.

The features of the above-described embodiments of the present invention can be combined.

In addition, Polyaryletherketones (PAEKs) include polyetherketones (PEKs), polyetherketone ketones (PEKKs), and polyetherketone ketone ether ketones (PEKKEKs).

The present disclosure include the following inventions (1-1) to (1-6).

(1-1) An eccentric oscillation speed reducer for transmitting a driving force between a first member and a second member, the eccentric oscillation speed reducer being configured to change the number of rotations at a predetermined ratio, the eccentric oscillation speed reducer comprising:
an eccentric portion;
an external gear having external teeth and an insertion hole into which the eccentric portion is inserted;
a casing attachable to one of the first and second members;
a carrier attachable to the other of the first and second members; and
a main bearing having an inner sliding surface and an outer sliding surface, the inner sliding surface being rotatable integrally with the casing, the outer sliding surface being rotatable integrally with the carrier,
wherein the casing has internal teeth meshing with the external teeth of the external gear,
wherein the carrier is placed within the casing in a radial direction while holding the external gear,
wherein the casing and the carrier are rotatable relative to each other in a concentric manner in response to oscillation of the external gear resulting from rotation of the eccentric portion, and
wherein one of the inner and outer sliding surfaces is made of resin, and the other of the inner and outer sliding surfaces is made of a thermally conductive material that is more wear-resistant than the resin.

(1-2) An eccentric oscillation speed reducer including two or more eccentric bodies and external gears respectively corresponding to the eccentric bodies, the eccentric oscillation speed reducer comprising:
a casing having an internal gear on an inner periphery thereof, the internal gear meshing with the external gears;
a carrier rotatable relative to the casing and rotatable relative to the eccentric bodies; and
a main bearing having an inner sliding surface and an outer sliding surface, the inner sliding surface being formed on an inner peripheral surface of the casing, the outer sliding surface being formed on an outer peripheral surface of the carrier,
wherein one of the inner and outer sliding surfaces is made of resin, and the other of the inner and outer sliding surfaces is made of a thermally conductive material that is more wear-resistant than the resin.

(1-3) A speed reducer comprising:
an internal gear having a casing and a plurality of outer pins, the casing surrounding a main axis, the outer pins being rotatably arranged in pin grooves provided on an inner periphery of the casing;
an external gear meshing with the internal gear;
an eccentric body for oscillating the external gear;
a carrier rotatable relative to the casing; and
a main bearing having an inner surface and an outer surface, the inner surface being rotatable integrally with the casing, the outer surface being rotatable integrally with the carrier, the outer pins being sandwiched between the inner surface and the outer surface, wherein the inner and outer surfaces are made of one of a resin and a thermally conductive material that is more wear-resistant than the resin, and the outer pins are made of the other.

(1-4) The speed reducer as set forth in (1-3), wherein the outer pins have, at an end thereof, a diameter-enlarged portion having an enlarged diameter.

(1-5) A speed reducer comprising:
an internal gear having a casing and a plurality of outer pins, the casing surrounding a main axis, the outer pins being rotatably arranged in pin grooves provided on an inner periphery of the casing;
an external gear meshing with the internal gear;
an eccentric body for oscillating the external gear;
a carrier rotatable relative to the casing;
a first main bearing having an inner surface and an outer surface, the inner surface being rotatable integrally with the casing, the outer surface being rotatable integrally with the carrier, the outer pins being sandwiched between the inner surface and the outer surface; and
a second main bearing configured as a crossed roller bearing including a plurality of rollers disposed between V grooves having a V-shaped section facing each other,
wherein the inner and outer surfaces are made of one of resin and a thermally conductive material that is more wear-resistant than the resin, and the outer pins are made of the other.

(1-6) A speed reducer comprising:
an internal gear having a casing and a plurality of outer pins, the casing surrounding a main axis, the outer pins being rotatably arranged in pin grooves provided on an inner periphery of the casing;
an external gear meshing with the internal gear;
an eccentric body for oscillating the external gear;
a carrier rotatable relative to the casing; and
a main bearing having an inner surface and an outer surface, the inner surface being rotatable integrally with the casing, the outer surface being rotatable integrally with the carrier, the outer pins being sandwiched between the inner surface and the outer surface,
wherein the inner and outer surfaces are made of resin, and the outer pins are made of a metal, and
wherein the outer pins have, at an end thereof, a diameter-enlarged portion having an enlarged diameter.

INDUSTRIAL APPLICABILITY

The present disclosure can be applied to, for example, service and collaborative robots, power assist prostheses and other devices that are placed at a short physical distance from humans. The present disclosure can effectively provide safety through weight reduction.

What is claimed is:
1. A speed reducer comprising:
a casing configured to surround a main axis;
an internal gear integrally formed with the casing;
an external gear configured to mesh with the internal gear;
an eccentric body configured to oscillate the external gear;
a carrier configured to be rotatable relative to the casing; and
a main bearing configured to be arranged between the casing and the carrier, and to rotatably support the carrier relative to the casing,
wherein the internal gear includes an internal gear body integrated into the casing, and a plurality of internal tooth pins configured to mesh with the external gear,
wherein the plurality of internal tooth pins are configured to rotatably arrange in pin grooves formed on an inner peripheral surface of the internal gear body,
wherein the main bearing is a plain bearing having an inner sliding surface and an outer sliding surface that are in contact with each other, the inner sliding surface is formed on an inner peripheral surface of a metal ring being rotatable integrally with the casing, the outer sliding surface is formed on an outer peripheral surface of the carrier,
wherein one of the inner and outer sliding surfaces is made of resin, and the other of the inner and outer sliding surfaces is made of a thermally conductive material that has a higher wear-resistant than the resin, and
wherein the plurality of internal tooth pins and the metal ring are made of a material that has a higher thermal conductivity and a higher wear-resistant than the resin.

2. The speed reducer of claim 1, wherein the carrier is made of the resin.

3. The speed reducer of claim 2, wherein the inner sliding surface is made of the thermally conductive material, and
wherein, in a direction extending along the main axis, the inner sliding surface is positioned to overlap the outer pins.

4. The speed reducer of claim 1, wherein the inner and outer sliding surfaces have a groove formed therein that is not in communication with an internal space having the external gear housed therein.

5. The speed reducer of claim 1, wherein the metal ring is arranged to overlap with respect to the plurality of internal tooth pins along a radial direction of the casing.

* * * * *